(12) United States Patent
Fujita et al.

(10) Patent No.: US 8,741,500 B2
(45) Date of Patent: Jun. 3, 2014

(54) FUEL CELL STACK AND FUEL CELL SYSTEM

(75) Inventors: Toshiyuki Fujita, Osaka (JP); Hironori Kambara, Osaka (JP); Masashi Muraoka, Osaka (JP); Tomohisa Yoshie, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 758 days.

(21) Appl. No.: 12/671,878

(22) PCT Filed: Jul. 30, 2008

(86) PCT No.: PCT/JP2008/063644
§ 371 (c)(1),
(2), (4) Date: Feb. 2, 2010

(87) PCT Pub. No.: WO2009/017147
PCT Pub. Date: Feb. 5, 2009

(65) Prior Publication Data
US 2010/0221633 A1  Sep. 2, 2010

(30) Foreign Application Priority Data

Aug. 2, 2007  (JP) .................... 2007-202146
Mar. 28, 2008  (JP) .................... 2008-087571
May 13, 2008  (JP) .................... 2008-126377

(51) Int. Cl.
    *H01M 8/24*   (2006.01)
(52) U.S. Cl.
    USPC ........... 429/468; 429/467; 429/469; 429/454; 429/452

(58) Field of Classification Search
    USPC .................................. 429/452–471
    See application file for complete search history.

(56) References Cited

U.S. PATENT DOCUMENTS

| | | | |
|---|---|---|---|
| 4,457,822 A | 7/1984 | Asano et al. | |
| 4,498,942 A | 2/1985 | Asano et al. | |
| 4,664,987 A | 5/1987 | Isenberg | |

(Continued)

FOREIGN PATENT DOCUMENTS

| | | |
|---|---|---|
| CN | 1539176 A | 10/2004 |
| JP | 60-258863 | 12/1985 |

(Continued)

OTHER PUBLICATIONS

Office Action mailed Dec. 16, 2010, for U.S. Appl. No. 11/806,663.

(Continued)

*Primary Examiner* — Raymond Alejandro
*Assistant Examiner* — Helen McDermott
(74) *Attorney, Agent, or Firm* — Nixon & Vanderhye P.C.

(57) ABSTRACT

A fuel cell stack formed by stacking two or more fuel cell layers each constituted of one or more unit cell and a fuel cell system including the same are provided. Any two fuel cell layers adjacent to each other each have one or more gap region. At least a part of the gap region in one fuel cell layer of any two fuel cell layers adjacent to each other is in contact with a unit cell constituting the other fuel cell layer. The gap region in one fuel cell layer and the gap region in the other fuel cell layer communicate with each other. The fuel cell stack is excellent in fuel or oxidizing agent supply performance and it realizes high power density.

13 Claims, 58 Drawing Sheets

(56) References Cited

U.S. PATENT DOCUMENTS

| | | | |
|---|---|---|---|
| 4,752,370 A | 6/1988 | McMichael et al. | |
| 4,877,694 A | 10/1989 | Solomon et al. | |
| 5,252,409 A * | 10/1993 | Akagi | 429/456 |
| 5,364,711 A | 11/1994 | Yamada et al. | |
| 5,399,184 A | 3/1995 | Harada | |
| 5,432,023 A | 7/1995 | Yamada et al. | |
| 5,549,982 A | 8/1996 | Akagi | |
| 6,054,228 A * | 4/2000 | Cisar et al. | 429/443 |
| 6,127,058 A | 10/2000 | Pratt et al. | |
| 6,743,541 B2 | 6/2004 | Chang et al. | |
| 6,766,817 B2 | 7/2004 | da Silva | |
| 6,918,404 B2 | 7/2005 | Dias da Silva | |
| 7,066,586 B2 | 6/2006 | da Silva | |
| 2002/0068213 A1 | 6/2002 | Kaiser | |
| 2002/0076597 A1 | 6/2002 | Chang et al. | |
| 2002/0114989 A1 | 8/2002 | Allen | 429/44 |
| 2003/0022051 A1 | 1/2003 | Haluzak | |
| 2003/0064265 A1 | 4/2003 | Hampden-Smith et al. | |
| 2003/0134172 A1 | 7/2003 | Grande et al. | |
| 2003/0170520 A1 | 9/2003 | Fujii et al. | |
| 2003/0180594 A1 | 9/2003 | Choi et al. | |
| 2003/0198849 A1 | 10/2003 | Hampden-Smith et al. | 429/30 |
| 2003/0198853 A1 | 10/2003 | Choi et al. | |
| 2003/0203263 A1 | 10/2003 | Brown et al. | |
| 2004/0053100 A1 | 3/2004 | Stanley et al. | |
| 2004/0058224 A1 | 3/2004 | Eshraghi et al. | 429/40 |
| 2004/0058227 A1 | 3/2004 | Tanaka et al. | |
| 2004/0068671 A1 | 4/2004 | Tanaka et al. | |
| 2004/0081878 A1 | 4/2004 | Mardilovich et al. | |
| 2004/0086776 A1 | 5/2004 | Muthuswamy et al. | |
| 2004/0220048 A1 | 11/2004 | Leban | |
| 2004/0229107 A1 | 11/2004 | Smedley | |
| 2004/0241526 A1 * | 12/2004 | Ikeda | 429/40 |
| 2005/0084736 A1 | 4/2005 | Chang et al. | |
| 2006/0051655 A1 | 3/2006 | Yoshitake et al. | |
| 2007/0224481 A1 * | 9/2007 | Suzuki et al. | 429/31 |
| 2008/0014495 A1 | 1/2008 | Saito et al. | |
| 2008/0107949 A1 | 5/2008 | Yoshie et al. | |
| 2009/0035638 A1 | 2/2009 | Tsai et al. | |
| 2010/0221633 A1 | 9/2010 | Fujita et al. | |

FOREIGN PATENT DOCUMENTS

| | | |
|---|---|---|
| JP | 61-121268 | 6/1986 |
| JP | 5-41239 | 2/1993 |
| JP | 05-144482 | 6/1993 |
| JP | 05-325983 | 12/1993 |
| JP | 06-020710 | 1/1994 |
| JP | 06-188008 | 7/1994 |
| JP | 8-162141 | 6/1996 |
| JP | 10-134829 | 5/1998 |
| JP | 10-134836 | 5/1998 |
| JP | 11-045729 | 2/1999 |
| JP | 2000-106201 | 4/2000 |
| JP | 2000-223136 | 8/2000 |
| JP | 2001-102070 | 4/2001 |
| JP | 2001-160406 | 6/2001 |
| JP | 2001-283892 | 10/2001 |
| JP | 2002-056855 | 2/2002 |
| JP | 2002-175817 | 6/2002 |
| JP | 2003-59509 | 2/2003 |
| JP | 2003-187810 | 7/2003 |
| JP | 2003-282131 | 10/2003 |
| JP | 2003-331899 | 11/2003 |
| JP | 2004-031026 | 1/2004 |
| JP | 2004-178849 | 6/2004 |
| JP | 2004-179140 | 6/2004 |
| JP | 2004-192950 | 7/2004 |
| JP | 2004-200064 | 7/2004 |
| JP | 2004-206885 | 7/2004 |
| JP | 2004-288400 | 10/2004 |
| JP | 2004-335466 | 11/2004 |
| JP | 2005-032600 | 2/2005 |
| JP | 2005-174872 | 6/2005 |
| JP | 2005-517273 | 6/2005 |
| JP | 2005-235519 | 9/2005 |
| JP | 2006-054082 | 2/2006 |
| JP | 2006-507625 | 3/2006 |
| JP | 2006-172944 | 6/2006 |
| JP | 2006-222099 | 8/2006 |
| JP | 2006-269126 | 10/2006 |
| JP | 2007-516559 | 6/2007 |
| JP | 2007-265650 | 10/2007 |
| JP | 2009-38009 | 2/2009 |
| WO | WO 02/080299 | 10/2002 |
| WO | WO 03/067693 | 8/2003 |
| WO | 2004/093231 A2 | 10/2004 |
| WO | WO 2009/017147 | 2/2009 |

OTHER PUBLICATIONS

Hirabayashi, et al., JP 2004-206885 (machine translation) Jul. 22, 2004.

International Search Report for PCT/JP2008/063644, mailed Oct. 7, 2008.

U.S. Appl. No. 11/661,801, Saito, K. et al., filed Sep. 12, 2005.

U.S. Appl. No. 11/806,663, Yoshie, T. et al., filed Jun. 1, 2007.

Office Action mailed Dec. 23, 2011, issued in U.S. Appl. No. 11/661,801.

Advisory Action mailed Jan. 27, 2012, issued in U.S. Appl. No. 11/806,663.

International Search Report for PCT/JP2005/016717 mailed Dec. 13, 2005 (English and Japanese).

Development and Application of Solid Polymer Electrolyte Fuel Cell, NTS Inc., p. 171 and partial translation.

Office Action mailed Dec. 2, 2009, for U.S. Appl. No. 11/661,801.

T. Fujita et al., "Development of high power density Fuel Cell stack", The 15$^{th}$ FCDIC Fuel Cell Symposium Proceedings, pp. 109-110, published on May 14, 2008, with English Translation.

Office Action mailed May 17, 2011, for U.S. Appl. No. 11/806,663.

Tomimatsu et al., JP 2000-106201 (machine translation) Apr. 11, 2000.

Office Action mailed May 24, 2010, for U.S. Appl. No. 11/661,801.

Office Action mailed Jun. 8, 2010, for U.S. Appl. No. 11/661,801.

Office Action mailed Sep. 8, 2010, for U.S. Appl. No. 11/661,801.

Advisory Action in related U.S. Appl. No. 11/661,801; Notification Date of Sep. 14, 2012; 3 pgs.

Final Office Action mailed Oct. 18, 2011, issued in co-pending U.S. Appl. No. 11/806,663.

International Search Report for PCT/JP2010/055932, mailed Jul. 13, 2010.

Fujita, O.T. et al., "Development of high power density Fuel Cell stack", The Fuel Cell Symposium Lecture Proceedings, p. 109-110, along with English Translation.

* cited by examiner

FIG.3
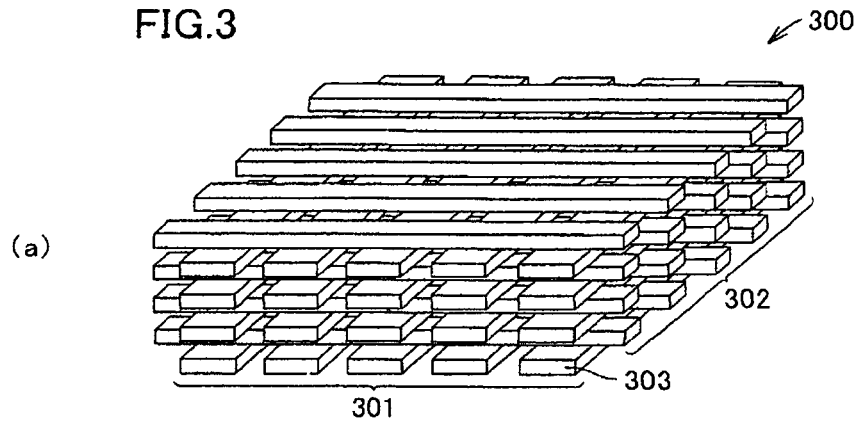
(a)
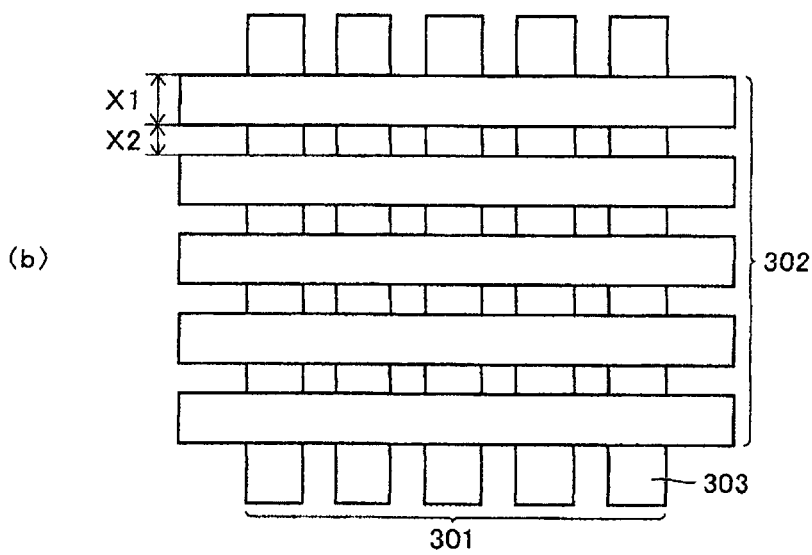
(b)
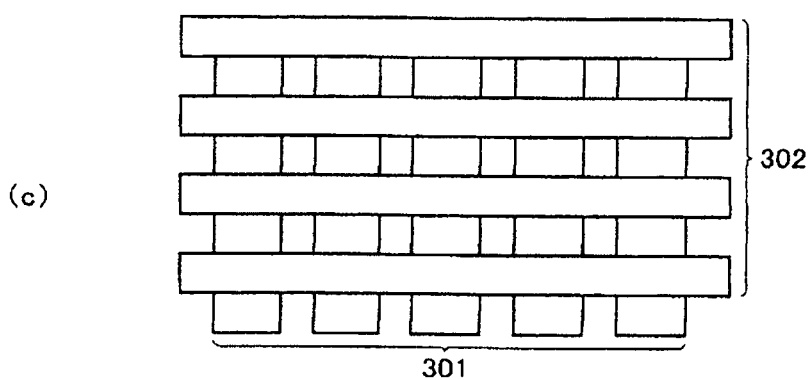
(c)

FIG.11
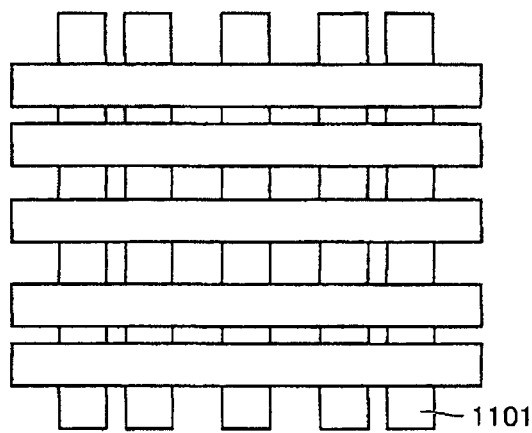
(a)
1101
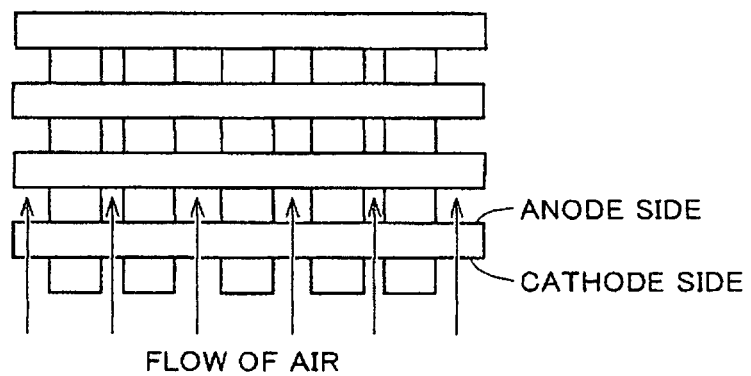
(b)
ANODE SIDE
CATHODE SIDE
FLOW OF AIR

FIG.13
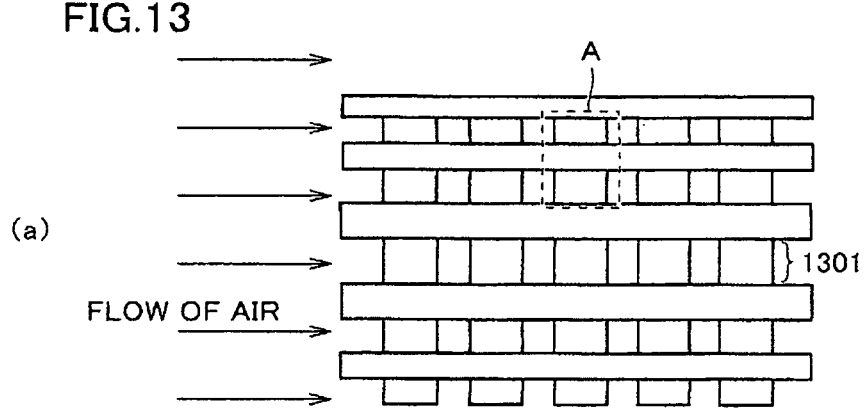
(a) FLOW OF AIR
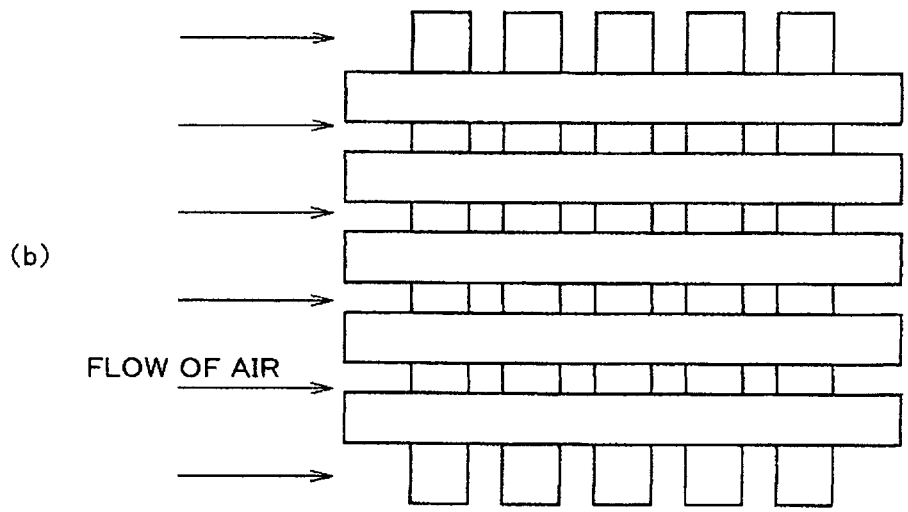
(b) FLOW OF AIR

FIG.16
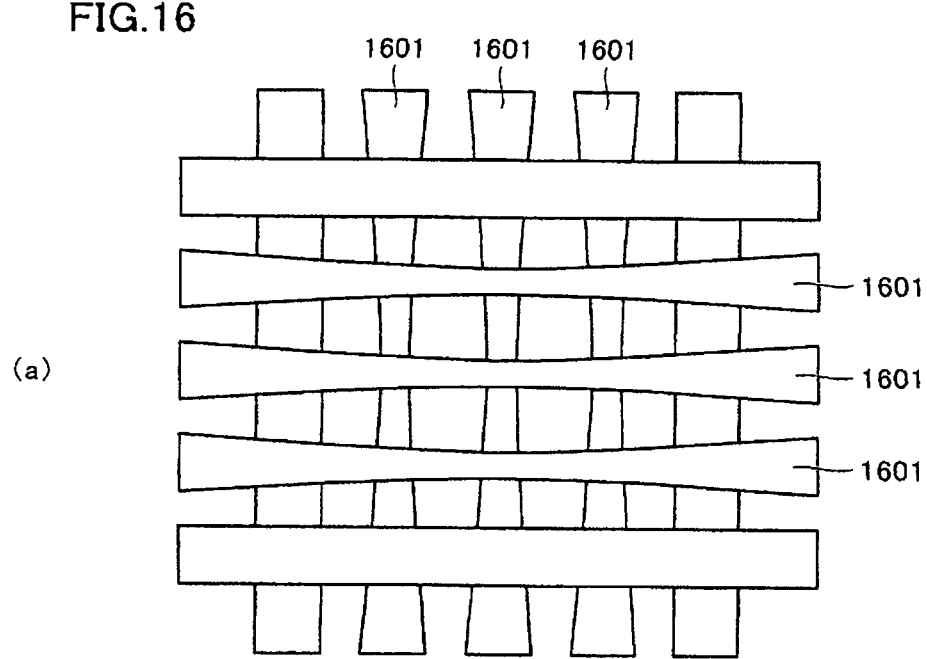
(a)
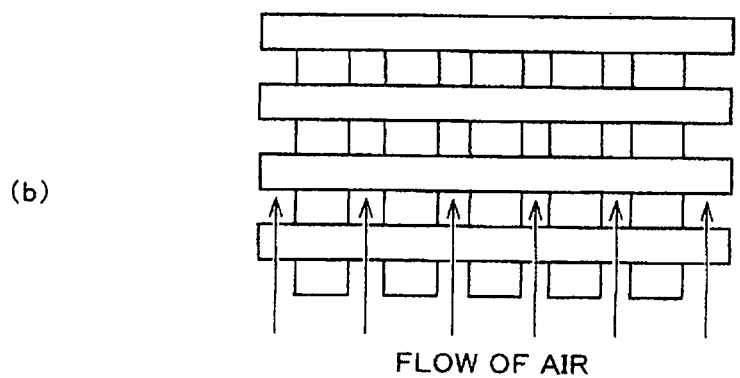
(b)
FLOW OF AIR

FIG.18
(a) 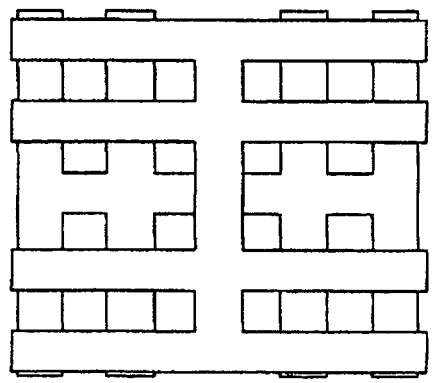
(b) 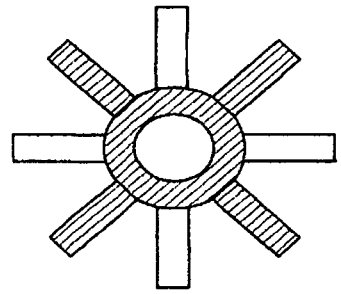
(c) 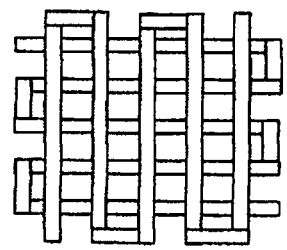

FIG.32
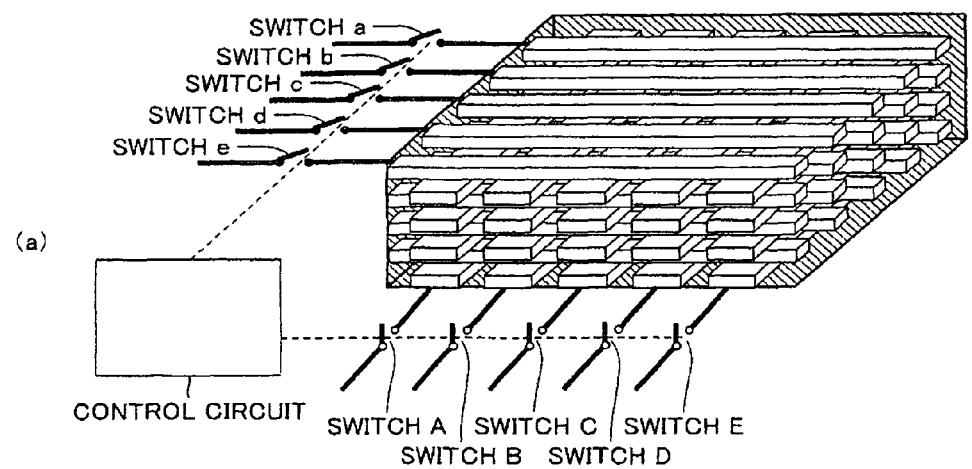
(a)
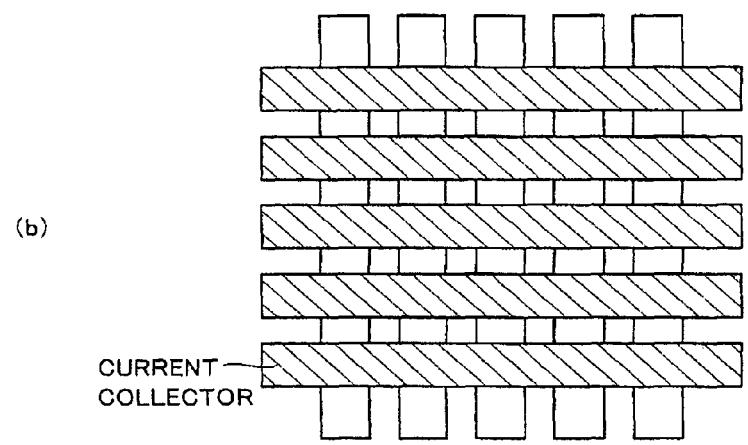
(b)
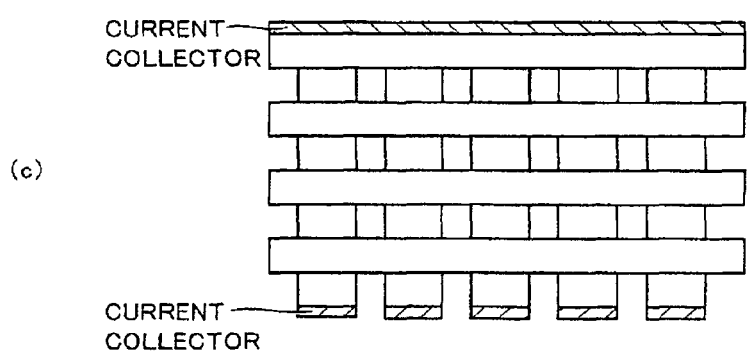
(c)

FIG.33
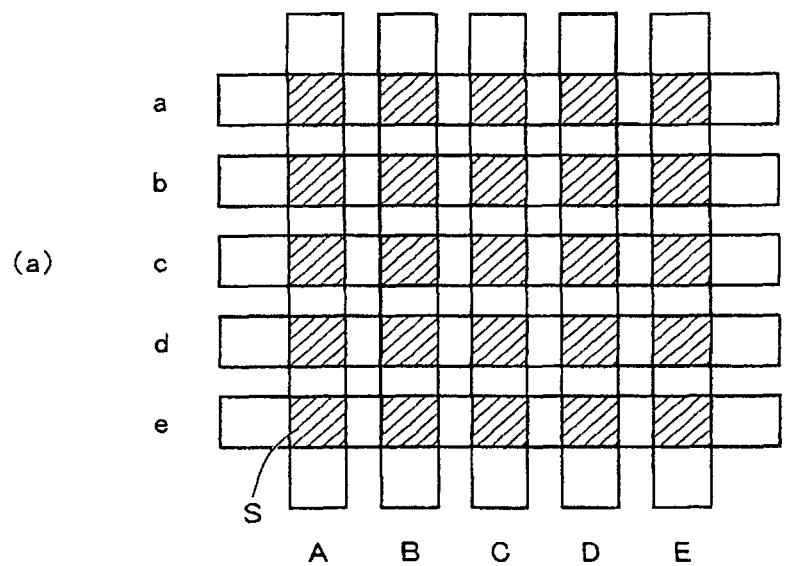
(a)
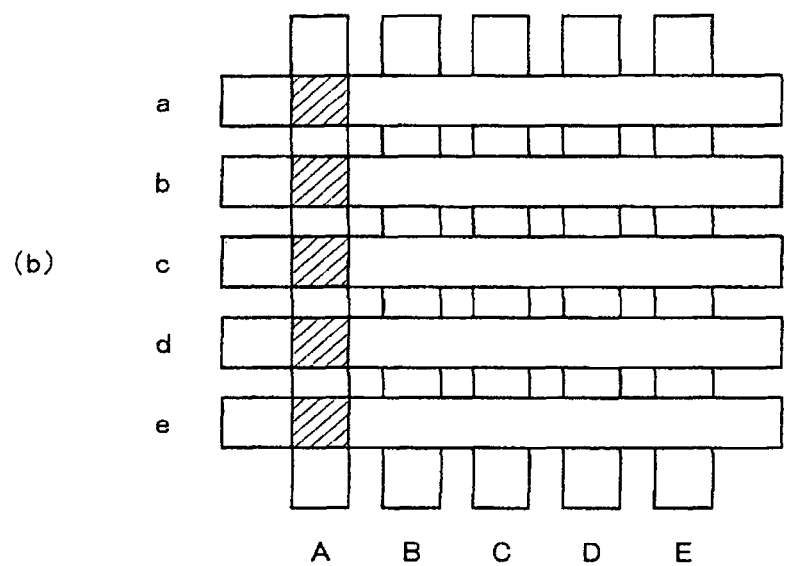
(b)

FIG.35
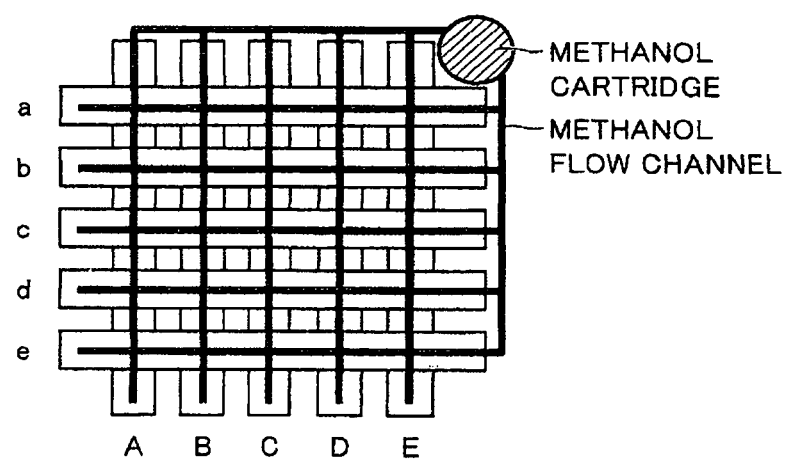
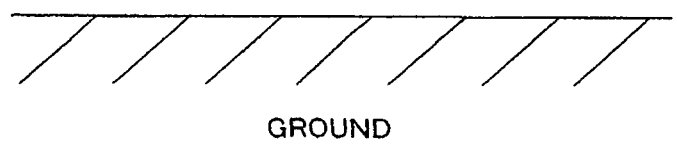
GROUND

FIG.42
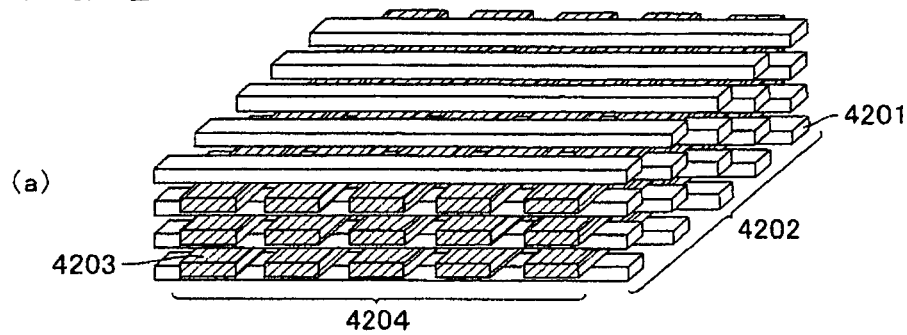
(a)
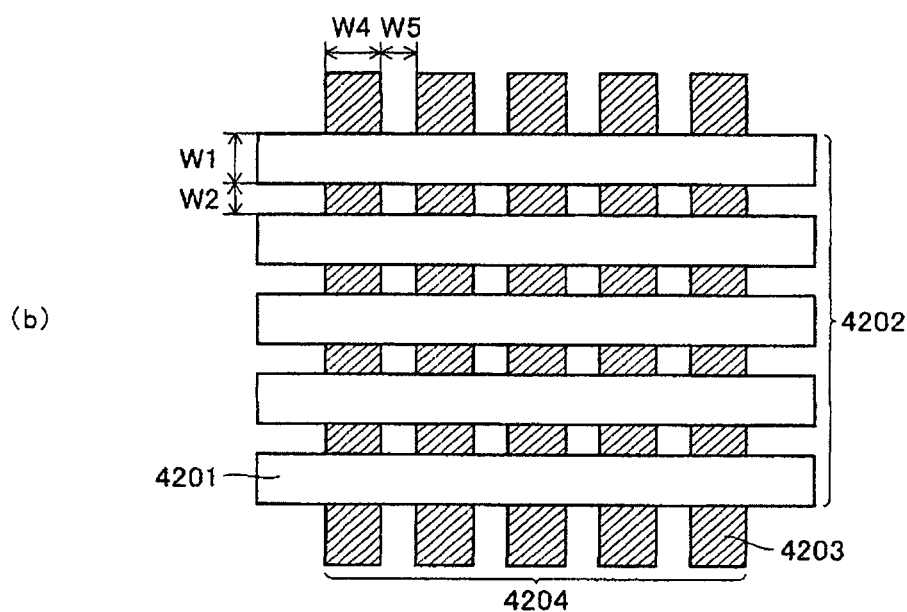
(b)
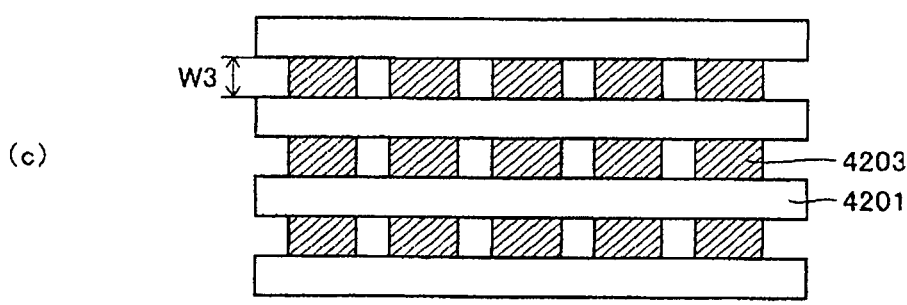
(c)

FIG.44
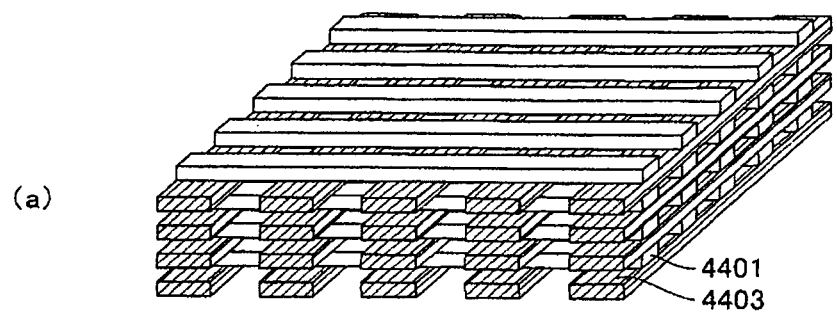
(a)
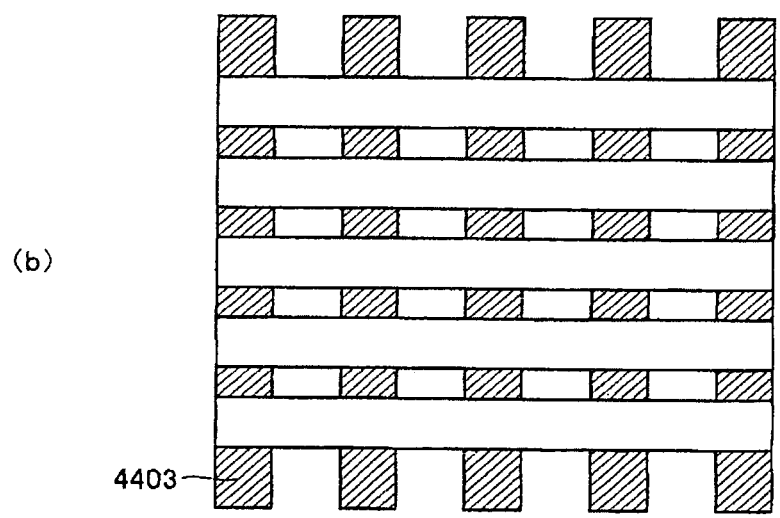
(b)
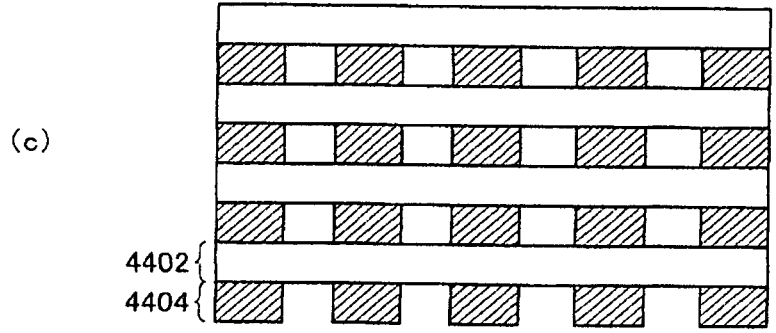
(c)

FIG.45
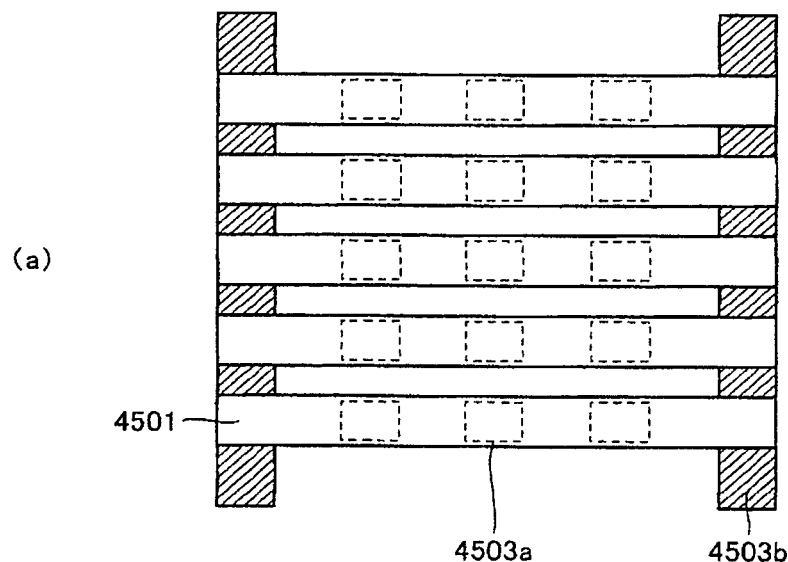
(a)
4501
4503a  4503b
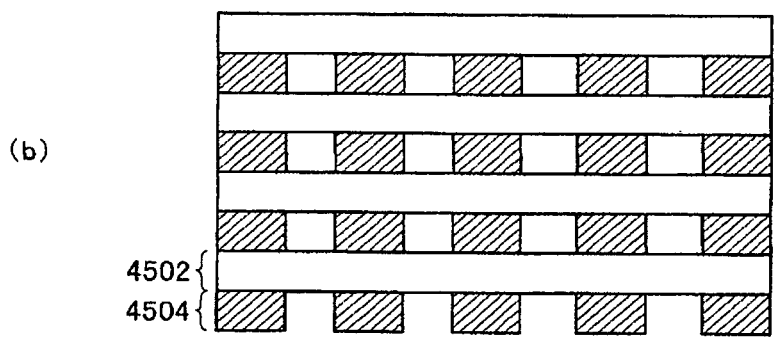
(b)
4502
4504

FIG.47
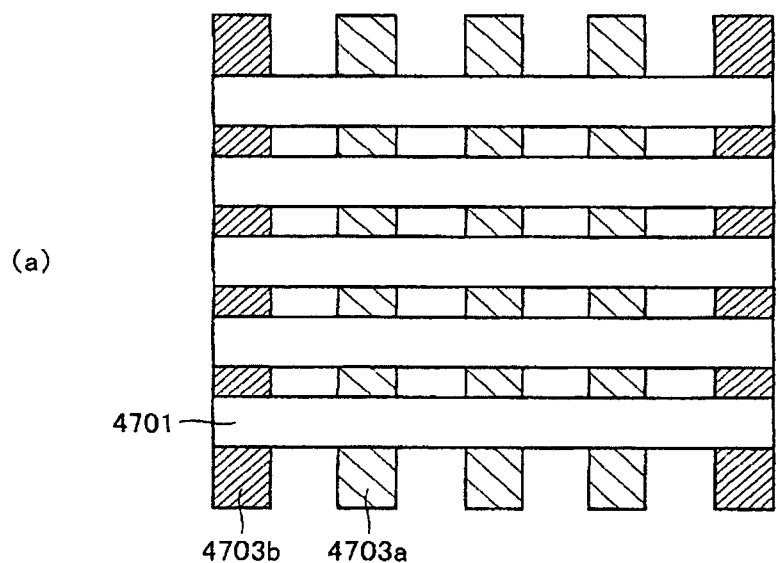
(a)
4701
4703b 4703a
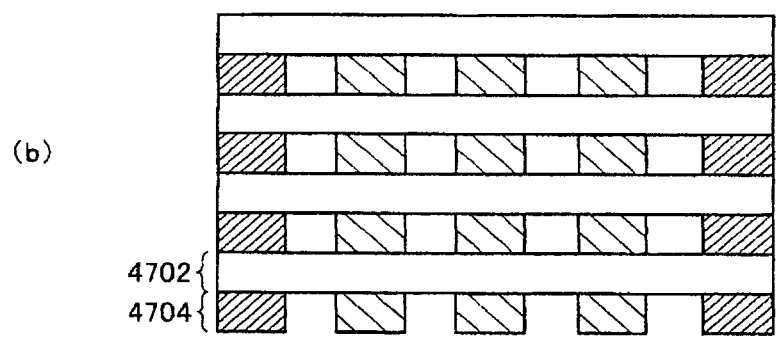
(b)
4702
4704

FIG.48
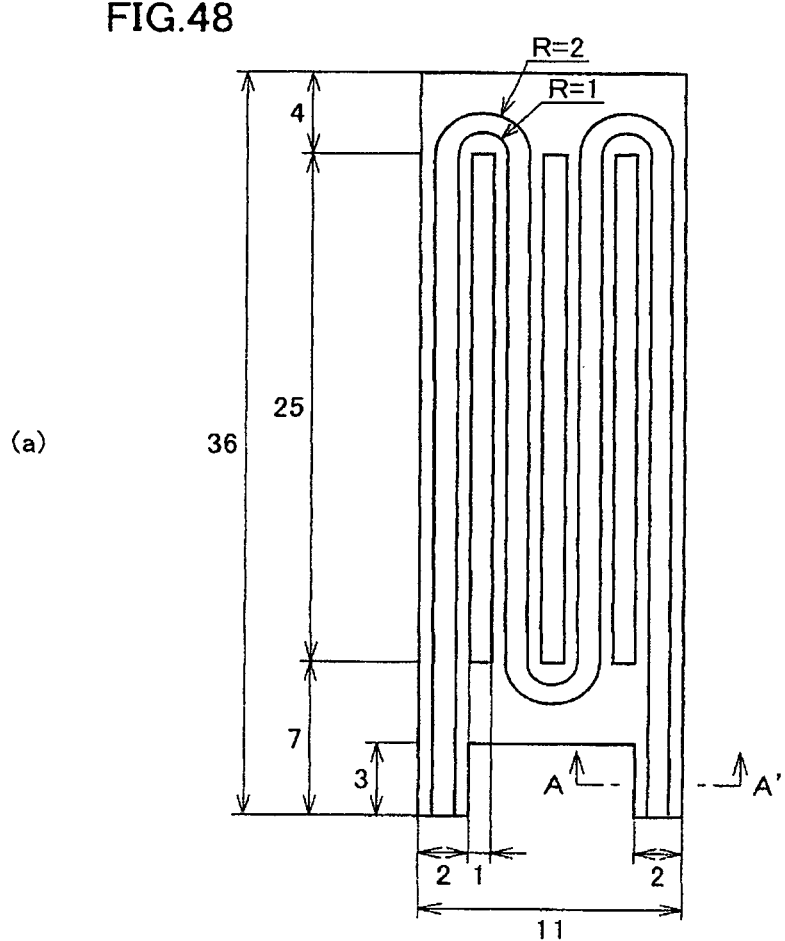
(a)
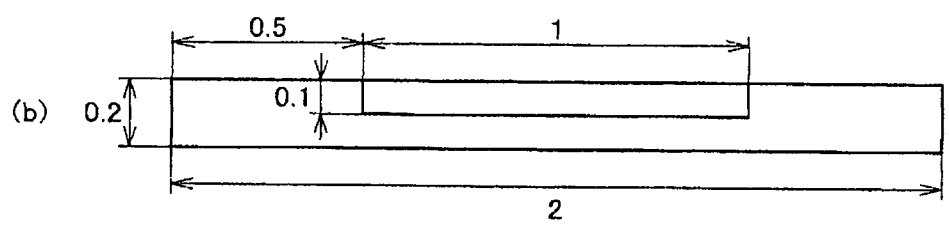
(b)

FIG.49
(a) 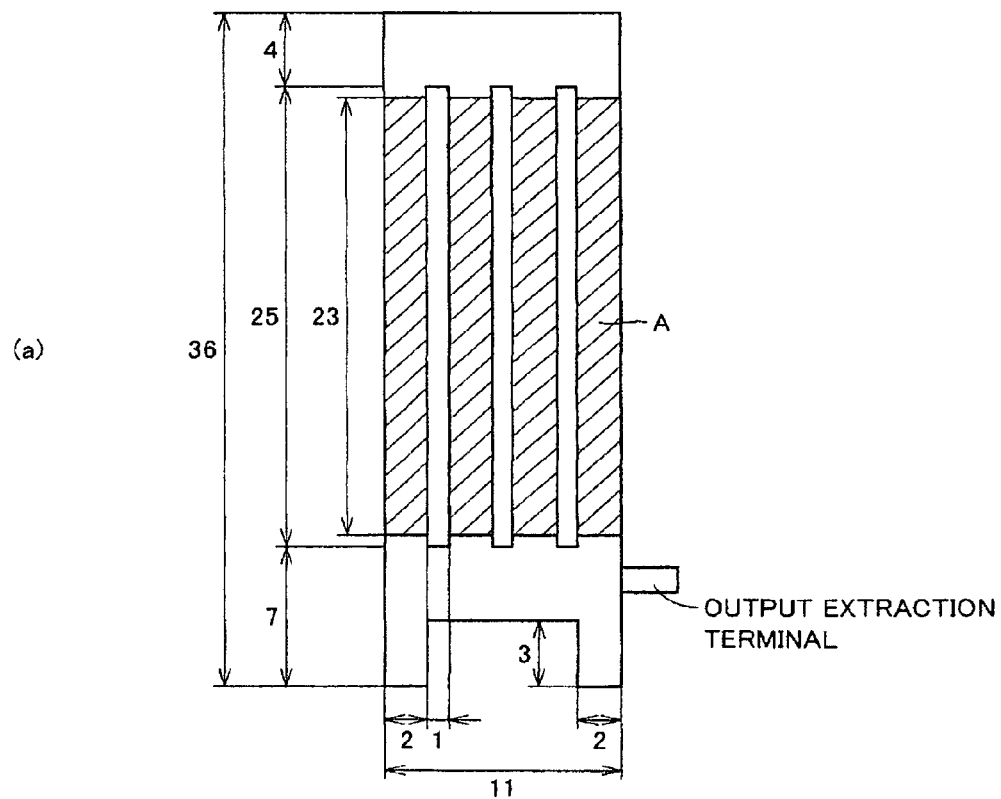
(b) 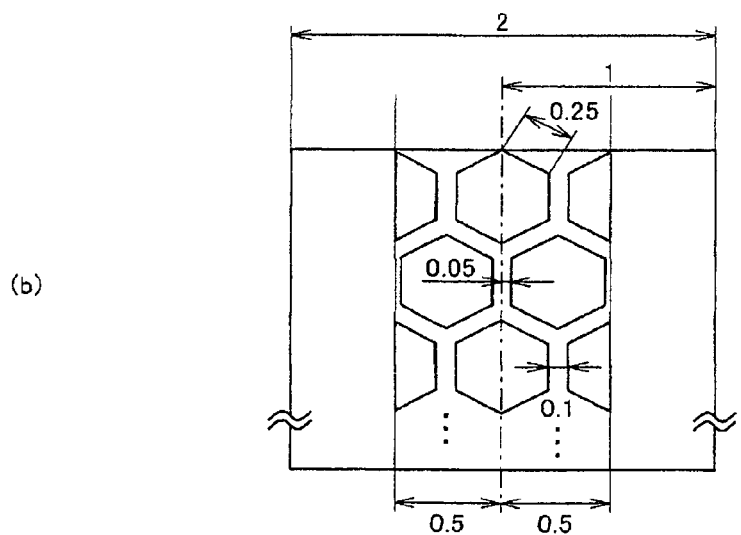

FIG.54
UPPER TWO-DIMENSIONAL STACK
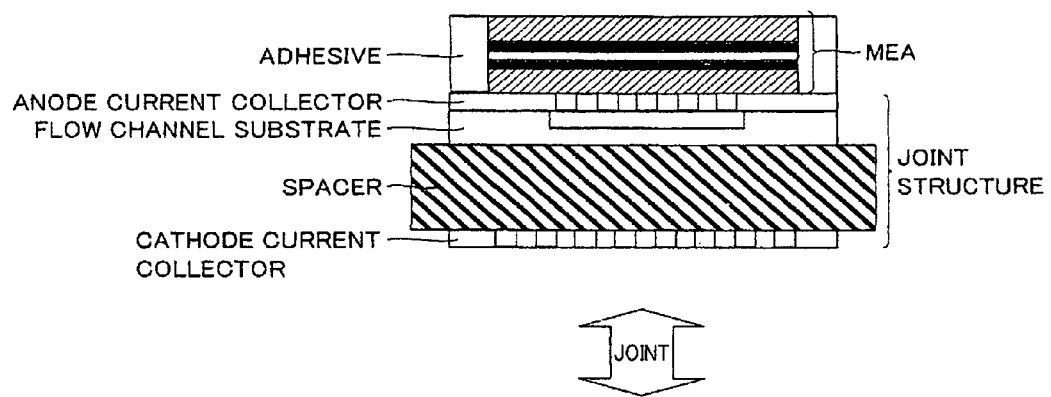
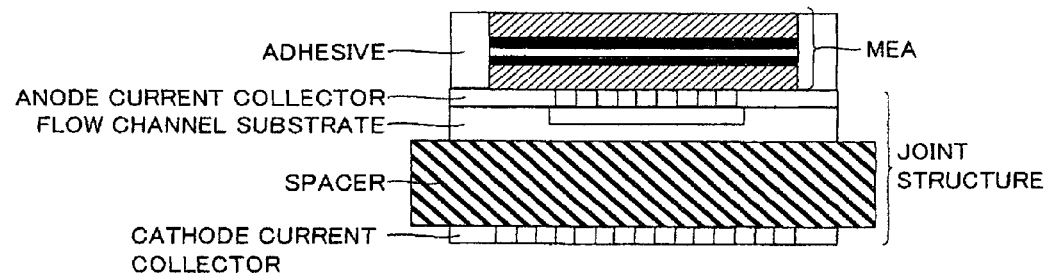
LOWER TWO-DIMENSIONAL STACK FIG.58
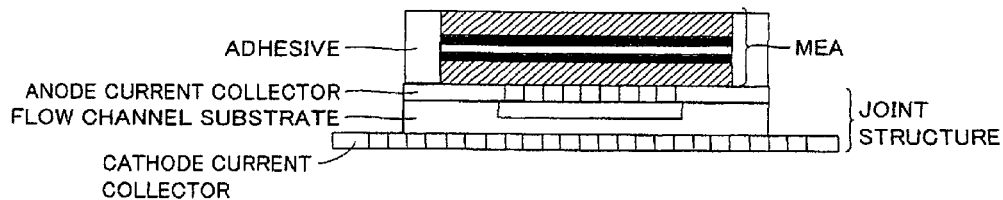
FIG.59
UPPER TWO-DIMENSIONAL STACK
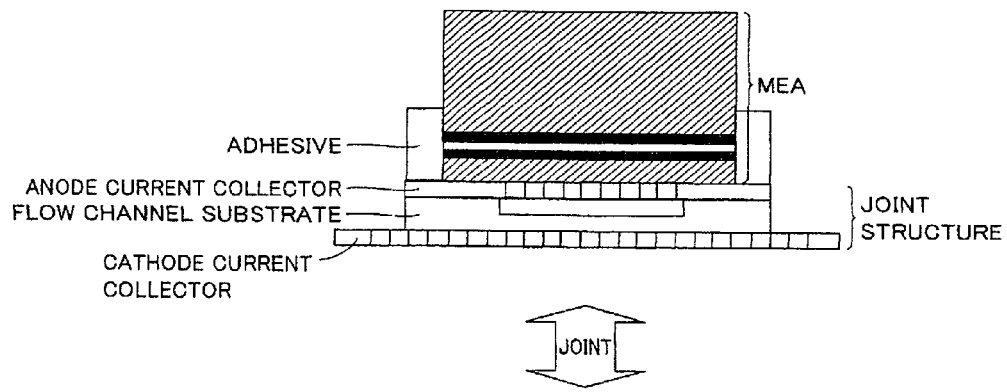
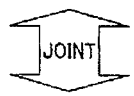
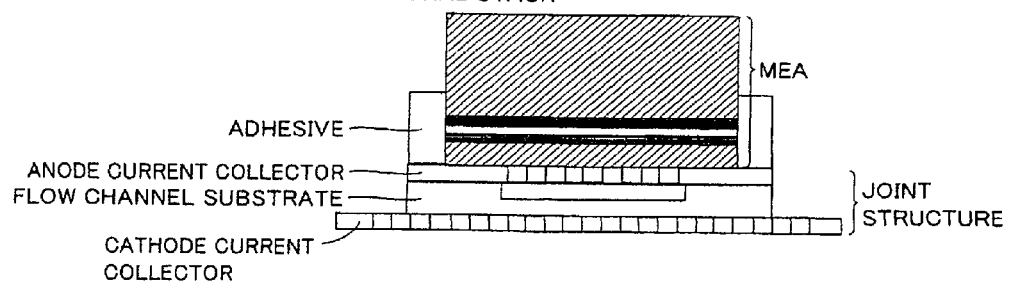
LOWER TWO-DIMENSIONAL STACK FIG.63
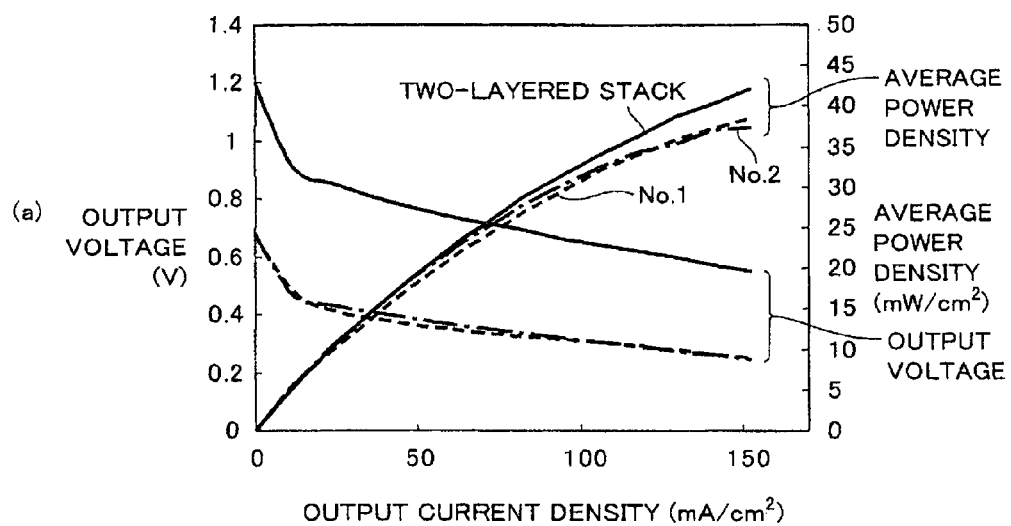
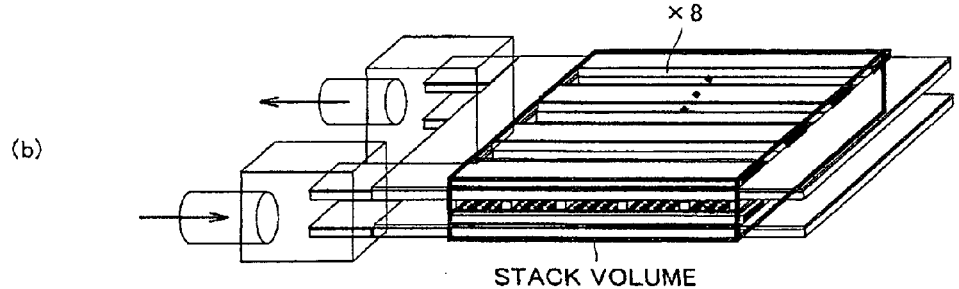

FIG.64
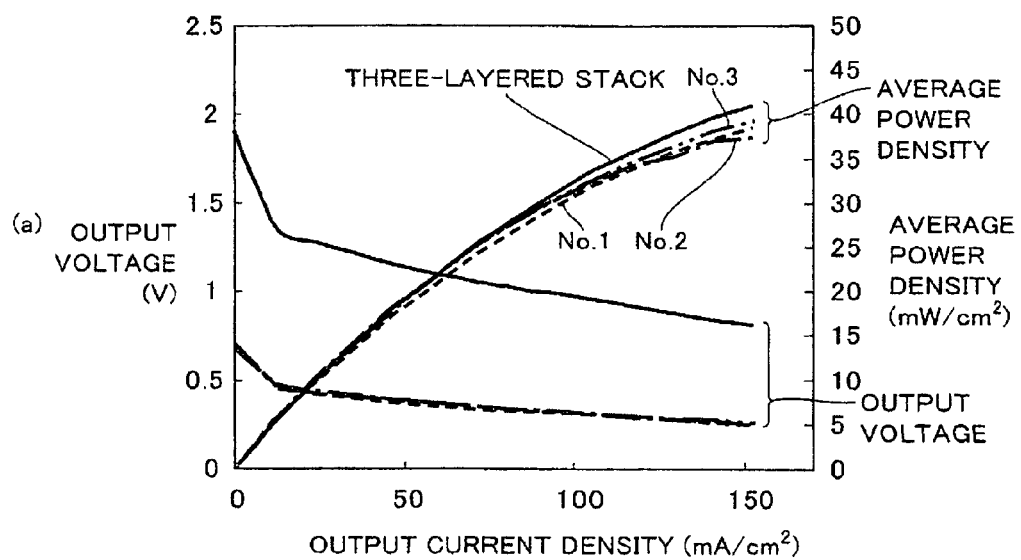
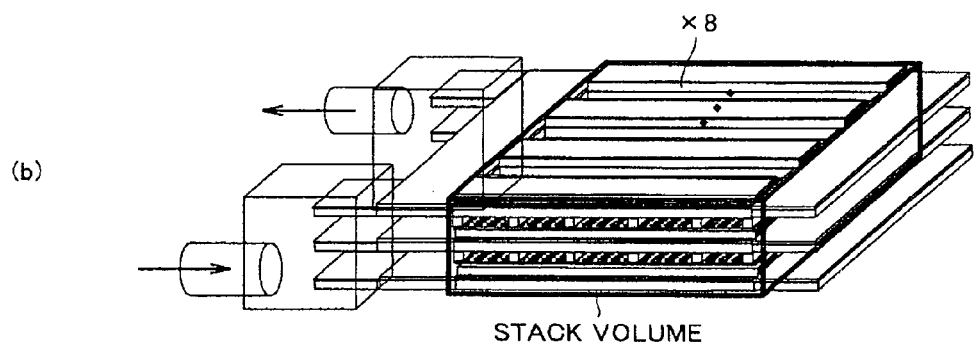

CELL THICKNESS x: 0.7mm
STACK VOLUME

| CELL INTERVAL d | 1mm | 2mm | 3mm | 4mm |
|---|---|---|---|---|
| OUTPUT (mW) | 200 | 270 | 336 | 380 |
| STACK VOLUME (cm$^3$) | 1.2 | 1.7 | 2.2 | 2.7 |
| MAXIMUM VOLUME POWER DENSITY (W/L) | 167 | 159 | 153 | 140 |

ELECTROLYTE MEMBRANE

ELECTROLYTE MEMBRANE

ELECTROLYTE MEMBRANE

FUEL CELL STACK AND FUEL CELL SYSTEM

This application is the U.S. national phase of International Application No. PCT/JP2008/063644 filed 30 Jul. 2008, which designated the U.S. and claims priority to JP Application No. 2007-202146 filed 2 Aug. 2007; JP Application No. 2008-087571 filed 28 Mar. 2008; and JP Application No. 2008-126377 filed 13 May 2008, the entire contents of each of which are hereby incorporated by reference.

TECHNICAL FIELD

The present invention relates to a fuel cell stack and a fuel cell system including the fuel cell stack.

BACKGROUND ART

Expectations for a fuel cell as a power supply for portable electronic devices supporting the information-oriented society have recently been growing from a point of view of high power generation efficiency and high energy density as a stand-alone power generation apparatus. The fuel cell generates electric power through such reaction as electrochemical oxidization of a reducing agent (such as hydrogen, methanol, ethanol, hydrazine, formalin, and formic acid) at an anode electrode and electrochemical reduction of an oxidizing agent (such as oxygen in air) at a cathode electrode.

The fuel cell, however, suffers a problem of low power density per volume. In seeking for a fuel cell having a smaller size and lighter weight, a fuel cell achieving high power density has been desired.

In general, except for a high-temperature fuel cell such as a molten carbonate cell, such conventional fuel cells as a polymer electrolyte fuel cell, a solid oxide fuel cell, a direct methanol fuel cell, and an alkaline fuel cell are based on a unit cell as a constituent unit, that has a planar structure obtained by stacking an anode separator in which an anode flow channel for supplying a reducing agent is formed, an anode current collector for collecting electrons from an anode catalyst layer, an anode gas diffusion layer, an anode catalyst layer, an electrolyte membrane, a cathode catalyst layer, a cathode gas diffusion layer, a cathode current collector for feeding electrons to the cathode catalyst layer, and a cathode separator in which a cathode flow channel for supplying an oxidizing agent is formed in this order. Each unit cell produces a high current with a low voltage.

In addition, it is also general to provide the anode separator and the cathode separator not only with a role to supply the reducing agent and the oxidizing agent separately to the anode catalyst layer and the cathode catalyst layer respectively but also with a role as the anode current collector and the cathode current collector respectively, by employing an electrically conductive material as a material for these separators.

Normally, as individual unit cells are low in voltage, a fuel cell is formed as a fuel cell stack in which a plurality of unit cells are stacked to be able to output a high voltage. Here, the plurality of unit cells are stacked such that the anode electrode of a unit cell is electrically in contact with the cathode electrode of a unit cell adjacent thereto.

In such a layered fuel cell stack, intimate electrical contact between the layers should be maintained. If contact resistance becomes high, internal resistance of the fuel cell becomes high and overall power generation efficiency is lowered. In addition, the fuel cell stack usually includes a sealing material for sealing each of the reducing agent and the oxidizing agent in each separator, and each layer should be pressed with quite strong force in order to ensure sealing performance and electrical conductivity. Accordingly, fastening members for pressing each layer such as a presser, a bolt and a nut have been required, which resulted in a large and heavy fuel cell stack and low power density.

Further, as each separator requires a flow channel for uniformly supplying the reducing agent or the oxidizing agent to each unit cell all over a plane of the catalyst layer, the separator is large in thickness, which caused lower power density. If the flow channel in the separator is narrowed to make the thickness of the separator smaller, pressure loss becomes greater. Then, it is inevitable to use large auxiliary equipment such as a pump or a fan for supplying the reducing agent and the oxidizing agent, and in addition, power consumption by the auxiliary equipment also increases. Consequently, power density of a fuel cell system as a whole is lowered.

In order to solve such problems, improvement in power density of a fuel cell by increasing density in a power generation area, that is, a power generation area included in a unit volume of the fuel cell, has been aimed. For example, WO03/067693 (Patent Document 1) discloses a fuel cell layer, in which functions of a gas diffusion layer, a catalyst layer and an electrolyte layer are integrated into a single substrate, and proposes a fuel cell constituted of a smaller number of parts than in a conventional fuel cell or fuel cell stack having a layered planar structure.

More specifically, the fuel cell layer described in Patent Document 1 is connected to an external load with a fuel plenum, an oxidizing agent plenum, and a porous substrate communicating with the fuel plenum and the oxidizing agent plenum. The fuel call layer also has a porous substrate and numerous fuel cells formed using the porous substrate. Each fuel cell has a distinct channel, a first catalyst layer disposed on the first channel wall, a second catalyst layer disposed on the second channel wall, an anode formed from the first catalyst layer and an cathode formed from the second catalyst layer, and an electrolyte disposed in the distinct channel to prevent transfer of fuel to the cathode and to prevent transfer of oxidizing agent to the anode. The fuel cell also has a first coating disposed on at least a portion of the porous substrate to prevent fuel from entering a portion of the porous substrate, a second coating disposed on at least a portion of the porous substrate to prevent oxidizing agent from entering a portion of the porous substrate, a first sealant barrier disposed on the first side, a second sealant barrier disposed on the second side, a third sealant barrier disposed between the fuel cells, a positive electrical connection disposed on the first side, and a negative electrical connection disposed on the second side.

When a plurality of microscopically dimensioned fuel cells are formed within a single substrate, higher overall power densities can be achieved. In addition, as the multiple fuel cells within the single substrate can be formed in parallel, fuel cells of high capacity can be constructed. The combination of fuel cells within a single substrate minimizes the reliance on externally applied seals and clamps. A number of variations of the fuel cell layer are envisioned. Examples of the variations include having the fuel and oxidizing agent plenums dead-ended, having the fuel cell layer enclosing a volume, having the porous substrate in a non-planar, or alternately planar, configuration and having the fuel cell layer enclose a volume in a cylindrical shape.

The fuel cell layer described in Patent Document 1, however, requires separation between the oxidizing agent and the reducing agent for each of a surface and a rear surface of the fuel cell layer. In addition, in any fuel cell stack structure described in Patent Document 1, the fuel and the oxidizing agent should be supplied to the fuel cell layer in an in-plane direction. In a case where three or more fuel cell layers are stacked in a direction of layer thickness, the fuel plenum or the oxidizing agent plenum should be provided in order to supply the fuel and the oxidizing agent, which requires a prescribed interval (gap) between the fuel cell layers. Further, as the fuel plenum or the oxidizing agent plenum provided between the fuel cell layers should be sealed, a fastening member is required for ensuring sealing performance of a sealing material. Moreover, as supply and exhaust of the fuel and the oxidizing agent to the fuel cell layer in the in-plane direction is restricted, it is difficult to supply the fuel and the oxidizing agent through natural convection. In particular, as supply of air representing the oxidizing agent is difficult, auxiliary equipment requiring motive power such as a fan or a pump is required.

Namely, a fuel cell structure described in Patent Document 1 has suffered a problem of low power density when a stack structure in which fuel cell layers are stacked in a direction of layer thickness responds to demands for high output power on an equipment side. Meanwhile, when a stack structure in which fuel cell layers are stacked in an in-plane direction of the fuel cell layer responds to demands for high output power on an equipment side, arrangement of fuel cells on the equipment side and design of a mechanism thereof are much restricted, because the fuel cell layers require a large area in the in-plane direction.

Japanese Patent Laying-Open No. 5-41239 (Patent Document 2) discloses a high-temperature fuel cell module in which at least two stacks formed by stacking a plurality of cells constituted of an anode, a solid electrolyte, a cathode, and a ceramic separator form a part or the entirety of a manifold. According to such a configuration, effective use of an electrode area can be made and cost reduction can be achieved because the manifold can be formed with a simplified structure.

A fuel cell stack described in Patent Document 2, however, cannot three-dimensionally supply the fuel or the oxidizing agent into the fuel cell stack, as in the case of Patent Document 1 above. Therefore, such auxiliary equipment as a pump or a fan for supplying the fuel or the oxidizing agent at quite a flow rate is required, which results in a large-sized fuel cell system and increase in power consumption by the auxiliary equipment and hence low power density.

Patent Document 1: WO03/067693
Patent Document 2: Japanese Patent Laying-Open No. 5-41239

DISCLOSURE OF THE INVENTION

Problems to be Solved by the Invention

The present invention was made to solve the above-described problems, and an object of the present invention is to provide a fuel cell stack highly integrated in three-dimension, that is excellent in fuel or oxidizing agent supply performance and capable of supplying the fuel or the oxidizing agent without using auxiliary equipment or with low power consumption by the auxiliary equipment and achieving high power density, as well as to provide a fuel cell system including the same.

Means for Solving the Problems

The present invention provides a fuel cell stack including two or more stacked fuel cell layers each constituted of one or more unit cell, any two fuel cell layers adjacent to each other each having one or more gap region, at least a part of the gap region in one fuel cell layer of any two fuel cell layers adjacent to each other being in contact with the unit cell constituting the other fuel cell layer, and the gap region in one fuel cell layer communicating with the gap region in the other fuel cell layer.

The gap region in one fuel cell layer and the gap region in the other fuel cell layer are preferably formed in different portions, when viewed in a direction of stack of the fuel cell layers. In addition, all gap regions in the fuel cell stack preferably communicate with one another.

The fuel cell layer preferably includes a portion having a shape elongated in a longitudinal direction within the fuel cell layer.

Any two fuel cell layers adjacent to each other described above are stacked such that the unit cell constituting one fuel cell layer preferably intersects with, and further preferably is orthogonal to, the unit cell constituting the other fuel cell layer.

In the fuel cell stack according to the present invention, preferably, at least one fuel cell layer of the fuel cell layers in the fuel cell stack has a plurality of unit cells, and the plurality of unit cells each have a shape elongated in a longitudinal direction within the fuel cell layer.

The fuel cell stack according to the present invention may have a spacer layer between any two fuel cell layers adjacent to each other described above, or at least one fuel cell layer may be replaced with a spacer layer.

The spacer layer is preferably electrically conductive, and is preferably formed of a porous body.

In addition, the fuel cell stack according to the present invention may have current collectors at respective opposing ends thereof in a direction of stack of the fuel cell layers.

In the fuel cell stack according to the present invention above, the unit cell is preferably a direct methanol fuel cell.

In addition, the present invention provides a fuel cell system including the fuel cell stack described in any part above and auxiliary equipment for promoting flow of air into the fuel cell stack, and provides a fuel cell system including the fuel cell stack described in any part above, a switch circuit electrically connected to the current collectors, and a control circuit for controlling the switch circuit.

Moreover, the present invention provides a fuel cell stack including at least one fuel cell layer constituted of one or more unit cell and at least one spacer layer constituted of one or more spacer as stacked, at least one fuel cell layer and/or at least one spacer layer having a gap region in the layer.

The fuel cell layer and the spacer layer are preferably alternately stacked.

Such a fuel cell stack according to the present invention preferably includes at least one fuel cell layer in which two or more unit cells are arranged such that a gap region is provided therebetween and/or at least one spacer layer in which two or more spacers are arranged such that a gap region is provided therebetween.

In addition, preferably, such a fuel cell stack according to the present invention at least includes a fuel cell layer in which two or more unit cells are arranged such that a gap region is provided therebetween and a spacer layer stacked on the fuel cell layer, in which two or inure spacers are arranged such that a gap region is provided therebetween, the gap region in the fuel cell layer communicating with the gap region in the spacer layer.

The spacer constituting the spacer layer described above is preferably arranged to intersect with the unit cell constituting the fuel cell layer.

Preferably, such a fuel cell stack according to the present invention at least includes the fuel cell layer (A), the spacer layer, and the fuel cell layer (B) in this order, and two or more unit cells (b) in the fuel cell layer (B) are arranged in a region directly on or directly under the unit cells (a) in the fuel cell layer (A), respectively. Alternatively, preferably, such a fuel cell stack according to the present invention at least includes the fuel cell layer (A), the spacer layer, and the fuel cell layer (B) in this order, and two or more unit cells (b) in the fuel cell layer (B) are arranged directly above or directly under the gap regions in the fuel cell layer (A), respectively.

In addition, preferably, the fuel cell stack according to the present invention at least includes the fuel cell layer (A), the spacer layer, and the fuel cell layer (B) in this order, and the spacers arranged at respective opposing ends among two or more spacers constituting the spacer layer are arranged in contact with end portions in a longitudinal direction of the unit cells (a) in the fuel cell layer (A) and the unit cells (b) in the fuel cell layer (B).

Preferably, the two or more unit cells constituting the fuel cell layer are arranged substantially in parallel such that a gap region is provided therebetween, and the two or more spacers constituting the spacer layer are arranged substantially in parallel such that a gap region is provided therebetween.

At least any of the unit cell and the spacer constituting the fuel cell stack is preferably in a shape of an elongated strip.

The spacer layer described above may be constituted of two or more spacers including a spacer formed of a porous body and a spacer formed of a non-porous body. In this case, at least spacers arranged at respective opposing ends of the spacer layer among the two or more spacers are preferably formed of a non-porous body. In addition, the spacer layer preferably includes at least one spacer having a hydrophilic surface.

In such a fuel cell stack according to the present invention, the unit cell is preferably a direct methanol fuel cell or a polymer electrolyte fuel cell.

Effects of the Invention

According to the fuel cell stack having such a structure that the unit cells are three-dimensionally stacked and the fuel cell system to which this fuel cell stack is applied in the present invention, the fuel or the oxidizing agent can be supplied without using auxiliary equipment or with low power consumption by the auxiliary equipment and high power density can be achieved. In addition, the present invention can provide the fuel cell stack and the fuel cell system achieving a smaller size, lower cost and higher power density, free from fastening members such as a presser, a bolt and a nut.

BRIEF DESCRIPTION OF THE DRAWINGS

FIG. 3 is a schematic diagram showing another preferred example of the fuel cell stack according to the present invention.

FIG. 11 is a schematic diagram showing another preferred example of the fuel cell stack according to the present invention.

FIG. 13 is a schematic diagram showing another preferred example of the fuel cell stack according to the present invention.

FIG. 16 is a schematic diagram showing another preferred example of the fuel cell stack according to the present invention.

FIG. 18 is a top view showing another preferred example of the fuel cell stack according to the present invention.

FIG. 32 is a schematic diagram showing a preferred example of a fuel cell system according to the present invention.

FIG. 33 is a schematic diagram showing a manner of controlling the fuel cell system according to the present invention.

FIG. 35 is a schematic diagram showing a manner of controlling the fuel cell system according to the present invention.

FIG. 42 is a schematic diagram showing a preferred example of the fuel cell stack having the spacer layer.

FIG. 44 is a schematic diagram showing another preferred example of the fuel cell stack having the spacer layer.

FIG. 45 is a schematic diagram showing another preferred example of the fuel cell stack having the spacer layer.

FIG. 47 is a schematic diagram showing another preferred example of the fuel cell stack having the spacer layer, FIG. 47(*a*) being a top view thereof and FIG. 47(*b*) being a side view.

FIG. 48 is a top view and a cross-sectional view showing a shape of a flow channel substrate fabricated in Example 3.

FIG. 49 is a top view and an enlarged view showing a shape of an anode current collector fabricated in Example 3.

FIG. 54 is a cross-sectional view showing joint between two-dimensional stacks in Example 3.

FIG. 58 is a cross-sectional view of a two-dimensional stack, in which an adhesive is applied to an MEA end portion obtained in Example 4.

FIG. 59 is a cross-sectional view showing joint between two-dimensional stacks in Example 5.

FIG. 63 is a graph showing a current-voltage characteristic and a characteristic of current-power density on average of samples No. 1 and No. 2 and a two-layered stack obtained by stacking samples No. 1 and No. 2.

FIG. 64 is a graph showing a current-voltage characteristic and a current-power density characteristic of samples No. 1, No. 2 and No. 3 and a three-layered stack obtained by stacking samples No. 1, No. 2 and No. 3.

Figure 1:
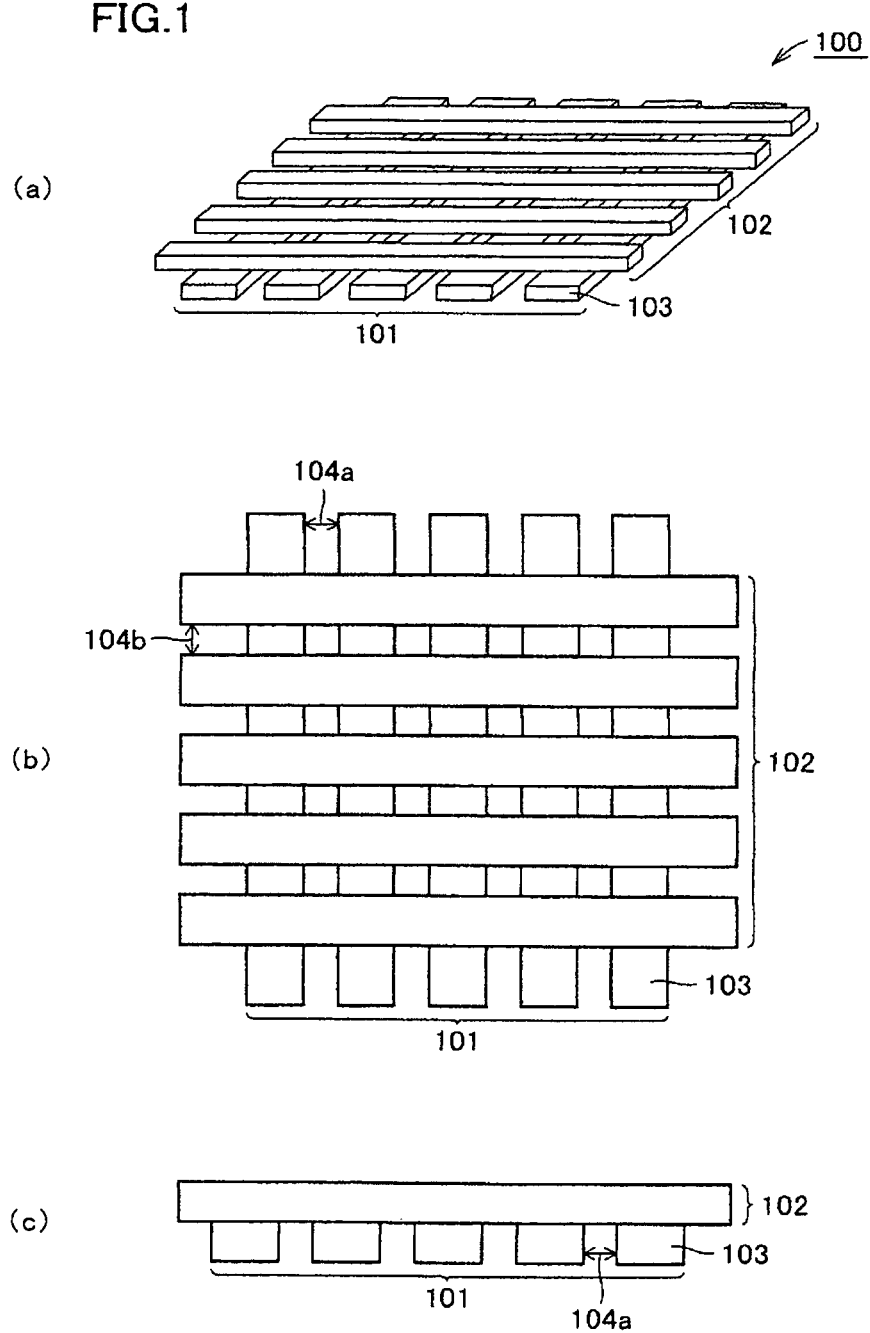
FIG. 1 is a schematic diagram showing a preferred example of a fuel cell stack according to the present invention.

DESCRIPTION OF THE REFERENCE SIGNS 100, 300 fuel cell stack; 101, 301, 501, 701, 801, 901 first fuel cell layer; 102, 302, 502, 702, 802, 902 second fuel cell layer; 103, 303, 401, 601, 703, 803, 903, 1101, 1601, 1701, 1901, 4101, 4201, 4301, 4401, 4501, 4701 unit cell; 104*a*, 104*b* gap region; 201, 403, 507, 604, 706, 806, 907, 1403, 1503, 2001, 2201, 2301, 2401, 2501, 2601, 2701, 2801, 4001, 4305, 4601 electrolyte membrane; 202, 402, 508, 603, 705, 805, 906, 1402, 1502, 2002, 2202, 2302, 2402, 2502, 2602, 2702, 2802 anode catalyst layer; 203, 404, 506, 605, 707, 807, 908, 1404, 1504, 2003, 2203, 2303, 2403, 2503, 2603, 2703, 2803 cathode catalyst layer; 204, 509, 602, 704, 804, 905, 1401, 1501, 2004, 2204, 2304, 2404, 2504, 2604, 2704, 2804 anode conductive porous layer; 205, 505, 606, 708, 808, 909, 1405, 1505, 1506a, 1506b, 2005, 2205, 2305, 2405, 2505, 2605, 2705, 2805 cathode conductive porous layer; 206, 910, 1406, 2006, 2306, 2406, 2506, 2606, 2706, 2806 fuel flow channel; 503 first unit cell; 904 separator; 1702 branch portion; 2008 cathode current collector; 2009 anode current collector; 208, 2206, 2407, 2507, 2607, 2809 hydrophilic layer; 210, 2207 gas-liquid separation layer; 207, 1407, 2007, 2208, 2307, 2408, 2508, 2608, 2708, 2810 through hole; 209, 2308, 2409, 2509, 2707, 2807, 2808 fuel permeability control layer; 2410 bracket-shaped flow channel; 2709 reinforcement member; 2811 bonding layer; 809 insulating layer; 4002, 4602 substrate; 4102, 4202, 4302, 4402, 4502, 4702 fuel cell layer; 4103, 4203, 4303, 4403, 4503a, 4503b, 4603 spacer; 4104, 4204, 4304, 4404, 4504, 4704 spacer layer; 4703a spacer formed of porous body; and 4703b spacer formed of non-porous body.

BEST MODES FOR CARRYING OUT THE INVENTION

<<Fuel Cell Stack>>

A fuel cell stack according to the present invention will be described hereinafter in detail with reference to embodiments. The embodiments shown below are all directed to a direct methanol fuel cell (hereinafter also referred to as DMFC) generating electric power by directly extracting protons from methanol, in which a methanol aqueous solution is adopted as the fuel while air (specifically, oxygen in the air) is adopted as the oxidizing agent. The DMFC is advantageous in that (1) it does not require a reformer and (2) a fuel container can be reduced in size as compared with a canister of a high-pressure gas represented by hydrogen, because it employs liquid methanol higher in volume energy density than a gaseous fuel. Therefore, the DMFC is suitably applicable as an alternative to a power supply for small-sized equipment, in particular, a secondary battery for portable equipment. In addition, the DMFC is also advantageous in that, as the fuel is liquid, a narrow curved space portion that has been a dead space in the conventional fuel cell system can be used as a fuel space and the DMFC is less likely to be restricted in terms of design. The DMFC is preferably applicable to portable, small-sized electronic devices also owing to such advantages.

In general, in the DMFC, the following reaction occurs at an anode electrode and a cathode electrode. Carbon dioxide is generated as a gas on the anode electrode side and water is generated on the cathode electrode side,

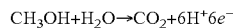  Anode electrode

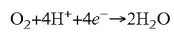  Cathode electrode

Embodiment 1

FIG. 1 is a schematic diagram showing a preferred example of a fuel cell stack according to the present invention, FIG. 1(a) being a perspective view thereof, FIG. 1(b) being a top view and FIG. 1(c) being a side view. A fuel cell stack 100 in FIG. 1 is formed by stacking a first fuel cell layer 101 and a second fuel cell layer 102, and each layer is constituted of five fuel cell unit cells (hereinafter simply referred to as a unit cell) 103. In both of these fuel cell layers, unit cell 103 is arranged at a distance from an adjacent unit cell, and first fuel cell layer 101 has a gap region 104a and second fuel cell layer 102 has a gap region 104b. In the present embodiment, gap region 104a and gap region 104b each have a parallelepiped shape.

Here, the "unit cell" is herein defined as one unit constituting the fuel cell stack and as a structure including an MEA (Membrane Electrode Assembly) and other constituent members added as necessary to the MBA for providing a power generation function or for other purposes. Other constituent members are not particularly limited, and they include, for example, a fuel flow channel for supplying the fuel, an air flow channel for supplying air, a separator, an anode current collector, a cathode current collector, and the like. In addition, the "MEA" is defined as an assembly including at least an electrolyte membrane and an anode catalyst layer and a cathode catalyst layer sandwiching the electrolyte membrane, and it herein encompasses also an example in which an anode conductive porous layer is provided on the anode catalyst layer and a cathode conductive porous layer is provided on the cathode catalyst layer. Moreover, the "separator" herein refers to a constituent member of a unit cell playing a role for separation of the fuel and the oxidizing agent (such as air).

In the present embodiment, each fuel cell layer has a shape elongated in a longitudinal direction within the fuel cell layer, and each unit cell 103 constituting the fuel cell layer also has a shape elongated in the longitudinal direction (the unit cell having such a shape may hereinafter be referred to as a unit cell in a "shape of an elongated strip"), more specifically, a parallelepiped shape. Unit cells 103 in an identical layer are identical in their direction of elongation. Namely, unit cells 103 within the identical layer are arranged in parallel at regular intervals. Second fuel cell layer 102 is stacked on first fuel cell layer 101 such that the longitudinal direction (direction of elongation) of the unit cells constituting the second fuel cell layer is orthogonal to the longitudinal direction (direction of elongation) of the unit cells constituting first fuel cell layer 101. According to such a configuration, a part of an upper side of gap region 104a in first fuel cell layer 101 comes in contact with the unit cell constituting second fuel cell layer 102. When the unit cell has a longitudinal direction, a plurality of unit cells can be stacked over the gap region in a stable manner and hence a stack structure of the fuel cell layers can readily be constructed. In addition, by employing a unit cell in a shape of a planar elongated strip, a contact area between the unit cells as stacked is larger than in employing a unit cell in a shape of an elongated strip having surface irregularities or in a cylindrical shape. Therefore, physical strength of the obtained fuel cell stack is improved. Moreover, as the contact area between the unit cells is greater, electrical contact resistance can be low in stacking with electrically serial connection. Further, by employing the planar unit cell, a surface area per volume can be larger than a columnar unit cell. As electrically serial connection along a direction of stack can be made while suppressing electrical contact resistance to be low, the amount of a current that flows in the in-plane direction of the fuel cell layer can be lowered. Accordingly, a thickness of a current collector can be decreased or a current collector can be eliminated, and high integration of the fuel cell stack can be achieved. Consequently, smaller size, lighter weight and lower cost of the fuel cell stack can be achieved.

In addition, in the present embodiment, as stacking is carried out such that the longitudinal direction (direction of elongation) of the unit cells constituting second fuel cell layer 102 is orthogonal to the longitudinal direction (direction of elongation) of the unit cells constituting first fuel cell layer 101, gap region 104a and gap region 104b each having a parallelepiped shape are similarly aligned to be orthogonal to each other when viewed in a direction of stack of the fuel cell layers and they are formed in different portions except for an intersecting region (a region where gap region 104a and gap region 104b intersect with each other) (see FIG. 1(b)).

By aligning the unit cells to be orthogonal to each other, an area of the intersecting region of the unit cells is small and a distance of diffusion of air to the inside of the intersecting region is short, so that supply of air to the intersecting region is satisfactory. By making shorter a length of the unit cell in a direction of a short side as well, the area of the intersecting region can be made further smaller. By making shorter the length in the direction of a short side, a distance of convection of oxygen in the in-plane direction of the unit cell on the cathode side is short, so that convection supply of oxygen can be less likely to be disturbed even when air is naturally supplied. Consequently, air can more efficiently be supplied toward the cathode of the unit cell within the fuel cell stack in which the fuel cell layers are three-dimensionally stacked, without the use of auxiliary equipment for supplying the air.

In fuel cell stack 100 in FIG. 1, air serving as the oxidizing agent can be supplied either by opening at least a part of a surface of the fuel cell stack to atmosphere or by using auxiliary equipment such as an air pump or a fan. Here, the supplied air passes through gap regions 104a and 104b provided between the unit cells and spreads through the inside of fuel cell stack 100, and it is supplied to the cathode catalyst layer of each unit cell. Here, the unit cells constituting second fuel cell layer 102 are arranged over a part of the upper side of gap region 104a in first fuel cell layer 101. Then, an area of contact between the air present in the gap region and each unit cell increases. Thus, air supply to the cathode catalyst layer of the unit cell is significantly improved.

In fuel cell stack 100, the gap region is three-dimensionally formed and in addition, all gap regions (four gap regions 104a and four gap regions 104b) communicate with one another. Since such a configuration achieves higher porosity of the fuel cell stack and thus better air permeability, convection of the air is improved. Namely, according to such a configuration, the air introduced in the fuel cell stack can be supplied through the communicating gap regions into fuel cell layer 100 through natural convection or diffusion. In addition, natural convection of the air within the fuel cell stack is also satisfactory. The air within the fuel cell stack warmed by heat originating from power generation is emitted to the outside through the communicating gap regions as a result of convection and the air is efficiently taken in through a side surface or a lower surface of the fuel cell stack. Therefore, an air convection rate is improved and such auxiliary equipment as an air pump or a fan for air supply is not necessarily required, which enables size reduction of a fuel cell system including the fuel cell stack. In addition, as air convection resistance decreases, power generation characteristics of the fuel cell can be improved. Alternatively, even in the case of using auxiliary equipment such as the air pump or the fan, wind power necessary for supplying the air to the inside of the fuel cell stack can be reduced, which enables lower power consumption or a smaller size of the auxiliary equipment.

Further, according to such a configuration, a degree of freedom in a manner of use of the fuel cell stack can significantly be improved. For example, in whichever direction the fuel cell stack may be inclined for use, warmed air can be exhausted from an upper portion and air can be taken in from the side and the bottom, so that convection of the air can satisfactorily be maintained. In addition, even when the fuel cell stack is mounted on equipment and for example the upper surface and the lower surface of the fuel cell stack are covered, the air can be exhausted or taken in from the side surface. In particular, as a polymer electrolyte fuel cell (PEFC) or a direct methanol fuel cell (DMFC) can operate at a low temperature around room temperature, for example, such a package as a heat insulating structure necessary for a fuel cell operating at a high temperature such as a solid oxide fuel cell (SOFC) is not required. Therefore, in the case of a polymer electrolyte fuel cell (PEFC) or a direct methanol fuel cell (DMFC) in particular, as the air in atmosphere can be taken into the fuel cell stack three-dimensionally from all directions, the need for auxiliary equipment for supplying the air can be obviated. Therefore, the fuel cell stack according to the present invention is particularly preferably implemented by a fuel cell capable of operating at a low temperature around a room temperature such as a polymer electrolyte fuel cell (PEFC) or a direct methanol fuel cell (DMFC). In addition, better air permeability in the fuel cell stack and a greater surface area of the fuel cell stack improve also heat radiation property of the fuel cell stack, and temperature increase can be suppressed even when the fuel cell stack is highly integrated. Therefore, according to the fuel cell stack of the present invention, deterioration of power generation characteristics of the fuel cell stack due to heat can be suppressed and influence on the equipment by the heat originating from power generation can be less even when the fuel cell stack is mounted on the equipment or the like.

In fuel cell stack 100, unit cells 103 are equal in height, that is, the fuel cell layers are equal in thickness. As the unit cells in the fuel cell layer are thus identical in height, contact between upper and lower unit cells is satisfactory and poor contact can be lessened even when a unit cell is stacked over a plurality of unit cells.

In addition, in fuel cell stack 100, the unit cells are arranged in a single fuel cell layer at regular intervals (that is, a width of the gap region is equal). Here, regular intervals refer to such a condition that an error of all gap intervals is within a range of ±0.25 mm. A plurality of gap regions are equal in cross-sectional area in a surface perpendicular to the direction of stack of the fuel cell layers. As described above, as unit cells 103 in the same layer are arranged in parallel, the plurality of gap regions 104a are identical in area and unit cells 103 are also equal in height. Therefore, the plurality of gap regions 104a has the same space volume. This is also the case with gap region 104b. In fuel cell stack 100, a current flows electrically serially in a direction of stack, through portions where the unit cells intersect and come in contact with each other. On the other hand, a current in a portion where the unit cells do not intersect with each other once flows in the in-plane direction of the fuel cell layer to the closest portion where the unit cells intersect and come in contact with each other. Thereafter, when the current reaches the portion where the unit cells intersect and come in contact with each other, it flows in the direction of stack. As the gap regions are arranged at regular intervals, a distance of flow through the fuel cell layer in the in-plane direction becomes uniform, and hence local heat generation due to resistance loss does not take place. In addition, local overvoltage is less likely. As deterioration in output characteristics of the fuel cell due to local heat and deterioration in output characteristics due to deterioration of a catalyst metal as a result of application of a potential to such an extent as elution of a catalyst metal due to overvoltage thus do not occur, the fuel cell stack can have longer life.

The interval between the unit cells arranged in each fuel cell layer is not particularly limited so long as the interval is sufficient for the air to diffuse or pass as a result of natural convection, however, the interval is set preferably in a range from 0.001 cm to 1 cm and more preferably in a range from 0.05 cm to 0.2 cm.

In fuel cell stack 100, unit cells 103 are all identical in shape. Therefore, the fuel cell stack in the present embodiment includes, as second fuel cell layer 102, a fuel cell layer identical in shape to first fuel cell layer 101, and it can be said that second fuel cell layer 102 is stacked as rotated by 90° with respect to first fuel cell layer 101. Here, the fuel cell layers identical in shape mean that error of an outer dimension of all unit cells is within a range of ±0.25 mm and arrangement and the shape of the unit cells coincide by inversion or rotation. As the unit cells are all identical in shape, variation in characteristics due to the difference in shape of the unit cell can be suppressed. In addition, as the unit cells can be manufactured in a singe manufacturing process, manufacturing cost can be reduced. The unit cells constituting one fuel cell layer intersect with the unit cells constituting the other fuel cell layer by stacking two fuel cell layers at different angles as in the present embodiment, so that three-dimensionally communicating gap regions can readily be formed.

It is noted herein that a fuel cell stack having such a structure that a plurality of unit cells in a shape of an elongated strip as shown in FIG. 1 are stacked to form a number sign shape in multiple layers may be referred to as a "number-sign-shaped fuel cell stack."

Here, the fuel cell stack in the present embodiment may be modified, for example, as follows. Initially, the plurality of unit cells 103 constituting first fuel cell layer 101 do not necessarily have to be identical in shape (in a length in the longitudinal direction, a width or a height). This is also the case with second fuel cell layer 102. So long as at least two unit cells are identical in shape, an effect the same as described above can be obtained in that region. In addition, the number of unit cells within one fuel cell layer is not particularly limited. At least one fuel cell layer should only have two or more unit cells and thus at least one gap region. If there are a plurality of gap regions, a width thereof (a distance between the unit cells) may be different. A distance between the unit cells within first fuel cell layer 101 may be different from a distance between the unit cells in second fuel cell layer 102. Moreover, it is not necessary to arrange the plurality of unit cells in parallel within one fuel cell layer.

First fuel cell layer 101 and second fuel cell layer 102 do not necessarily have to be identical in shape. In addition, an angle between the longitudinal direction (direction of elongation) of the unit cells constituting the second fuel cell layer and the longitudinal direction (direction of elongation) of the unit cells constituting first fuel cell layer 101 does not have to be set to 90°, and any angle may be set. In an example where two fuel cell layers identical in shape are stacked to obtain a fuel cell stack as in the present embodiment as well, an angle of the upper fuel cell layer with respect to the lower fuel cell layer is not particularly limited.

In addition, the fuel used for the fuel cell stack according to the present invention is not limited to the methanol aqueous solution, and other fuels containing hydrogen atoms in their molecular structure may be employed. The fuel refers to a reducing agent supplied to the anode catalyst layer. Specifically, examples of the reducing agent include: gaseous fuels such as hydrogen, DME (dimethyl ether), methane, butane, and ammonia; alcohols such as methanol and ethanol, acetals such as dimethoxymethane, and carboxylic acids such as formic acid; esters such as methyl formate, hydrazine, or liquid fuels such as sulfurous acid, bisulfite, thiosulfate, dithionite, hypophosphorous acid, and phosphorous acid; and a substance obtained by dissolving a solid fuel such as ascorbic acid in water. The fuel is not limited a fuel consisting of one type, and a mixture of two or more types may be employed. A methanol aqueous solution is preferably employed from a point of view of low fuel cost, high energy density per volume, high power generation efficiency (low overvoltage), and the like. Examples of the oxidizing agent used for the fuel cell stack according to the present invention include oxygen, hydrogen peroxide and nitric acid, however, oxygen in air is more preferably used from a point of view of cost for the oxidizing agent and the like.

Figure 2:
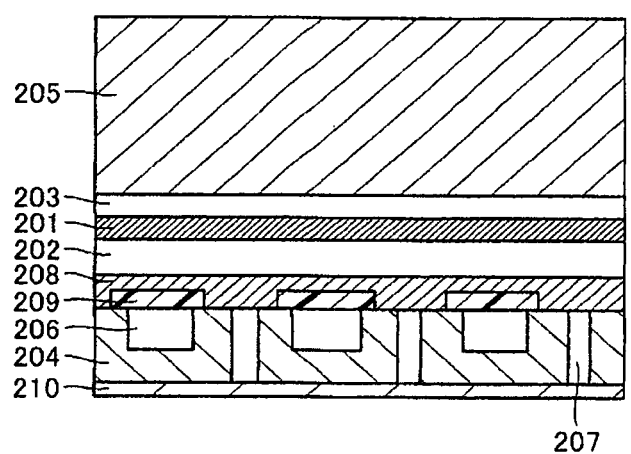
FIG. 2 is a schematic cross-sectional view showing a preferred example of a unit cell employed in the present invention.

An internal structure of unit cells 103 constituting first fuel cell layer 101 and second fuel cell layer 102 will now be described. FIG. 2 is a schematic cross-sectional view showing a preferred examples of the unit cell employed in the present invention. It is noted that other preferred examples of the unit cell will be described later. The unit cell shown in FIG. 2 is constituted of an electrolyte membrane 201, an anode catalyst layer 202 arranged on one surface of electrolyte membrane 201, a cathode catalyst layer 203 arranged on the other surface of electrolyte membrane 201, a hydrophilic layer 208 arranged in contact with a surface of anode catalyst layer 202 opposite to its surface opposed to electrolyte membrane 201, an anode conductive porous layer 204 arranged in contact with a surface of hydrophilic layer 208 opposite to its surface opposed to anode catalyst layer 202, a cathode conductive porous layer 205 arranged in contact with a surface of cathode catalyst layer 203 opposite to its surface opposed to electrolyte membrane 201, a fuel flow channel 206 which is a space for fuel transportation formed within anode conductive porous layer 204, a fuel permeability control layer 209 covering one surface of fuel flow channel 206, and a gas-liquid separation layer 210 in contact with a surface of anode conductive porous layer 204 opposite to its surface in contact with hydrophilic layer 208. Fuel permeability control layer 209 is arranged in contact with hydrophilic layer 208. In addition, anode conductive porous layer 204 is formed by forming in an anode conductive plate, a number of through holes 207 penetrating in a direction of layer thickness thereof.

The methanol aqueous solution used as a fuel is supplied to the entire surface of a power generation portion of the unit cell through fuel flow channel 206, supplied to hydrophilic layer 208 through fuel permeability control layer 209, and thereafter held in hydrophilic layer 208 and uniformly supplied to anode catalyst layer 202. Hydrophilic layer 208 is preferably an electrically conductive layer having a hydrophilic surface and formed of a porous body. Thus, generated carbon dioxide passes through a hole within hydrophilic layer 208 and then successively through hole 207 in anode conductive porous layer 204 and gas-liquid separation layer 210, and it is exhausted to the outside. As carbon dioxide is quickly exhausted through hole 207 in the vicinity of anode catalyst layer 202, peel-off of the electrolyte membrane or the catalyst layer or change in shape thereof due to increased pressure of carbon dioxide in the unit cell does not occur and supply of the fuel is not disturbed either.

When the fuel cell stack structure according to the present invention is applied, carbon dioxide exhausted through hole 207 in anode conductive porous layer 204 is exhausted either into cathode conductive porous layer 205 of an adjacent unit cell or into the gap region. Carbon dioxide exhausted into cathode conductive porous layer 205 diffuses in the in-plane direction, reaches the gap region, and it is exhausted through the gap region to the outside of the fuel cell stack as air diffuses. Thus, carbon dioxide quickly exhausted to the outside of the unit cell can quickly be exhausted through the gap region in the fuel cell stack to the outside of the fuel cell stack as air diffuses.

As carbon dioxide can be exhausted through hole 207 provided in anode conductive porous layer 204 and penetrating in the direction of thickness, it is not necessary to form a carbon dioxide exhaust path in the anode conductive plate in the unit cell shown in FIG. 2. In order to reliably and quickly exhaust carbon dioxide, a cross-sectional area of an exhaust flow channel should be secured. In the present embodiment, however, it is not necessary to do so and the anode conductive plate can be made thinner. Therefore, the unit cell can be made thinner and the fuel cell stack obtained by stacking the unit cells can achieve higher power density.

In addition, as the methanol aqueous solution is supplied through fuel permeability control layer 209, entry of carbon dioxide into fuel flow channel 206, which disturbs supply of the methanol aqueous solution, does not occur. Therefore, as it is not necessary to use auxiliary equipment such as a pump to cause the methanol aqueous solution to flow through fuel flow channel 206 at a prescribed flow rate or higher in order to exhaust carbon dioxide, the need for the pump can be obviated. Moreover, conventionally, in order to reduce pressure loss in supply with a pump, a cross-sectional area of the fuel flow channel has had to be great. By providing fuel permeability control layer 209, however, the need for the pump can be obviated, and therefore such a conventional problem can be solved. Further, as the cross-sectional area of fuel flow channel 206 can be made smaller, the methanol aqueous solution can be supplied by capillarity to all corners of the power generation portion. The unit cell can thus be made thinner and the need for the auxiliary equipment can be obviated, so that higher power density of the fuel cell can be achieved.

Gas-liquid separation layer 210 is preferably made of a porous body including a number of pores having such a pore diameter as allowing passage of a gas but not allowing passage of a liquid up to a prescribed pressure. Thus, such a structure that carbon dioxide can be exhausted but the methanol aqueous solution does not leak to the outside can be obtained. It is noted that through hole 207 may be filled with the gas-liquid separation layer.

Hydrophilic layer 208 not only plays a role of holding the fuel and uniformly supplying the fuel to anode catalyst layer 202, but also plays a role of preventing lowering in output from the fuel cell as oxygen introduced from through hole 207 reaches anode catalyst layer 202, because the pores in the hydrophilic layer are filled with a liquid (methanol aqueous solution).

The air is supplied from atmosphere through cathode conductive porous layer 205 to cathode catalyst layer 203. More specifically, the air supplied to the fuel cell stack is supplied through the gap region provided between the unit cells to the inside of the fuel cell stack and supplied through holes in cathode conductive porous layer 205 to cathode catalyst layer 203.

According to the structure of the unit cell as described above, a thin unit cell having a thickness not greater than about 1 mm can be fabricated. In the fuel cell stack according to the present embodiment, in order to minimize use of auxiliary equipment, preferably, a length of a short side of the unit cell is set to 1 to 3 mm, a thickness thereof is set to 0.5 to 1 mm, a length of a long side thereof is set to 30 to 100 mm, a gap interval (a width of the gap region) is set to 0.2 to 2 mm, and the number of stacked fuel cell layers is set to 4 to 8. Thus, a fuel cell stack achieving high power density and small size as described above can be provided.

Anode catalyst layer 202 contains a catalyst promoting oxidation of the fuel. As a result of oxidation reaction of the fuel on the catalyst, protons and electrons are generated. In addition, cathode catalyst layer 203 contains a catalyst promoting reduction of the oxidizing agent. The oxidizing agent takes in protons and electrons on the catalyst and reduction reaction occurs.

For example, a layer including a catalyst-supporting carrier and an electrolyte is used as anode catalyst layer 202 and cathode catalyst layer 203 described above. Here, an anode catalyst in anode catalyst layer 202 has a function, for example, to accelerate a reaction speed at which protons and electrons are generated from methanol and water, the electrolyte has a function to transmit the generated protons to electrolyte membrane 201, and the anode carrier has a function to conduct the generated electrons to anode conductive porous layer 204. On the other hand, a cathode catalyst in cathode catalyst layer 203 has a function to accelerate a reaction speed at which water is generated from oxygen, protons and electrons, the electrolyte has a function to conduct protons from electrolyte membrane 201 to the vicinity of the cathode catalyst, and the cathode carrier has a function to conduct the electrons from cathode conductive porous layer 205 to the cathode catalyst. Though the anode carrier and the cathode carrier have a function to conduct electrons, the catalyst also has electron conductivity. Accordingly, it is not necessarily required to provide a carrier. In that case, supply and reception of electrons to/from anode conductive porous layer 204 or cathode conductive porous layer 205 is carried out by the anode catalyst and the cathode catalyst, respectively.

Examples of the anode catalyst and the cathode catalyst include a noble metal such as Pt, Ru, Au, Ag, Rh, Pd, Os, and Ir, a base metal such as Ni, V, Ti, Co, Mo, Fe, Cu, Zn, Sn, W, and Zr, an oxide, a carbide and a carbonitride of these nobles metal and base metal, and carbon. A single material or combination of two or more types of these materials can be used for the catalyst. The anode catalyst and the cathode catalyst are not necessarily limited to a catalyst of the same type, and different substances may be used therefor.

An electrolyte used for anode catalyst layer 202 and cathode catalyst layer 203 is not particularly limited so long as the electrolyte has proton conductivity and electrically insulating property, however, a solid or a gel not dissolved by methanol is preferred. Specifically, an organic polymer having strong acid group such as sulfonic acid group and phosphoric acid group or weak acid group such as carboxyl group is preferred. Examples of such organic polymers include sulfonic acid group containing perfluorocarbon (NAFION® manufactured by Du Pont), carboxyl group containing perfluorocarbon (Flemion® manufactured by Asahi Kasei Corporation), a polystyrene sulfonic acid copolymer, a polyvinyl sulfonic acid copolymer, an ionic liquid (ordinary temperature molten salt), sulfonated imide, 2-acrylamide-2-methylpropane sulfonic acid (AMPS), and the like. In addition, in an example where a carrier provided with proton conductivity which will be described later is used, the carrier conducts protons and the electrolyte is not necessarily required.

The carrier used in anode catalyst layer 202 and cathode catalyst layer 203 is preferably made of a carbon-based material having high electrical conductivity, and examples of such materials include acetylene black, Ketjen Black®, amorphous carbon, carbon nanotube, carbon nanohorn, and the like. The examples include not only the carbon-based materials but also a noble metal such as Pt, Ru, Au, Ag, Rh, Pd, Os, and Ir, a base metal such as Ni, V, Ti, Co, Mo, Fe, Cu, Zn, Sn, W, and Zr, and an oxide, a carbide, a nitride, and a carbonitride of these noble metal and base metal. A single material or combination of two or more types of these materials can be used for the carrier. In addition, a material provided with proton conductivity, specifically, sulfated zirconia, zirconium phosphate and the like, may be used for the carrier.

A thickness of each of anode catalyst layer 202 and cathode catalyst layer 203 is preferably set to 0.5 mm or smaller, in order to lower resistance in proton conduction and resistance in electron conduction and in order to reduce diffusion resistance of the fuel (such as methanol) or the oxidizing agent (such as oxygen). In addition, as a catalyst sufficient for improving output as a cell should be carried, the thickness is preferably set to 0.1 μm or greater.

Electrolyte membrane 201 is not particularly limited so long as a material having proton conductivity and electrically insulating property is employed, however, electrolyte membrane 201 is preferably formed as appropriate of a polymer membrane, an inorganic membrane or a composite membrane that has conventionally been known. Examples of polymer membranes include a perfluorosulfonic-acid-based electrolyte membrane (NAFION (manufactured by Du Pont), a Dow membrane (manufactured by The Dow Chemical Company), ACIPLEX® (manufactured by Asahi Kasei Corporation), and Flemion (manufactured by Asahi. Glass Co., Ltd.)) and the like, as well as a hydrocarbon-based electrolyte membrane composed, for example, of polystyrene sulfonic acid, sulfonated polyether ether ketone and the like. The inorganic membrane is composed, for example, of phosphoric acid glass, cesium hydrogen sulfate, polytungstophosphoric acid, ammonium polyphosphate, and the like. In addition, examples of composite membranes include a Gore-Select® membrane (GORE-SELECT® manufactured by W. L. Gore & Associates).

When the temperature of the fuel cell stack attains to a temperature around 100° C. or higher, sulfonated polyimide, 2-acrylamide-2-methylpropane sulfonic acid (AMPS), sulfonated polybenzimidazole, phosphorated polybenzimidazole, cesium hydrogen sulfate, ammonium polyphosphate, an ionic liquid (ordinary temperature molten salt), or the like, that has high ion conductivity even though water content is low, is used as a material for the electrolyte membrane and such a material is preferably used in a form of a membrane. The electrolyte membrane preferably has proton conductivity of $10^{-5}$ S/cm or higher, and use of a polymer electrolyte membrane having proton conductivity of $10^{-3}$ S/cm or higher, such as a perfluorosulfonic acid polymer or a hydrocarbon-based polymer, is further preferred.

Anode conductive porous layer 204 has a function to supply and receive electrons to/from anode catalyst layer 202. A carbon material, an electrically conductive polymer, a noble metal such as Au, Pt and Pd, a metal such as Ti, Ta, W, Nb, Ni, Al, Cr, Ag, Cu, Zn, and Su, Si, a nitride, a carbide, a carbonitride, or the like thereof, an alloy such as stainless, Cu—Cr, Ni—Cr and Ti—Pt, and the like are preferably used as a material for the anode conductive plate forming anode conductive porous layer 204, and at least one element selected from the group consisting of Pt, Ti, Au, Ag, Cu, Ni, and W is further preferably contained. In addition, when a metal poor in corrosion resistance under acid atmosphere such as Cu, Ag and Zn is used, a noble metal such as Au, Pt and Pd and a metal material having corrosion resistance, an electrically conductive polymer, an electrically conductive nitride, an electrically conductive carbide, an electrically conductive carbonitride, an electrically conductive oxide, and the like may be used as a surface coating. Thus, the fuel cell can have longer life. By containing the element above, specific resistance of anode conductive porous layer 204 becomes lower. Therefore, voltage lowering due to the resistance of anode conductive porous layer 204 can be lessened and higher power generation characteristics can be obtained.

As described above, anode conductive porous layer 204 shown in FIG. 2 is formed by forming in the anode conductive plate, through holes 207 penetrating in a direction of layer thickness. Thus, efficiency in exhausting carbon dioxide generated in anode catalyst layer 202 can be improved. Here, "penetrating" means passage from one surface to the opposite surface. A plurality of through holes 207 more preferably communicate with one another. Examples of the anode conductive plate (the anode conductive porous layer) having holes penetrating in the direction of layer thickness include a porous metal layer obtained by providing a plurality of holes in a plate or a foil, a porous metal layer like a mesh or an expanded metal, and the like. In addition, examples of materials having a plurality of through holes communicating with one another include a foam metal, a metal web, a sintered metal, carbon paper, and a carbon cloth.

Cathode conductive porous layer 205 has a function to supply and receive electrons to/from cathode catalyst layer 203, and has holes communicating between the outside of the unit cell and cathode catalyst layer 203. In general, during power generation by the unit cell, cathode conductive porous layer 205 is maintained at a potential higher than anode conductive porous layer 204. Accordingly, a material for cathode conductive porous layer 205 preferably has corrosion resistance as high as or higher than anode conductive porous layer 204.

Cathode conductive porous layer 205 may be made of a material similar to that for anode conductive porous layer 204. In particular, however, for example, a carbon material, an electrically conductive polymer, a noble metal such as Au, Pt and Pd, a metal such as Ti, Ta, W, Nb, and Cr, a nitride, a carbide or the like thereof, an alloy such as stainless, Cu—Cr, Ni—Cr and Ti—Pt, and the like are preferably used. In addition, when a metal poor in corrosion resistance under acid atmosphere such as Cu, Ag, Zn, and Ni is used, a noble metal and a metal material having corrosion resistance, an electrically conductive polymer, an electrically conductive oxide, an electrically conductive nitride, an electrically conductive carbide or the like, and an electrically conductive carbonitride may be used as a surface coating.

A structure of cathode conductive porous layer 205 is not particularly limited so long as it has communicating holes allowing supply of oxygen in the air around the fuel cell stack to cathode catalyst layer 203. In order to supply oxygen to the cathode catalyst layer located at a portion of contact between the stacked fuel cell layers, however, holes communicating in a direction of stack and a direction perpendicular to the direction of stack are preferably provided in cathode conductive porous layer 205. Examples of such materials include a foam metal, a metal web, a sintered metal, carbon paper, a carbon cloth, and the like. The direct methanol fuel cell stack according to the present invention preferably has such a structure that, in a region where adjacent fuel cell layers are stacked and overlie each other, air enters also in a direction of a cross-section in the direction of layer thickness of cathode conductive porous layer 205 and reaches cathode catalyst layer 203.

Cathode conductive porous layer 205 has porosity preferably of 30% or higher for lowering diffusion resistance of oxygen and preferably of 95% or lower for lowering electrical resistance, and more preferably has porosity from 50% to 85%. Cathode conductive porous layer 205 has a thickness preferably not smaller than 10 μm for lowering diffusion resistance of oxygen in a direction perpendicular to the direction of stack of cathode conductive porous layer 205 and preferably not greater than 1 mm for lowering diffusion resistance of oxygen in the direction of stack of cathode conductive porous layer 205, and more preferably a thickness from 100 μm to 500 μm.

As shown in FIG. 2, the unit cell used in the present invention preferably includes not only the cathode conductive porous layer, the cathode catalyst layer, the electrolyte membrane, the anode catalyst layer, and the anode conductive porous layer, but also gas-liquid separation layer 210 provided in order to prevent fuel leakage and to exhaust a reaction product generated at the anode and fuel permeability control layer 209 provided in order to restrict a permeate flux of methanol to the catalyst layer. The gas-liquid separation layer and the fuel permeability control layer will be described in detail.

The gas-liquid separation layer is provided in order to suppress leakage of methanol through the through holes in the anode conductive porous layer to the outside of the unit cell, and it is mainly a layer having impermeability of liquids such as water or a methanol aqueous solution but having gas permeability. In addition, according to the present invention, the gas-liquid separation layer is preferably provided also with electrical conductivity. Specifically, a mixture of a material having a property to separate between a gas and a liquid and an electrically conductive material may be employed. Examples of such materials include a porous layer composed of a mixture of a fluorine-based polymer represented by PTFE (polytetrafluoroethylene) and PVDF (polyvinylidenfluoride) and acetylene black, Ketjen Black®, amorphous carbon, carbon nanotube, carbon nanohorn, and the like (hereinafter, the gas-liquid separation layer provided with electrical conductivity will simply be referred to as the gas-liquid separation layer). In order to prevent leakage of methanol, the gas-liquid separation layer is preferably provided on the surface of the anode conductive porous layer.

The fuel permeability control layer suitably provided for the fuel flow channel preferably has fuel diffusion resistance in the direction of thickness thereof and has a function to suppress a permeate flux of the fuel, and it is more preferably made of a gas impermeable material. The shape of the fuel permeability control layer is not particularly limited so long as the functions described previously are achieved, and it may have a fuel permeable function by providing small holes penetrating in the direction of thickness thereof. In an example where the methanol aqueous solution is adopted as the fuel, the fuel permeability control layer is preferably formed of a polymer membrane, an inorganic membrane or a composite membrane. Examples of polymer membranes include silicon rubber, a perfluorosulfonic-acid-based electrolyte membrane (NAFION (manufactured by Du Pont), a Dow membrane (manufactured by The Dow Chemical Company), ACIPLEX (manufactured by Asahi Kasei Corporation), and Flemion (manufactured by Asahi Glass Co., Ltd.)), as well as a hydrocarbon-based electrolyte membrane composed, for example, of sulfonated polyimide, polystyrene sulfonic acid, sulfonated polyether ether ketone, and the like. The inorganic membrane is composed, for example, of porous glass, porous zirconia, porous alumina, and the like. Examples of the composite membrane include a Gore-Select membrane (manufactured by W.L, Gore & Associates). In addition, examples of the fuel permeability control layer having penetrating small holes include a fuel permeability control layer fabricated with a photosensitive resin. In an example where a photosensitive resin polymerized or cured by ultraviolet rays or X-rays, an ultraviolet-ray or X-ray non-transmissive mask can be used to provide a through hole in a columnar shape or a through hole like a slit in a direction of layer thickness.

In the fuel cell structure described in Patent Document 1 above, carbon dioxide may be stored in the porous substrate or the fuel plenum, supply of the methanol aqueous solution to the catalyst layer may be disturbed, and output of the fuel cell may be lowered due to diffusion resistance of the methanol aqueous solution. Accordingly, the methanol aqueous solution should flow within the fuel plenum at quite a flow rate, and hence auxiliary equipment such as a pump consuming a large amount of electric power is required. As the fuel is supplied through the fuel permeability control layer, carbon dioxide is not stored in the fuel flow channel (or the fuel plenum), and the fuel can be supplied in a stable manner. Thus, it is not necessary to use auxiliary equipment such as a pump consuming a large amount of electric power or use thereof can be minimized, and thus power density of the fuel cell system can be enhanced. In addition, by supplying the fuel with its permeate flux being controlled, the need for a sealing material for sealing, a fastening member for securing sealing property, and a separator for preventing the fuel from reaching the cathode catalyst layer can be obviated, and a smaller size, lower cost and higher output of the fuel cell stack can be achieved.

Though not specifically shown in FIG. 2, by forming electrolyte membrane 201 to be wider in the in-plane direction than anode catalyst layer 202 and cathode catalyst layer 203, preferably, electrolyte membrane 201 and anode conductive porous layer 204 come in contact with each other and electrolyte membrane 201 and cathode conductive porous layer 205 come in contact with each other at end portions in the cross-section of the unit cell, and bonding thereof is more preferred. This is preferred in order to prevent the fuel from going around the end portion of electrolyte membrane 201 to reach cathode catalyst layer 203 from anode catalyst layer 202. Such a structure is realized, for example, by forming the electrolyte membrane by applying a solution of the electrolyte membrane to the end portions of anode conductive porous layer 204 and cathode conductive porous layer 205 across a prescribed width to a thickness equal to or greater than that of each of anode catalyst layer 202 and cathode catalyst layer 203, the thicknesses being substantially identical to each other, and then by bonding these conductive porous layers through thermal welding. Instead of forming the electrolyte membrane from the solution of the electrolyte membrane, the electrolyte membrane may be adhered to and formed on the anode conductive porous layer and the cathode conductive porous layer in advance. Alternatively, instead of forming the electrolyte membrane on the conductive porous layer, the electrolyte membrane may be formed at opposing ends of electrolyte membrane 201 formed to be wider where the catalyst layer is not stacked, such that the electrolyte membrane covers end surfaces of the catalyst layer and has a thickness as large as the catalyst layer. By doing so as well, such a structure that the conductive porous layer comes in contact with both of the catalyst layer and the electrolyte membrane can be realized. In addition, a layer formed between electrolyte membrane 201 and anode conductive porous layer 204 and/or cathode conductive porous layer 205 to cover the end surfaces of the catalyst layer does not necessarily have to be an electrolyte membrane, and the layer may be formed with an adhesive. Examples of such adhesives include a polyolefin-based adhesive, an epoxy-based adhesive and the like. When anode conductive porous layer 204 and cathode conductive porous layer 205 are porous in the cross-section of the end portion, the cross-section of the end portion of anode conductive porous layer 204, hydrophilic layer 208, anode catalyst layer 202, and electrolyte membrane 201 and a boundary between adjacent layers are preferably sealed with a sealant made of an adhesive or the like in order to prevent the fuel from leaking from the cross-section of the end portion of anode conductive porous layer 204 and reaching cathode catalyst layer 203 through cathode conductive porous layer 205, and in addition to the above, more preferably, the cross-section of the end portion of cathode catalyst layer 203 and cathode conductive porous layer 205 is also sealed with a sealant.

In the unit cell structured as described above, on the anode side, referring to FIG. 2, the fuel reaches anode catalyst layer 202 through fuel flow channel 206, oxidation reaction of the fuel occurs in anode catalyst layer 202, and protons and electrons are generated. The generated electrons flow to anode conductive porous layer 204 and the protons move through electrolyte membrane 201 to cathode catalyst layer 203. On the other hand, on the cathode side, the air supplied into the fuel cell stack through the fuel cell layer or the gap region in the unit cell is supplied to cathode catalyst layer 203 through cathode conductive porous layer 205 of the unit cell. In cathode catalyst layer 203, reduction reaction of oxygen with protons and electrons supplied by cathode conductive porous layer 205 occurs and water is generated.

Embodiment 2

FIG. 3 is a schematic diagram showing another preferred example of the fuel cell stack according to the present invention, FIG. 3(a) being a perspective view thereof, FIG. 3(b) being a top view, and FIG. 3(c) being a side view. A fuel cell stack 300 in FIG. 3 is formed by alternately stacking a first fuel cell layer 301 and a second fuel cell layer 302, and the total number of stacks is eight. Each layer is constituted of five unit cells 303, and fuel cell stack 300 has forty unit cells as a whole. This embodiment is different from Embodiment 1 above in the number of stacked fuel cell layers. By increasing the number of stacks, a higher voltage can be output.

In fuel cell stack 300, unit cells 303 are equal in height, that is, the fuel cell layers are equal in thickness. As the unit cells in the fuel cell layer are thus identical in height, contact between upper and lower unit cells is satisfactory and poor contact can be lessened even when a unit cell is stacked over a plurality of unit cells. In addition, the eight fuel cell layers in total are stacked in a direction perpendicular to a direction along a plane of the fuel cell layer. Thus, in a case of serial electrical wiring, an electrical conduction path can be short and resistance loss can be lessened. In addition, as the fuel cell layers are stacked in the direction perpendicular to the direction along the plane of the fuel cell layer, a dead space for wiring or the like can be reduced and a space volume occupied by the fuel cell stack can be decreased, so that a fuel cell stack achieving a smaller size and higher power density can be obtained.

Here, in fuel cell stack 300, all fuel cell layers are identical in shape, however, they do not necessarily have to be identical in shape. In addition, unit cells 303 constituting fuel cell layer 300 may all be identical in shape or some of them may be different in shape. So long as at least two of the fuel cell layers constituting fuel cell stack 300 are identical in shape, manufacturing cost can be reduced and construction of the stack structure can be facilitated in those fuel cell layers. Moreover, so long as at least two unit cells in a single fuel cell layer are identical in shape, variation in characteristics due to difference in shape of the unit cell described above can be suppressed in those unit cells.

The structure of the fuel cell stack, an effect thereof, and possible modifications are otherwise the same as in Embodiment 1 above. In the present embodiment, though the fuel cell layers are stacked such that an overlying gap region portion is in a quadrangular shape when viewed in the direction of stack, the fuel cell layers may naturally be stacked such that the overlying gap region portion is in a polygonal shape, such as triangular, pentagonal or hexagonal. The internal structure of each unit cell can be the same as in Embodiment 1 above.

Here, in the fuel cell stack, for example as shown in FIG. 3, formed by stacking a plurality of fuel cell layers in each of which unit cells in the same parallelepiped shape are arranged at regular intervals such that the unit cells constituting the fuel cell layer are orthogonal to the unit cells constituting the fuel cell layer adjacent to the former fuel cell layer, referring to FIG. 3, a width X1 of the unit cell is preferably set to 1 mm or greater from a point of view of ease in fabrication of the unit cell. In addition, taking into consideration the fact that a convection rate of oxygen is greater as an area of intersection of the unit cells is smaller and the fact that generated water is quickly exhausted as vapor, width X1 of the unit cell is preferably as narrow as possible, specifically, it is preferably 5 mm or smaller. A width X2 of the gap region between the unit cells with respect to width X1 of the unit cell (interval between the unit cells) (X2/X1) is preferably not greater than 1 from a point of view that a greater ratio of an MEA occupied in the fuel cell layer leads to higher power density of the fuel cell stack, and preferably it is not smaller than 0.2 from a point of view of ease in air intake into the fuel cell stack. Provided that X1 and X2 satisfy the range above, a thickness X3 of the cathode conductive porous layer included in the unit cell (a total thickness when the cathode conductive porous layer is adjacent to the spacer in the fuel cell stack (see FIGS. 61 and 62 which will be described later)) is preferably not smaller than 0.2 mm from a point of view of ease in air intake and convection in the fuel cell stack and preferably not greater than 2 mm from a point of view of improvement in power density of the fuel cell stack.

Embodiment 3

Figure 4:
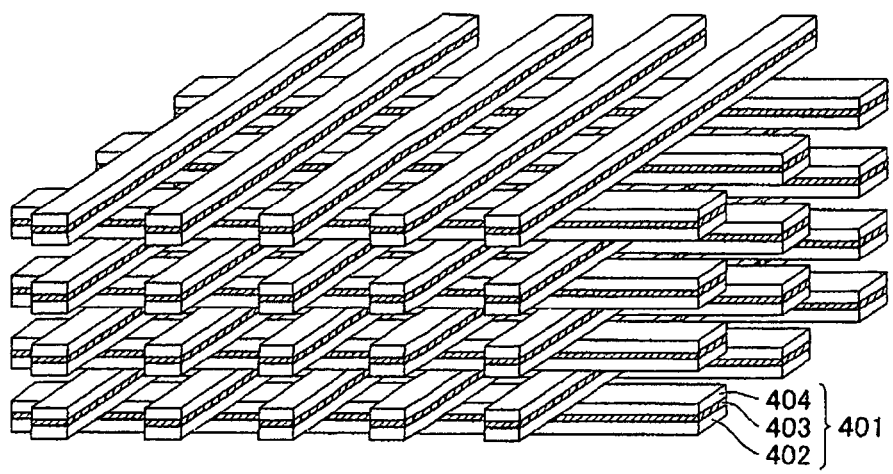
FIG. 4 is a perspective view showing another preferred example of the fuel cell stack according to the present invention.

FIG. 4 is a perspective view showing another preferred example of the fuel cell stack according to the present invention. Though the fuel cell stack in the present embodiment is similar to that in Embodiment 2 above in the shape of each fuel cell layer and the shape of each unit cell, it is characterized by an internal structure of the unit cell. Specifically, a unit cell 401 is formed by stacking an anode catalyst layer 402, an electrolyte membrane 403 and a cathode catalyst layer 404 in this order. According to such a configuration, as a conductive porous layer and a separator are not required, the number of members is decreased and lower cost and higher power density can be achieved.

In addition, as in the embodiment above, each fuel cell layer in the fuel cell stack in the present embodiment is constituted of a plurality of unit cells 401 arranged at intervals, and the unit cells in a single fuel cell layer are aligned such that the unit cells are orthogonal to unit cells in the adjacent fuel cell layer. Thus, a ratio of an area of the anode catalyst layer and the cathode catalyst layer facing the gap region increases and the fuel and the oxidizing agent can efficiently be supplied. An interval between the unit cells arranged within each fuel cell layer is the same as in Embodiment 1 above.

A highly selective catalyst, which is low in reactivity in oxidation reaction of methanol but high in reactivity in reduction reaction of oxygen and protons, is preferably used for cathode catalyst layer 404. Thus, even when methanol reaches the cathode catalyst, a cathode potential can be high and high power-generation efficiency can be achieved. Examples of the highly selective catalysts above include a composite catalyst obtained by having platinum particles carry heteropoly acid ($H_3PW_{12}O_{40}$), a catalyst of a cobalt porphyrin complex, a platinum catalyst to which chloro-substituted cobalt bisdicarbollide complex is adsorbed, an alloy catalyst of Ru (ruthenium) and Se (selenium), an alloy catalyst of Pt, Co and the like, a metal carbide such as tungsten carbide, and the like.

A catalyst or a catalyst layer structure, with which methanol is mainly oxidized but reduction reaction of oxygen is poor, is preferably used for anode catalyst layer 402, and anode catalyst layer 402 is preferably composed of a material promoting methanol oxidation reaction at the anode. Examples of a highly selective catalyst layer structure of anode catalyst layer 402 include such a structure that a carrier of a highly electrically conductive carbon-based material (such as acetylene black, Ketjen Black, amorphous carbon, carbon nanotube, and carbon nanohorn) carrying fine metal particles of Pt or an alloy of Pt and Ru that are catalyst particles and a proton-conductive polymer binder such as NAFION are contained and a surface of the carbon-based material is modified with hydrophilic functional group such as carboxylic acid group or hydroxyl group. Owing to the hydrophilic functional group, anode catalyst layer 402 is infiltrated with the methanol aqueous solution and a coating film of the methanol aqueous solution is formed. Thus, an amount of oxygen that reaches anode catalyst particles is significantly smaller than an amount of the methanol aqueous solution present in anode catalyst layer 402. Consequently, influence by oxygen on reaction in anode catalyst layer 402 can be suppressed and lowering in output characteristics of the fuel cell due to the influence by oxygen can mostly be avoided.

In the present embodiment, preferably, the methanol aqueous solution and oxygen are mixed and the mixture is sprayed or supplied with a pump. As pressure loss is lessened by the gap regions formed to three-dimensionally communicate with one another in the fuel cell stack, the fuel mixture can be supplied to all corners of the fuel cell stack while reducing power consumption by auxiliary equipment such as a pump.

Embodiment 4

Figure 5:
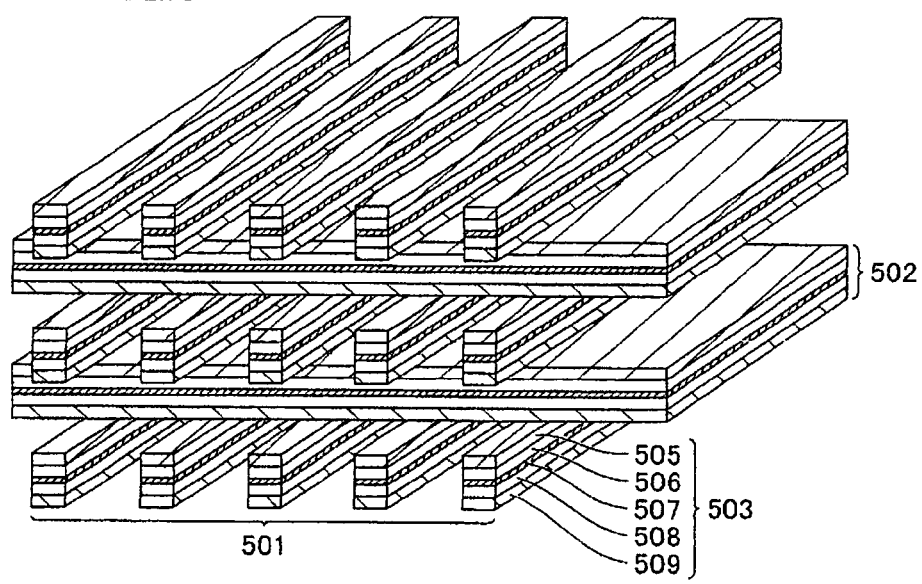
FIG. 5 is a perspective view showing another preferred example of the fuel cell stack according to the present invention.

FIG. 5 is a perspective view showing another preferred example of the fuel cell stack according to the present invention. The fuel cell stack in the present embodiment is formed by alternately stacking a first fuel cell layer 501 and a second fuel cell layer 502. First fuel cell layer 501 includes five first unit cells 503 arranged at a distance from one another, and has a gap region between these first unit cells 503. Each first unit cell 503 has an internal structure the same as the structure shown in FIG. 2. Specifically, each first unit cell 503 has an anode conductive porous layer 509, an anode catalyst layer 508, an electrolyte membrane 507, a cathode catalyst layer 506, and a cathode conductive porous layer 505 in this order. Second fuel cell layer 502 is formed of a single second unit cell and it has no gap region. An internal structure of the second unit cell is the same as that of first unit cell 503. An interval between the unit cells arranged within first fuel cell layer 501 is the same as in Embodiment 1 above.

In such a structure as well, the fuel or the oxidizing agent can be taken into the fuel cell stack through the gap region in first fuel cell layer 501, without the use of auxiliary equipment. Even when the auxiliary equipment is used, pressure loss in supplying the fuel or the oxidizing agent to the inside can be lessened and it can be supplied with low power being consumed. First fuel cell layer 501 having the gap region plays a role as a spacer between second fuel cell layer 502 having no gap region and another second fuel cell layer 502 adjacent thereto having no gap region, so that power generation in a spacer portion can be realized and electrically serial wiring is facilitated.

Embodiment 5

Figure 6:
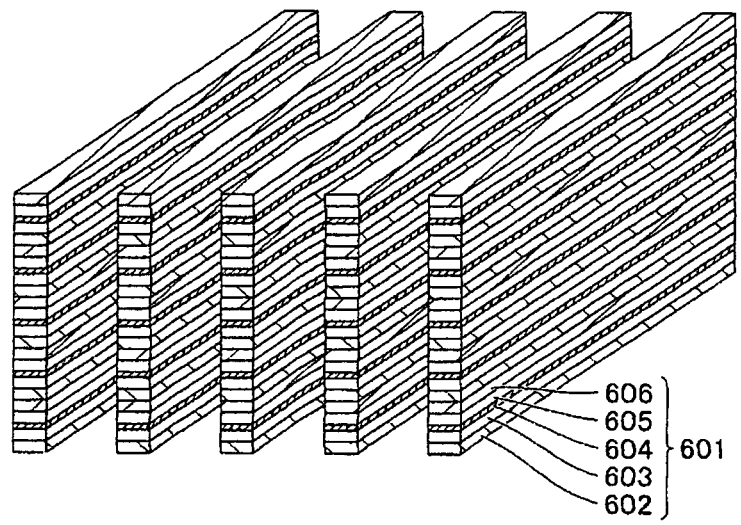
FIG. 6 is a perspective view showing another preferred example of the fuel cell stack according to the present invention.

FIG. 6 is a perspective view showing another preferred example of the fuel cell stack according to the present invention. The fuel cell stack in the present embodiment has a structure formed by stacking five fuel cell layers identical in shape each constituted of five unit cells 601. Each unit cell 601 has an internal structure the same as the structure shown in FIG. 2 and all unit cells are identical in shape. Specifically, each unit cell 601 has an anode conductive porous layer 602, an anode catalyst layer 603, an electrolyte membrane 604, a cathode catalyst layer 605, and a cathode conductive porous layer 606 in this order. In the present embodiment, on the fuel cell layer having five unit cells 601 and the gap regions, the fuel cell layers identical in shape are stacked such that the positions of the unit cells coincide and the positions of the gap regions coincide. Therefore, the structure is such that four large gap regions in total, with individual gap regions being coupled to one another, are provided. An interval between the unit cells arranged within each fuel cell layer is the same as in Embodiment 1 above.

In such a structure as well, the fuel or the oxidizing agent can be taken into the fuel cell stack through the gap region in the fuel cell layer, without the use of auxiliary equipment. Even when the auxiliary equipment is used, pressure loss in supplying the fuel or the oxidizing agent to the inside can be lessened and it can be supplied with low power being consumed.

Embodiment 6

Figure 7:
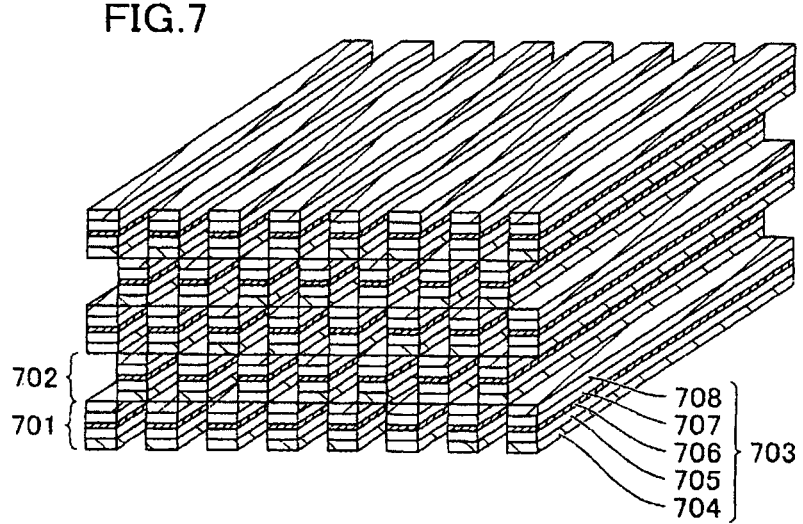
FIG. 7 is a perspective view showing another preferred example of the fuel cell stack according to the present invention.

FIG. 7 is a perspective view showing another preferred example of the fuel cell stack according to the present invention. The fuel cell stack in the present embodiment is formed by alternately stacking a first fuel cell layer 701 constituted of eight unit cells 703 arranged at a distance from one another and a second fuel cell layer 702 constituted of seven unit cells 703 arranged at a distance from one another. The structure of unit cell 703 is the same as in FIG. 2. Specifically, each unit cell 703 has an anode conductive porous layer 704, an anode catalyst layer 705, an electrolyte membrane 706, a cathode catalyst layer 707, and a cathode conductive porous layer 708 in this order. First fuel cell layer 701 and second fuel cell layer 702 are structured such that a gap region is provided between the unit cells and the gap region lies between two adjacent fuel cell layers. The fuel cell layers are stacked in series, and the adjacent fuel cell layers form an electron conduction path, as the anode conductive porous layer and the cathode conductive porous layer come in electrical contact with each other. An interval between the unit cells arranged within each fuel cell layer is the same as in Embodiment 1 above.

In such a structure as well, the fuel or the oxidizing agent can be taken into the fuel cell stack through the gap region in the fuel cell layer, without the use of auxiliary equipment. Even when the auxiliary equipment is used, pressure loss in supplying the fuel or the oxidizing agent to the inside can be lessened and it can be supplied with low power being consumed.

Embodiment 7

Figure 8:
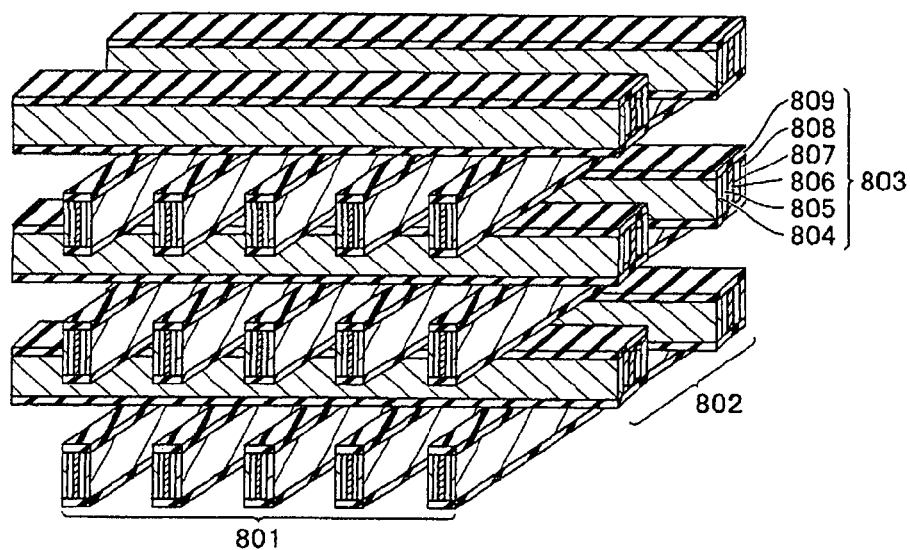
FIG. 8 is a perspective view showing another preferred example of the fuel cell stack according to the present invention.

FIG. 8 is a perspective view showing another preferred example of the fuel cell stack according to the present invention. The fuel cell stack in the present embodiment is formed by alternately stacking a first fuel cell layer 801 constituted of five unit cells 803 arranged at a distance from one another and a second fuel cell layer 802 constituted of two unit cells 803 arranged at a distance from each other, and a gap region is provided between the unit cells. An internal structure of unit cell 803 is similar to that in FIG. 2. Specifically, each unit cell 803 has an anode conductive porous layer 804, an anode catalyst layer 805, an electrolyte membrane 806, a cathode catalyst layer 807, and a cathode conductive porous layer 808 in this order. An interval between the unit cells arranged within each fuel cell layer is the same as in Embodiment 1 above.

Here, a direction of stack of the members above constituting each unit cell 803 is perpendicular to the direction of stack of the fuel cell layers. In addition, each unit cell 803 has an insulating layer 809 on each of upper and lower surfaces of the fuel cell layer in the direction of stack. Thus, the fuel cell layers are electrically insulated from one another, so that a current in each unit cell is drawn toward an end portion through anode conductive porous layer 804 and cathode conductive porous layer 808, collected there, and extracted to the outside. According to such a configuration, as a surface of anode conductive porous layer 804 and a surface of cathode conductive porous layer 808 can occupy a larger area of a unit cell surface facing the gap region between the unit cells, supply of the fuel or the oxidizing agent can be improved and convection resistance can be lowered. Power generation efficiency can thus be improved.

Further, the fuel or the oxidizing agent can be taken into the fuel cell stack through the gap region in the fuel cell layer without the use of auxiliary equipment. Even when the auxiliary equipment is used, pressure loss in supplying the fuel or the oxidizing agent to the inside can be lessened and it can be supplied with low power being consumed.

Embodiment 8

Figure 9:
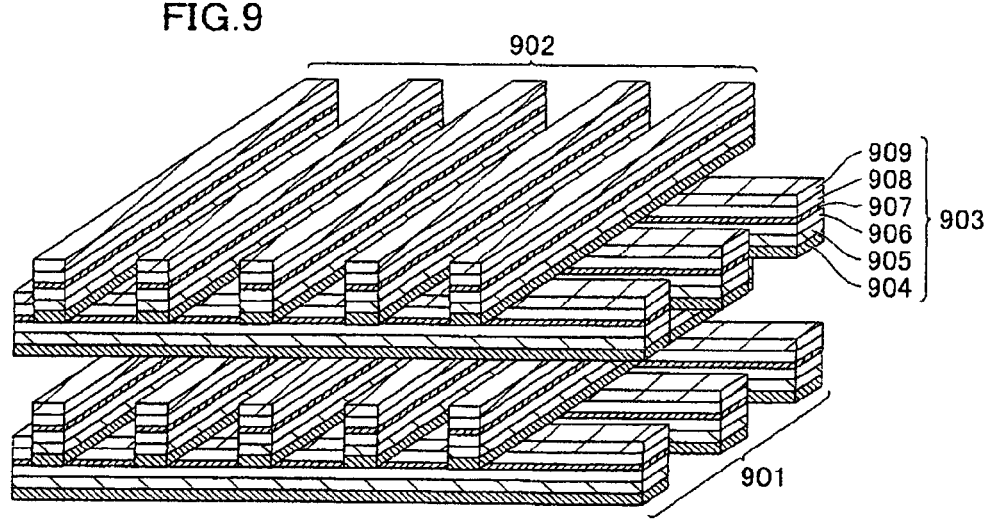
FIG. 9 is a perspective view showing another preferred example of the fuel cell stack according to the present invention.

FIG. 9 is a perspective view showing another preferred example of the fuel cell stack according to the present invention. The fuel cell stack in the present embodiment is formed by alternately stacking a first fuel cell layer 901 constituted of three unit cells 903 arranged at a distance from one another and a second fuel cell layer 902 constituted of five unit cells 903 arranged at a distance from one another. Each unit cell 903 has a separator 904, an anode conductive porous layer 905, an anode catalyst layer 906, an electrolyte membrane 907, a cathode catalyst layer 908, and a cathode conductive porous layer 909 in this order. A direction of stack of the members above constituting each unit cell 903 is in parallel to the direction of stack of the fuel cell layers. Each fuel cell layer is structured such that a gap region is provided between the unit cells and a part of the gap region lies between two adjacent fuel cell layers. The fuel cell layers are stacked in series, and the adjacent fuel cell layers form an electron conduction path, as cathode conductive porous layer 909 and separator 904 come in electrical contact with each other. An interval between the unit cells arranged within each fuel cell layer is the same as in Embodiment 1 above.

Figure 10:
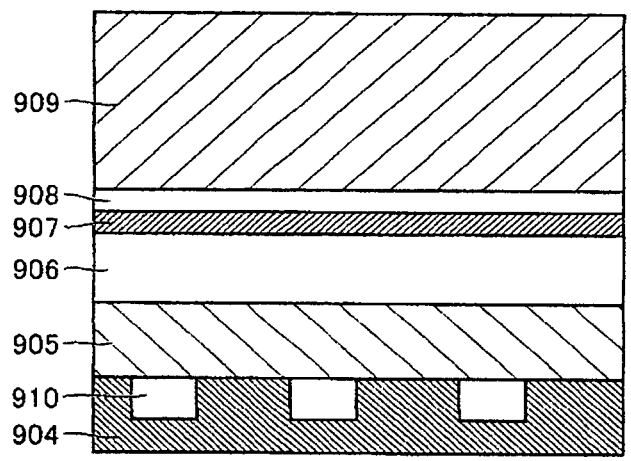
FIG. 10 is an enlarged cross-sectional view of the unit cell in FIG. 9.

FIG. 10 is an enlarged cross-sectional view of unit cell 903 in FIG. 9. As shown in FIG. 10, unit cell 903 has separator 904 in which a fuel flow channel 910 is formed, on a surface of anode conductive porous layer 905 opposite to a surface in contact with anode catalyst layer 906.

Here, separator 904 is preferably formed of an electrically conductive material. In addition, in order to avoid exhaust of the fuel through separator 904 to the outside of unit cell 903, separator 904 preferably has no opening hole. Moreover, in order to avoid exhaust of the fuel to the outside of unit cell 903, separator 904 and electrolyte membrane 907 are preferably bonded to each other with a sealant or an adhesive at left and right end portions in FIG. 10, with anode catalyst layer 906 and anode conductive porous layer 905 being interposed.

The fuel reaches anode conductive porous layer 905 through fuel flow channel 910 by means of auxiliary equipment such as a pump and it is supplied to anode catalyst layer 906 through anode conductive porous layer 905. Therefore, generated carbon dioxide is exhausted to the outside through fuel flow channel 910 together with unreacted fuel, by means of the auxiliary equipment such as a pump.

In the present invention, in a case of a structure where a fuel supply flow channel is completely separate from an oxidizing agent supply flow channel, a substance supplied through the gap region in the fuel cell layer does not necessarily have to be air serving as the oxidizing agent, and the fuel may be supplied through the gap region. In this case, the anode and the cathode are reversed, so that the oxidizing agent can be supplied through a flow channel provided in the cathode conductive porous layer. For example, in the embodiment shown in FIG. 10, the oxidizing agent may be separated by separator 904 and supplied through fuel flow channel 910 formed within separator 904, while the reducing agent may be supplied through the gap region in the fuel cell layer.

According to the structure of the fuel cell stack in the present embodiment, the air can be taken into the fuel cell stack through the gap region in the fuel cell layer without the use of auxiliary equipment. Even when the auxiliary equipment is used, pressure loss in supplying the fuel or the oxidizing agent to the inside can be lessened and it can be supplied with low power being consumed.

Embodiment 9

FIG. 11 is a schematic diagram showing another preferred example of the fuel cell stack according to the present invention, FIG. 11(*a*) being a top view thereof and FIG. 11(*b*) being a side view. In the present embodiment, in each fuel cell layer, unit cells 1101 are arranged such that a gap region provided between unit cells 1101 is wider in a central portion in the fuel cell stack. Specifically, in each fuel cell layer, unit cells 1101 are arranged such that a width of a gap region located around the center of the fuel cell layer is greater than a width of a gap region located proximate to an outer peripheral portion. Consequently, a space volume of the gap region located in the central portion in the fuel cell stack is greater than that of the gap region located at an end portion of the fuel cell stack. Thus, the gap region is greater toward the central portion of the fuel cell layer in at least one direction within the surface of the fuel cell layer, so that the gap region along a vertical line in the center when viewed from a side surface of the fuel cell stack and the gap region along a line extending from a central gap to a direction of depth when viewed from the top of the fuel cell stack are wider. In natural air supply, oxygen concentration around the central portion of the fuel cell stack is lower than around an outer periphery of the stack. According to the fuel cell stack structure in the present embodiment, however, as shown in FIG. 11(*b*), pressure loss in sending air toward the central portion of the fuel cell stack in a direction from a lower surface to an upper surface of the fuel cell stack (in a direction from the rear to the front in the plane in FIG. 11(*a*)) into the fuel cell stack, for example, by using a fan or a blower, is lessened. Therefore, the air is readily supplied to the central portion of the fuel cell stack and oxygen concentration around the central portion of the fuel cell stack can be raised. Consequently, power generation characteristics of the fuel cell stack can be improved. It is noted that an internal structure of each unit cell 1101 can be the same as the structure in FIG. 2.

In the present embodiment, unit cell 1101 is preferably arranged in such an orientation that a surface thereof on the cathode side, with the electrolyte membrane serving as the reference, faces the flow of the air, that is, such an orientation that the cathode catalyst layer side and the anode catalyst layer side are upstream and downstream of the flow of the air, respectively, with the electrolyte membrane serving as the reference. Thus, the air readily reaches the cathode catalyst layer through the cathode conductive porous layer and diffusion resistance of oxygen can be lowered, which brings about improvement in power generation efficiency and higher power density of the fuel cell stack. In addition, by arranging the unit cells in such an orientation, difference in oxygen partial pressure between the inside and the outside of the fuel cell stack can be made smaller and difference in a power generation amount per power generation area (power generation variation) can be reduced. As a portion where a power generation amount locally increases can thus be decreased, load due to local heat or load due to overvoltage of the catalyst can be suppressed, and lowering in output characteristics can be suppressed. Moreover, power generation by the fuel cell stack warms the air inside and upward convection of the warmed air is caused. Here, as the space along the vertical line in the central portion is large, an effect of convection can be enhanced. Further, as heat inside the fuel cell stack can efficiently be radiated, excessive temperature increase can be prevented.

In the present embodiment, whichever surface of the fuel cell stack may face upward, the gap region along the vertical line in the center is great and hence heat convection of the air can promote supply of the air into the fuel cell stack. Therefore, the air can satisfactorily be taken into the fuel cell stack without the use of auxiliary equipment such as a pump or a fan.

Figure 12:
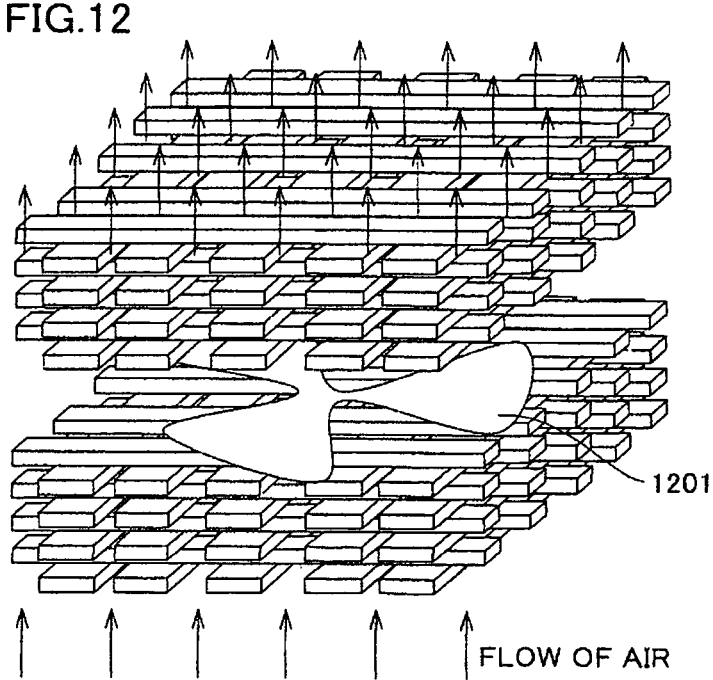
FIG. 12 is a perspective view showing an example of the fuel cell stack including a fan inside.

In using a fan or a blower, preferably, it is fixed and arranged such that a surface shown in FIG. 11(*a*) faces up and the flow of the air is caused in the direction the same as the flow of heat convection by means of the fan or the blower. As an amount of the air supplied by the fan or the blower can thus be decreased, the fuel cell can generate electric power with lower power consumption. In addition, when the air is supplied by using the fan, a fan 1201 is preferably provided within the fuel cell stack as shown in FIG. 12. Alternatively, when a fuel cell system has two or more fuel cell stacks, the fan is preferably provided between these fuel cell stacks. Thus, the inside air of which oxygen partial pressure has been lowered can forcibly be exhausted to the outside and fresh air is taken in, so that the air in the fuel cell stack can efficiently be changed.

In the case of the fuel cell stack in the present embodiment, the entire power generation area itself is as large as in the fuel cell stack in FIG. 3 described previously. Meanwhile, power generation characteristics and power density of the fuel cell stack can be improved by making higher power generation area density (fuel cell density) of the fuel cell in the outer peripheral portion of the fuel cell stack where air is readily supplied while lowering power generation area density (fuel cell density) in the central portion of the fuel cell layer and reducing pressure loss in air supply into the fuel cell stack. According to the present embodiment, such improvement in the power generation characteristics and power density of the fuel cell stack can be achieved with a simplified method of designing as appropriate the gap regions in the fuel cell stack.

In the present embodiment, preferably, the width of the gap region (the distance between the unit cells) is set to 0.1 mm to 2 mm in the case of a small gap and set to approximately 2 mm to 5 mm in the case of a large gap.

Here, any of the fuel cell stacks according to Embodiments 1 to 9 described above is preferably arranged such that the air readily escapes toward the upper surface with respect to a ground surface when the air in the fuel cell stack is warmed by heat generated during power generation and heat convection occurs. In addition, with respect to the flow of the air due to heat convection, preferably, the cathode catalyst layer side and the anode catalyst layer side are located upstream and downstream of the flow of the air respectively, with the electrolyte membrane serving as the reference. Thus, as the air readily reaches the cathode catalyst layer through the cathode conductive porous layer, reduction in diffusion resistance of the oxygen can be achieved, which brings about improvement in power generation efficiency and higher power density of the fuel cell stack.

In addition, in any of the fuel cell stacks according to Embodiments 1 to 9 described above, when the flow of the air is caused by such auxiliary equipment as a fan, a blower or an air pump to supply the air to the fuel cell stack, the flow of the air caused by the auxiliary equipment is preferably caused in the direction the same as the direction of heat convection. The flow of the air inside the fuel cell stack can thus be improved without preventing the flow by heat convection. As described previously, with respect to such flow of the air, preferably, the cathode catalyst layer side and the anode catalyst layer side are located upstream and downstream of the flow of the air respectively, with the electrolyte membrane serving as the reference.

Embodiment 10

FIG. 13 is a schematic diagram showing another preferred example of the fuel cell stack according to the present invention, FIG. 13(*a*) being a side view thereof and FIG. 13(*b*) being a top view. As shown in FIG. 13(*a*), the fuel cell stack according to the present embodiment is configured such that a central fuel cell layer 1301 has a largest thickness and a fuel cell layer has a smaller thickness toward a direction of an end of the fuel cell stack (in a vertical direction in FIG. 13(*a*)). In FIG. 13(*a*), a gap region in the fuel cell stack is wide along a central line, while a gap region along a line closer to an upper or lower end of the fuel cell stack is narrow. The gap regions are equal in area of a cross-section perpendicular to the direction of stack of the fuel cell layers (see FIG. 13(*b*)), however, the fuel cell layer has a thickness (a thickness of the unit cell) greater toward the center. Therefore, a space volume of the gap region is greater toward the center. An interval between the unit cells arranged within each fuel cell layer is the same as in Embodiment 1 above. According to the configuration in the present embodiment as well, an effect the same as in the fuel cell stack in FIG. 11 can be obtained.

The fuel cell stack in the present embodiment can be installed, for example, such that the air flows from a direction shown with an arrow in FIG. 13 by means of a fan or a blower and it is supplied to the inside of the fuel cell stack. Thus, pressure loss in the fuel cell stack is lessened, air can be supplied to the inside of the fuel cell stack with low power consumption by the fan or the blower, and power density of the overall fuel cell system can be improved.

Figure 14:
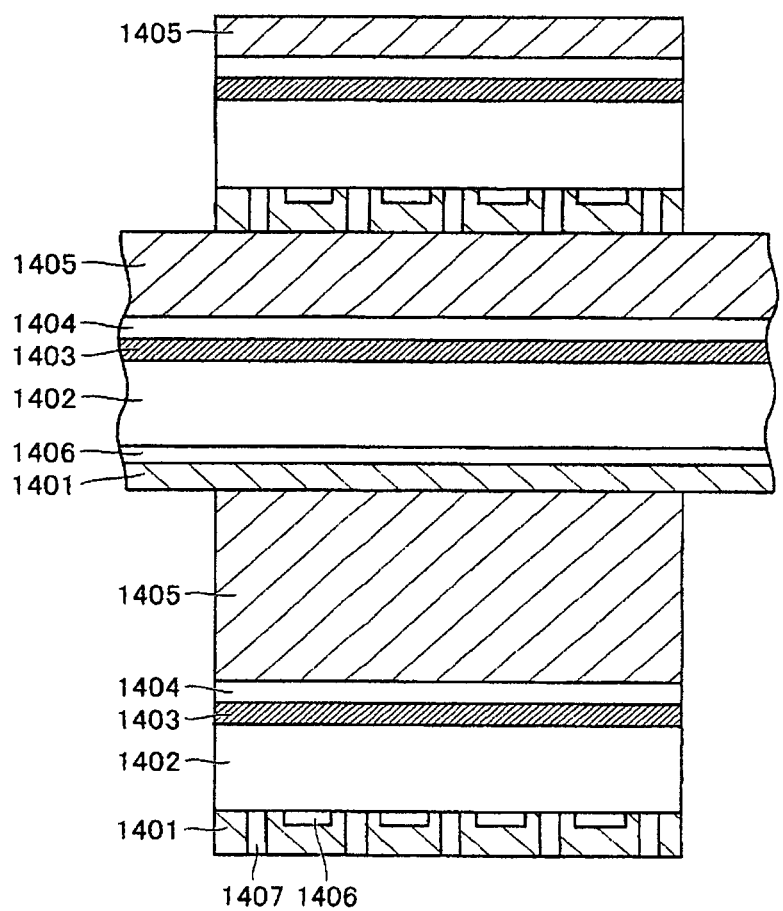
FIG. 14 is an enlarged detail view of a region A in FIG. 13(a).

FIG. 14 is an enlarged detail view of a region A shown in FIG. 13(*a*). An internal structure of each unit cell is the same as the structure shown in FIG. 2. In the present embodiment, as shown in FIG. 14, a thickness of the fuel cell layer is varied by adjusting a thickness of a cathode conductive porous layer 1405. It is noted that the thickness of the fuel cell layer can be adjusted also by varying a thickness of each member, without limited to cathode conductive porous layer 1405.

In addition, in a portion where the fuel cell layers intersect and come in contact with each other, air is supplied from a cross-section of cathode conductive porous layer 1405 and the air reaches a cathode catalyst layer 1404. Therefore, a greater thickness of cathode conductive porous layer 1405 increases an amount of supply of oxygen and thus output current density can be high, which is preferred. The power generation characteristics can thus be improved. Namely, by increasing the thickness of cathode conductive porous layer 1405 in the central portion of the fuel cell stack, not only the air can readily be taken into the fuel cell stack but also the power generation characteristics in the portion where the fuel cell layers intersect and come in contact with each other can be improved. In addition, air is supplied well around an outer surface of the fuel cell stack than around the central portion, and hence a partial pressure of oxygen in the air is also high. Accordingly, relatively good power generation characteristics are obtained. Therefore, the thickness of the cathode conductive porous layer in the fuel cell layer in the central portion of the fuel cell stack is made larger to improve passage of the air. Meanwhile, by making smaller the thickness of the cathode conductive porous layer in the fuel cell layer close to the outer surface of the fuel cell stack as well, power density of the fuel cell stack as a whole is improved.

Embodiment 11

Figure 15:
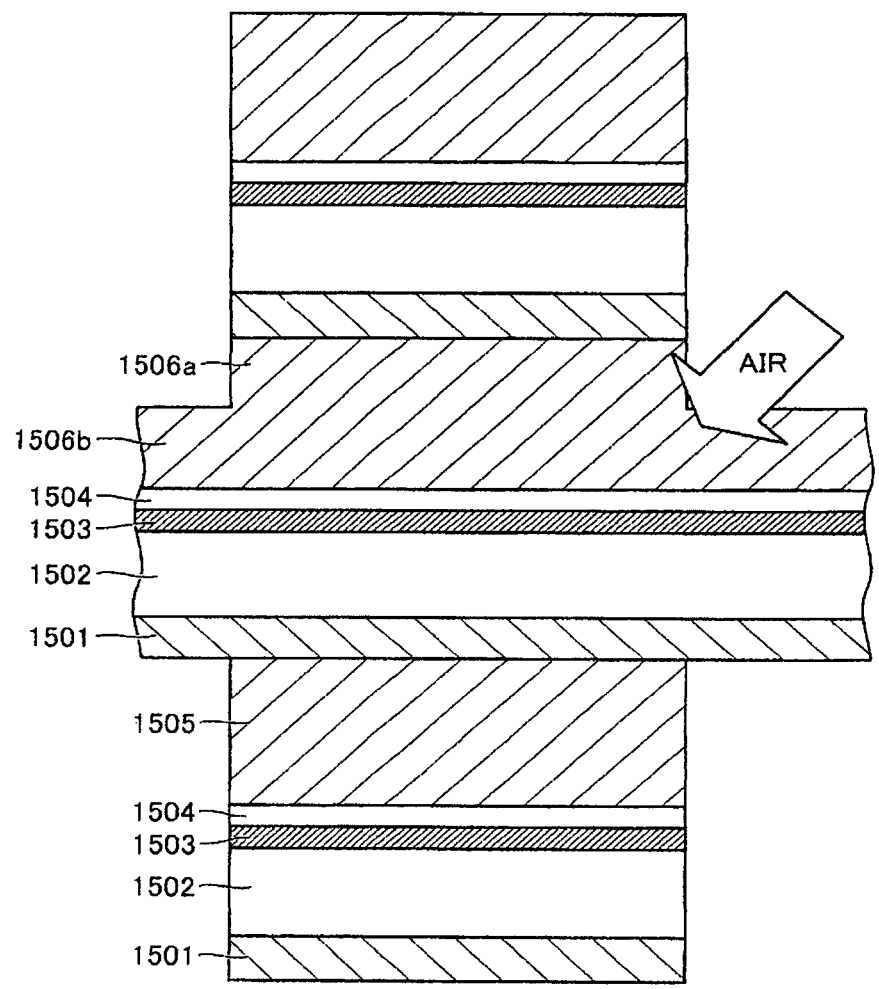
FIG. 15 is a partially enlarged schematic cross-sectional view of another preferred example of the fuel cell stack according to the present invention.

FIG. 15 is a partially enlarged schematic cross-sectional view of another preferred example of the fuel cell stack according to the present invention. An overall configuration of the fuel cell stack in the present embodiment can be as shown, for example, in FIG. 3. An interval between the unit cells arranged within each fuel cell layer is the same as in Embodiment 1 above. In the present embodiment, a cathode conductive porous layer 1506*a* located at a portion of contact between the stacked, adjacent fuel cell layers has a larger thickness than a cathode conductive porous layer 1506*b* in a portion other than the portion of contact. A single cathode conductive porous layer having a large thickness only in the portion of contact may be adopted as the cathode conductive porous layer, or the thickness may be ensured by layering two or more cathode conductive porous layers only at the portion of contact. At that contact portion, the air diffuses within the cathode conductive porous layer in a direction along the plane perpendicular to the direction of layer thickness of the cathode conductive porous layer, and oxygen is supplied to a cathode catalyst layer 1504. Accordingly, as the cathode conductive porous layer at the contact portion is greater in thickness, an amount of oxygen that can be introduced in the cathode conductive porous layer increases and a larger amount of air can be supplied to cathode catalyst layer 1504. Therefore, a limit amount of current that can be extracted increases and an amount of oxygen in the vicinity of cathode catalyst layer 1504 increases, so that diffusion resistance of oxygen can be lowered and power generation efficiency can be improved.

In addition, by making smaller the thickness of the cathode conductive porous layer located in a portion other than the portion of contact, the gap region within the fuel cell stack becomes greater and a passageway for the air is wider. Accordingly, air is readily introduced in the fuel cell stack and convection of air in the fuel cell stack is satisfactory. Moreover, as a distance traveled by oxygen within the cathode conductive porous layer to reach the cathode catalyst layer becomes shorter, diffusion resistance of oxygen can be lowered and power generation characteristics can be improved. So long as the thickness of the fuel cell layer in the portion other than the portion of contact is decreased, convection of the air within the fuel cell stack is satisfactory and hence a layer to be made thinner is not limited to the cathode conductive porous layer. From a point of view of improvement in power generation efficiency through lowering in convection resistance of oxygen, it is preferred to increase the thickness of the cathode conductive porous layer at the portion of contact and to decrease the thickness of the cathode conductive porous layer in a portion other than the portion of contact. Power density of the fuel cell stack can thus be improved.

Embodiment 12

FIG. 16 is a schematic diagram showing another preferred example of the fuel cell stack according to the present invention, FIG. 16(*a*) being a top view and FIG. 16(*b*) being a side view. In the present embodiment, as shown in FIG. 16(*a*), among a plurality of unit cells constituting each fuel cell layer, a unit cell having a width smaller toward a center of the fuel cell layer is adopted as a unit cell 1601 located in a central portion of the fuel cell stack. The "width" herein refers to a width in a direction perpendicular to a longitudinal direction of the unit cell. Thus, a cross-sectional area of the gap region in the central portion of the fuel cell layer (a cross-sectional area in a direction perpendicular to the direction of stack) and a space volume are greater than those in a peripheral portion thereof. It is noted that each unit cell is configured as in FIG. 2. The fuel cell layers are identical in shape, and the fuel cell layers are stacked such that the unit cells constituting one fuel cell layer of the adjacent fuel cell layers are orthogonal to the unit cells constituting the other fuel cell layer. An interval between the unit cells arranged within each fuel cell layer is the same as in Embodiment 1 above.

According to such a configuration, for example as shown in. FIG. 16(*b*), when the fuel cell stack is installed such that the air flows from the lower surface of the fuel cell stack toward the upper surface (the surface shown in FIG. 16(*a*)), the gap region is greater toward the central portion in a plane perpendicular to the direction of flow of the air. Accordingly, pressure loss of the air that passes through the central portion of the fuel cell stack is reduced, the air is readily supplied to the central portion of the fuel cell stack, and power generation characteristics of the fuel cell stack can be improved. In addition, as the air readily flows to the central portion of the fuel cell stack, pressure of the air supplied by such auxiliary equipment as a fan or a blower can be lowered. Therefore, power consumption by the auxiliary equipment can be reduced and power density of the fuel cell system as a whole including the fuel cell stack and the auxiliary equipment can be increased. Further, an effect the same as in the embodiment shown in FIG. 11 is obtained. Though FIG. 16 shows an example where a width of the unit cell continuously decreases toward the central portion, the width of the unit cell may be decreased in a stepped manner (in a stepwise fashion).

Embodiment 13

Figure 17:
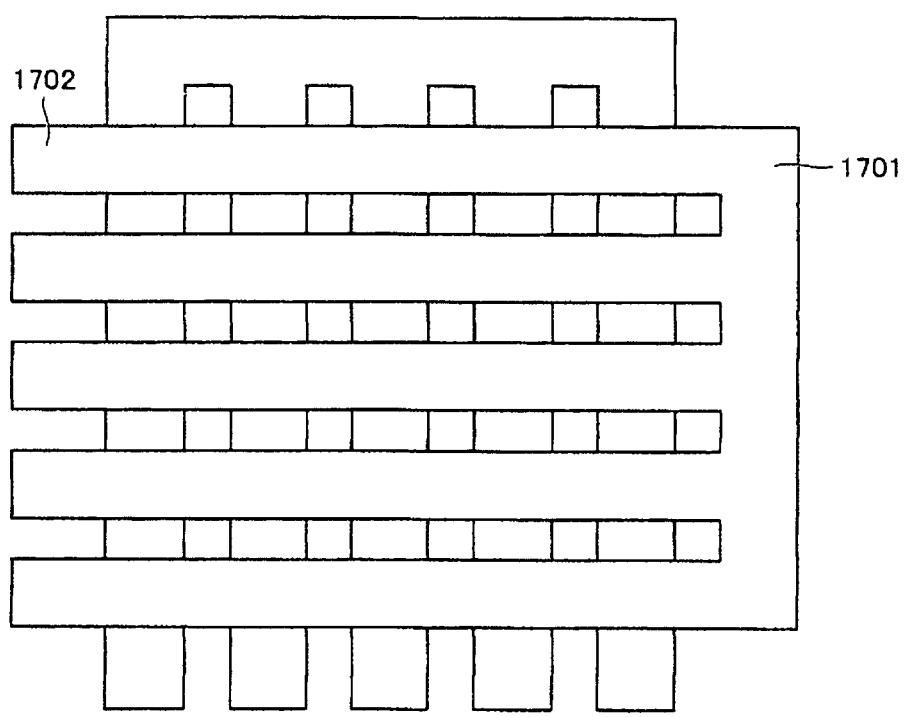
FIG. 17 is a top view showing another preferred example of the fuel cell stack according to the present invention.

FIG. 17 is a top view showing another preferred example of the fuel cell stack according to the present invention. In the present embodiment, each fuel cell layer is formed of a single comb-shaped unit cell 1701 having five comb teeth. Specifically, each fuel cell layer 1701 is formed of a single unit cell including a branch portion 1702 having a shape elongated in a longitudinal direction within the fuel cell layer. Branch portions 1702 are identical in a direction of elongation and arranged in parallel to one another. Here, the comb shape refers to such a shape that elongated comb teeth portions are all joined together at one end. In the present embodiment, a gap region refers to a space between the comb teeth. The fuel cell layers are identical in shape and stacked as alternately rotated by 90°. Each unit cell can have an internal structure the same as in FIG. 2. An interval between the comb teeth is the same as in Embodiment 1 above.

According to such a structure, at least two surfaces of side surfaces of the fuel cell stack as well as an upper surface and a lower surface thereof have a gap for air intake. Therefore, convection of air caused by heat is likely to occur and the air can satisfactorily be taken into the fuel cell stack without using such auxiliary equipment as a pump or a fan. In addition, even when the auxiliary equipment such as a pump or a fan is used, the air can be supplied with low power consumption.

Here, as shown in FIG. 17, the fuel cell layers are preferably stacked such that the gap region is formed also in a root portion of the comb-shaped fuel cell layer when viewed in the direction of stack of the fuel cell layers. Thus, the air can be taken into the fuel cell stack also from the surface where the root portion of the comb is located. In addition, in mounting the fuel cell stack in the present embodiment on equipment, if two surfaces of the fuel cell stack are covered with wall surfaces of the equipment, the fuel cell stack is preferably arranged such that the root portion of the comb-shaped unit cell (a comb teeth coupling portion) is located on a wall surface side of the equipment.

In the fuel cell stack in the present embodiment, the fuel cell layer is formed of a single unit cell as described above. Such a configuration is preferred in that time and effort for aligning a plurality of unit cells can be eliminated, positioning of the gap region is facilitated, lowering in yield due to operational error such as dropping can also be suppressed, and manufacturing cost can be reduced. Further, a power generation area can be increased at a connecting portion at an outer peripheral portion (the root portion of the comb-shaped unit cell).

Though not shown, a width (a width in a direction perpendicular to the longitudinal direction of the branch portion) of the branch portion (the comb tooth portion) when viewed from the upper surface (the surface shown in FIG. 17) preferably decreases toward the center of the fuel cell layer within the surface of the fuel cell layer. Thus, an effect the same as in the fuel cell stack in FIG. 16 can further be obtained.

A structure shown in FIGS. 18(*a*) to (*c*) can be illustrated as other structures having portions elongated in a longitudinal direction and a portion where the elongated portions are connected together. FIG. 18(*a*) shows an antenna shape, FIG. 18(*b*) shows a gear wheel shape, and FIG. 18(*c*) shows a serpentine shape. The serpentine shape is preferred, for example, in that the fuel at the anode electrode is readily fed to all corners and circulated by means of such auxiliary equipment as a pump and a volume of a flow channel in a portion other than the fuel cell can be decreased.

Embodiment 14

Figure 19:
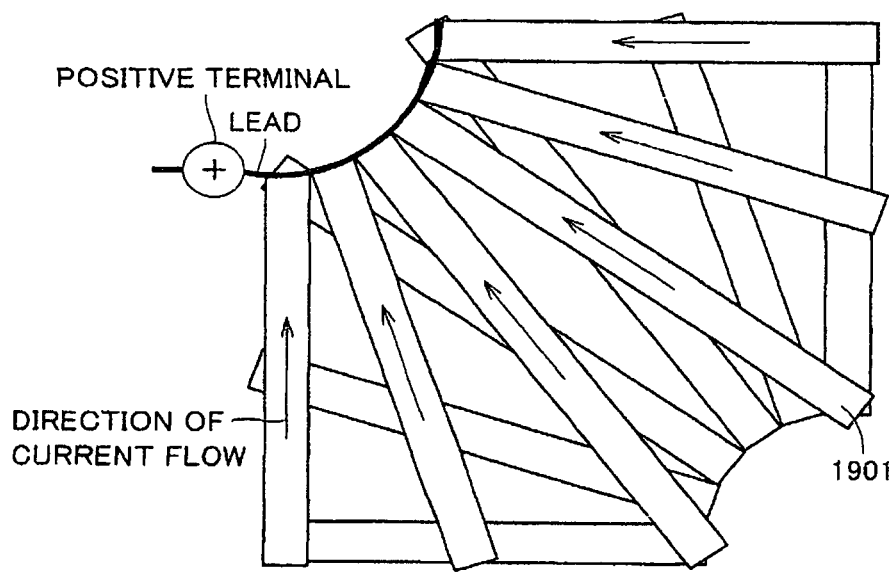
FIG. 19 is a top view showing another preferred example of the fuel cell stack according to the present invention.
Figure 20:
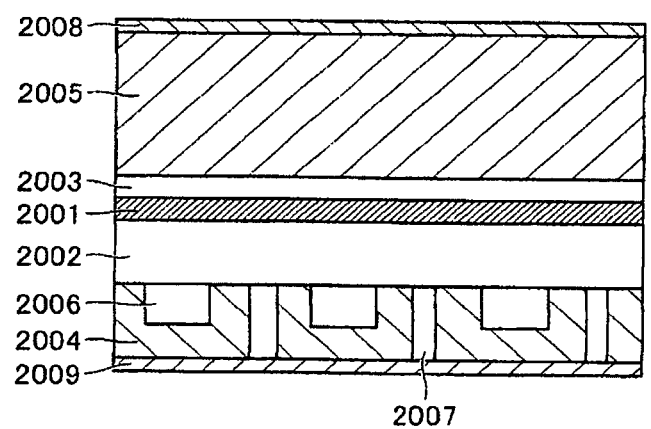
FIG. 20 is a cross-sectional view of a unit cell forming an uppermost fuel cell layer in the fuel cell stack shown in FIG. 19.

The fuel cell stack according to the present embodiment will be described with reference to FIGS. 19 and 20. FIG. 19 is a top view of the fuel cell stack according to the present embodiment, and FIG. 20 is a cross-sectional view of a unit cell forming an uppermost fuel cell layer in the fuel cell stack according to the present embodiment. As shown in FIG. 19, unit cells 1901 forming each fuel cell layer are characterized in that they are arranged in a fan shape within the fuel cell layer and gap regions are provided such that one ends in a direction of length of unit cells 1901 concentrate at one point. By arranging the unit cells as shown in FIG. 19, when the fuel cell layers are stacked, the gap region in a central portion when viewed in the direction of stack can be great.

In the present embodiment, the unit cell forming the uppermost fuel cell layer preferably has an internal structure in which a cathode current collector 2008 corresponding to an electron supply electrode is arranged on a cathode conductive porous layer 2005 and an anode current collector 2009 corresponding to an electron extraction electrode is arranged on an anode conductive porous layer 2004, as shown in FIG. 20. Cathode current collector 2008 is in electrical contact with cathode conductive porous layer 2005, and cathode current collector 2008 is preferably identical in shape to the unit cell when viewed from the upper surface, so as not to deteriorate diffusion of air as it lies over the gap region in the fuel cell stack.

In a fuel cell stack as in the present invention in which unit cells are stacked in the number sign shape and fuel cell layers are arranged electrically in series, an area where a current flows in the in-plane direction is small, except for opposing ends of the fuel cell stack, and hence the unit cells in the fuel cell layer constituting an inner portion of the fuel cell stack do not necessarily require an anode current collector and a cathode current collector. For example, when a cathode electrode of the unit cell constituting an uppermost fuel cell layer in the fuel cell stack (that is, on the cathode catalyst layer side with the electrolyte membrane serving as the reference) is located at an uppermost portion of the fuel cell layer and an anode electrode of the unit cell constituting a lowermost fuel cell layer in the fuel cell stack (that is, on the anode catalyst layer side with the electrolyte membrane serving as the reference) is located at a lowermost portion of the fuel cell layer, the configuration may be such that only the cathode current collector is provided on the uppermost layer of the fuel cell stack while it is electrically connected to the cathode catalyst layer, only the anode current collector is provided on the lowermost layer of the fuel cell stack while it is electrically connected to the anode catalyst layer, and the unit cells in the fuel cell layers constituting the inner portion of the fuel cell stack are not provided with anode current collectors and cathode current collectors. According to such a configuration, decrease in the number of parts of the fuel cell stack, reduction in thickness, cost reduction, and the like can be achieved. The anode current collector and the cathode current collector will be described hereinafter.

The anode current collector basically corresponds to an electron extraction electrode of the fuel cell stack as described above, and it has a function to supply and receive electrons to/from the anode conductive porous layer. In the anode current collector, as a current flows in a direction of its length (in-plane direction), a distance for electron conduction is longer than in the anode conductive porous layer. Therefore, a material having good electrical conductivity is preferably used. The need for the anode current collector depends on electrical conductivity of the anode conductive porous layer. When the anode conductive porous layer is made, for example, of a carbon material, an electrically conductive polymer or the like and electrical conductivity is relatively low, electrical conductivity can be improved by providing the anode current collector in the fuel cell stack. In contrast, when the anode conductive porous layer is made, for example, of a metal or the like and electrical conductivity is relatively high, it is not particularly necessary to provide an anode current collector. Meanwhile, when electrical conductivity of the anode conductive porous layer is relatively low, an anode current collector may be provided for each unit cell for the purpose of assisting electron conduction in the anode conductive porous layer and to lower electron conduction resistance, and in this case, the anode current collector is added to the configuration of the unit cell.

For suppression of voltage lowering, a noble metal such as Au, Pt and Pd, a metal such as Ti, Ta, W, Nb, Ni, Al, Cr, Ag, Cu, Zn, and Su, Si, a nitride, a carbide or the like thereof, an alloy such as stainless, Cu—Cr, Ni—Cr and Ti—Pt, and the like, that are low in electron conduction resistance, are preferably used as a material for the anode current collector, and at least one element selected from the group consisting of Pt, Ti, Au, Ag, Cu, Ni, and W is further preferably contained. In addition, when a metal poor in corrosion resistance under acid atmosphere such as Cu, Ag and Zn is used, a noble metal such as Au, Pt and Pd and a metal material having corrosion resistance, an electrically conductive polymer, an electrically conductive nitride, an electrically conductive carbide, an electrically conductive oxide, and the like may be used as a surface coating.

The shape of the anode current collector is not particularly limited, however, a penetrating or communicating hole in the anode conductive porous layer preferably communicates with a hole provided in the anode current collector in that efficiency in exhausting the exhaust gas generated in the anode catalyst layer is excellent. The anode current collector is preferably formed of a porous metal layer having a plurality of holes penetrating in a direction of layer thickness, and such a shape can preferably be illustrated by a shape having a plurality of holes in a plate or a foil, or a mesh or an expanded metal. As the holes in the anode conductive porous layer and the holes in the anode current collector communicate with one another, carbon dioxide can efficiently be exhausted and partial pressure of carbon dioxide within the anode catalyst layer and the anode conductive porous layer can be lowered. Thus, peel-off at an interface between the anode catalyst layer and the anode conductive porous layer and an interface between the anode current collector and the anode conductive porous layer can be suppressed.

The cathode current collector corresponds to an electron supply electrode of the fuel cell stack as described above, and it has a function to supply and receive electrons to/from the cathode conductive porous layer. In the cathode current collector, as a current flows in a direction of its length (in-plane direction), a distance for electron conduction is longer than in the cathode conductive porous layer. Therefore, a material having good electrical conductivity is preferably used. The need for the cathode current collector depends on electrical conductivity of the cathode conductive porous layer. When the cathode conductive porous layer is made, for example, of a carbon material, an electrically conductive polymer or the like and electrical conductivity is relatively low, electrical conductivity can be improved by providing the cathode current collector in the fuel cell stack. In contrast, when the cathode conductive porous layer is made, for example, of a metal or the like and electrical conductivity is relatively high, it is not particularly necessary to provide a cathode current collector. Meanwhile, when electrical conductivity of the cathode conductive porous layer is relatively low, a cathode current collector may be provided for each unit cell for the purpose of assisting electron conduction in the cathode conductive porous layer and to lower electron conduction resistance, and in this case, the cathode current collector is added to the configuration of the unit cell.

A material for the cathode current collector may be the same as that for the anode current collector, however, for example, a noble metal such as Au, Pt and Pd, a metal such as Ti, Ta, W, Nb, and Cr, a nitride, a carbide or the like thereof, an alloy such as stainless, Cu—Cr, Ni—Cr and Ti—Pt, and the like are preferably used. In addition, when a metal poor in corrosion resistance under acid atmosphere such as Cu, Ag, Zn, and Ni is used, a noble metal and a metal material having corrosion resistance, an electrically conductive polymer, an electrically conductive oxide, an electrically conductive nitride, an electrically conductive carbide, and the like may be used as a surface coating.

The shape of the cathode current collector is not particularly limited so long as it has a communicating hole allowing supply of oxygen in the air outside the cathode current collector to the cathode conductive porous layer or to the cathode catalyst layer, however, for example, a foam metal, a metal web, a sintered metal, a shape having a plurality of holes in a plate or a foil, or a metal mesh or an expanded metal may be used. The cathode current collector has porosity preferably of 30% or higher for lowering diffusion resistance of oxygen and preferably of 95% or lower for lowering electrical resistance, and more preferably has porosity from 50% to 85%.

In the present embodiment, the anode current collector and the cathode current collector are arranged to be in electrical contact with respective opposing ends (a lower end and an upper end) of the uppermost fuel cell layer in the direction of stack. Therefore, it is not necessary to provide a current collector for each unit cell and the number of members can be decreased. In addition, at the opposing ends of the uppermost fuel cell layer in the direction of stack, the current flows in a direction of length of the unit cell and is collected. Accordingly, by providing a current collector having high electrical conductivity, resistance in electrical conduction can be lowered. In addition, in the present embodiment, one ends of the unit cells in a direction of length are arranged to concentrate at one point and the cathode current collector and the anode current collector form a positive terminal and a negative terminal, respectively. An arrow shown in FIG. 19 shows a direction of flow of a current in the cathode current collector. As the ends of the current collector concentrate at one point, wire routing is easy and air intake is not disturbed by reduction in size of the fuel cell stack or wire routing. When a switch circuit which will be described later is provided, the current collector is preferably insulated from a current collector provided in another unit cell.

It is noted that unit cells other than the unit cells constituting the uppermost fuel cell layer, for example, all unit cells constituting the fuel cell stack, may be provided with the anode current collectors and the cathode current collectors, without limited to the above. According to such a configuration, a resistance value in a portion where a current flows through the fuel cell layer in the in-plane direction can be lowered, which can result in improvement in power generation efficiency.

Figure 21:
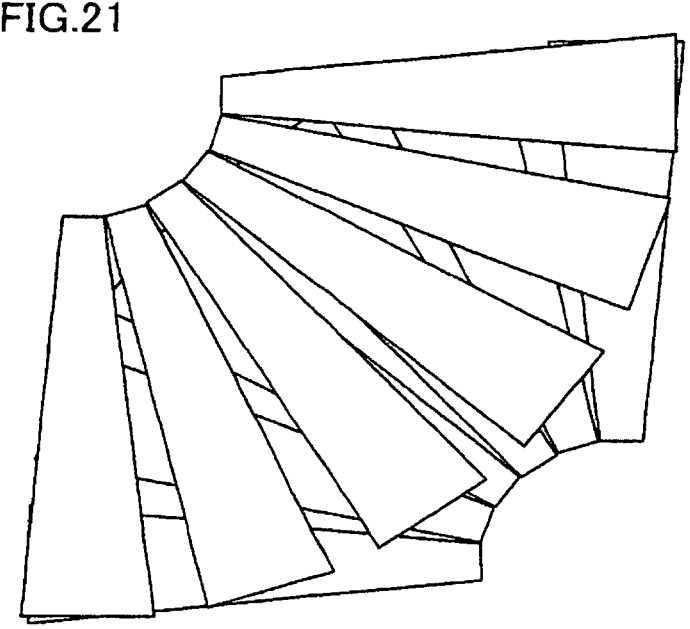
FIG. 21 is a top view showing another preferred example of the fuel cell stack according to the present invention.

The fuel cell stack in the present embodiment can be modified to a structure as shown in FIG. 21 by modifying a shape of the unit cells so long as air supply is not disturbed. The fuel cell stack in FIG. 21 is constituted of unit cells in a trapezoidal (sectorial) shape and has an increased power generation area as compared with the fuel cell stack in FIG. 19. According to such a configuration, the fuel cell stack having high power density is provided.

Embodiment 15

Figure 40:
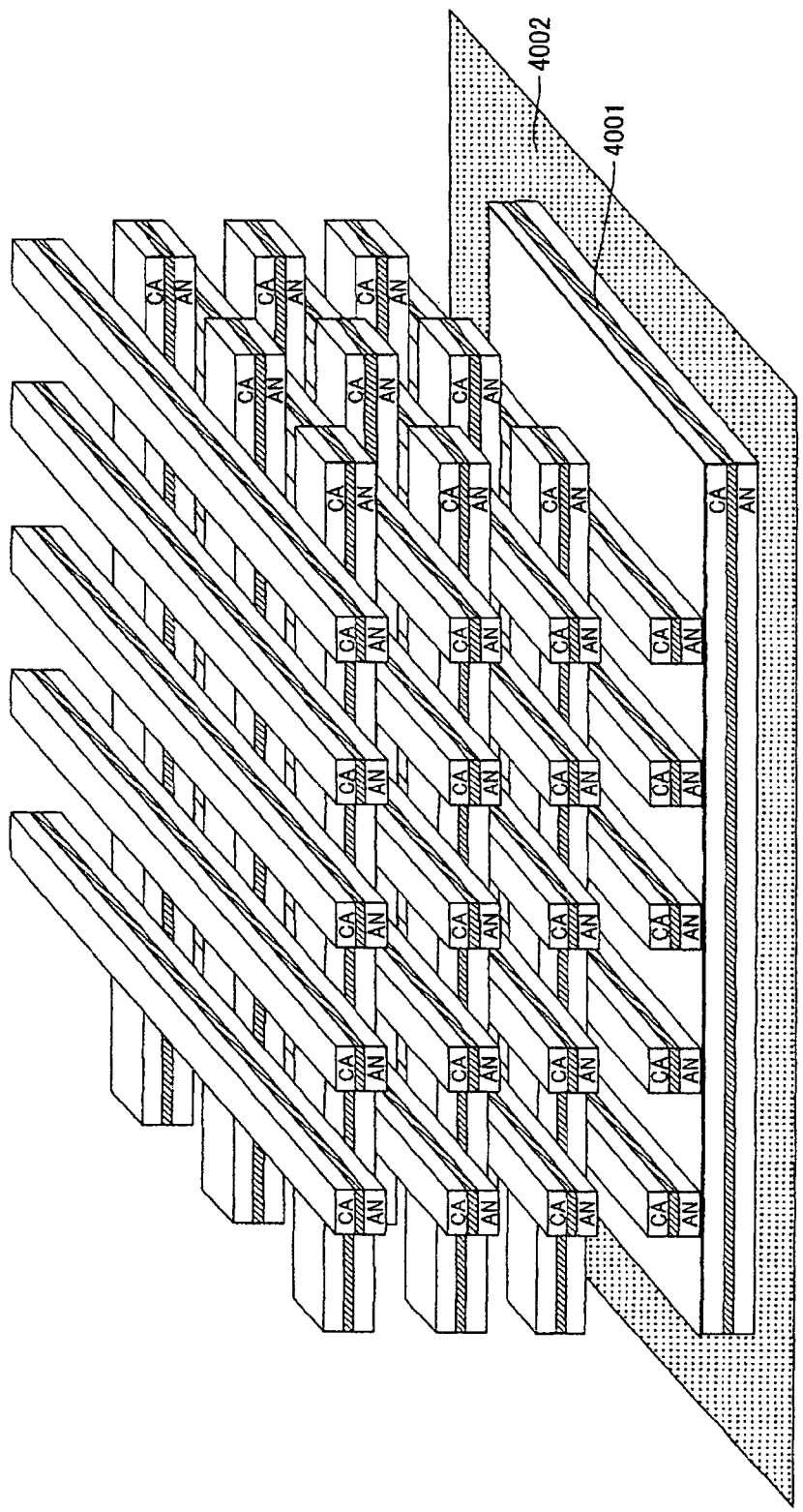
FIG. 40 is a perspective view showing another preferred example of the fuel cell stack according to the present invention.

FIG. 40 is a perspective view showing another preferred example of the fuel cell stack according to the present invention. The fuel cell stack according to the present embodiment has such a structure that the "number-sign-shaped fuel cell stack" similar to that shown in FIG. 3 is stacked on a fuel cell layer formed of a single, relatively large unit cell in a shape of a flat plate having no gap region. In other words, the fuel cell stack in the present embodiment can be said to have such a structure that the lowermost fuel cell layer in the number-sign-shaped fuel cell stack as shown in FIG. 3 (alternatively, may also be referred to as the uppermost layer, if the fuel cell stack in the present embodiment shown in FIG. 40 is inverted) is implemented as a fuel cell layer formed of a single, relatively large unit cell in a shape of a flat plate having no gap region. Namely, the difference from the fuel cell stack shown in FIG. 5 resides in that the fuel cell layer formed of a single unit cell is arranged at the lower end or the upper end of the fuel cell stack. An internal structure of the unit cell is not particularly restricted, and a structure may be formed, for example, by stacking an anode conductive porous layer, an anode catalyst layer, an electrolyte membrane, a cathode catalyst layer, and a cathode conductive porous layer in this order. More specifically, in addition to the structure shown in FIG. 2, a unit cell structure which will be described later or the like may be adopted. For example, a length and a width of the lowermost (or the uppermost) unit cell may be equal to a length in a longitudinal direction of the unit cell constituting the number-sign-shaped fuel cell stack, however, they are not limited thereto and they may be longer or shorter than that. In addition, the fuel cell stack stacked on the fuel cell layer having no gap region and formed of a single unit cell is not limited to the stack having the structure shown in FIG. 3, and a fuel cell stack in any embodiment described above may be employed.

In mounting the fuel cell stack on equipment or the like, in many cases, the fuel cell stack is arranged on a substrate 4002 within the equipment. In the fuel cell stack in the present embodiment, preferably, in arranging the fuel cell stack on substrate 4002, as shown in FIG. 40, the fuel cell stack is arranged such that the fuel cell layer side formed of a single large unit cell is located on substrate 4002 side. As air cannot basically be taken into the fuel cell stack from substrate 4002 side, air intake efficiency in such arrangement is equal to that in a case where any surface of the fuel cell stack not having a fuel cell layer formed of a single large unit cell is arranged on the substrate side. Meanwhile, use of the fuel cell layer formed of a single large unit cell can increase a power generation area. Increase in the power generation area per volume can improve volume power density.

In addition, by forming such a structure that the number-sign-shaped fuel cell stack is stacked on the fuel cell layer formed of a single large unit cell above, a temperature in the fuel cell stack increases as a result of power generation by the large unit cell and air in the fuel cell stack is warmed. Then, an ascending air current is produced and flow of the air can be improved through a three-dimensional air passageway (the gap region) provided in the number-sign-shaped fuel cell stack portion and power generation efficiency can also be enhanced in accordance with temperature increase in the fuel cell stack. In particular, when an area for installing the fuel cell stack in the equipment is limited, by employing such a fuel cell stack excellent in air supply and having improved volume power density as the fuel cell stack according to the present invention, a thickness of the fuel cell can be suppressed and prescribed output can be supplied, which is extremely effective. Moreover, according to the present invention, as the fuel cell stacks can three-dimensionally be stacked and can be made compact, a degree of freedom in design or the like on the equipment side on which the fuel cell stack is to be mounted can advantageously be improved. For example, in small portable equipment such as an electronic dictionary containing a one-segment broadcast tuner and requiring high power consumption or in an example where a fuel cell is mounted on a back of a liquid crystal display, the fuel cell stack in the present embodiment is used and arranged on the substrate with arrangement as described above, so that the fuel cell stack can be mounted without extending off the small equipment or the area of the back of the liquid crystal display. Therefore, a degree of freedom in design or the like such as a size of such equipment on which the fuel cell stack is to be mounted can be improved.

The fuel cell layer formed of a single unit cell above is preferably arranged such that its anode side (the anode catalyst layer side with an electrolyte membrane 4001 serving as the reference; in FIG. 40, the anode side being denoted as "AN"; similarly, the cathode catalyst layer side being referred to as the cathode side with electrolyte membrane 4001 serving as the reference; in FIG. 40, the cathode side being denoted as "CA"; to be understood similarly hereinafter) is located on the substrate side. Thus, as it is not necessary to provide an air passageway between the substrate and the fuel cell stack, the anode side of the fuel cell layer can be brought in contact with the substrate and volume power density can further be improved.

Here, the embodiments of the present invention described above all have such a structure that adjacent fuel cell layers are in intimate contact, however, the present invention is not necessarily limited as such. For example, a configuration may also be such that a spacer layer is arranged between adjacent fuel cell layers or one or more fuel cell layer is replaced with a spacer layer. Here, the spacer layer refers to a layer playing a role for creating a space in the fuel cell stack and formed of one constituent member or two or more constituent members. In addition, a member forming the spacer layer is herein referred to as a "spacer". A fuel cell stack according to the present invention provided with a spacer layer will be described hereinafter in detail with reference to embodiments.

Embodiment 16

Figure 41:
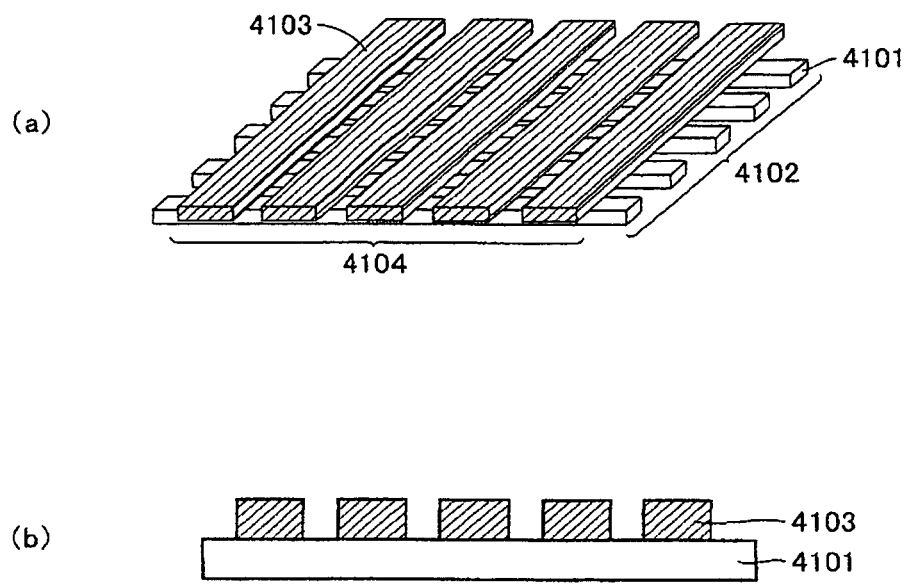
FIG. 41 is a schematic diagram showing an example of a basic configuration of a fuel cell stack including a spacer layer.

FIG. 41 is a schematic diagram showing an example of a basic configuration of a fuel cell stack including a spacer layer, FIG. 41(a) being a perspective view thereof and FIG. 41(b) being a side view thereof. The fuel cell stack shown in FIG. 41 includes a fuel cell layer 4102 constituted of five unit cells 4101 arranged substantially in parallel at a distance from one another and a spacer layer 4104 stacked thereon. Spacer layer 4104 is constituted of five spacers 4103 arranged substantially in parallel at a distance from one another, and each spacer 4103 is arranged to intersect with unit cells 4101. In FIG. 41, each spacer 4103 is stacked to be orthogonal to unit cells 4101. Such arrangement implements the fuel cell stack in which a gap region in fuel cell layer 4102 three-dimensionally communicates with a gap region in spacer layer 4104. Therefore, the fuel cell including such a spacer layer can also achieve an effect the same as in the fuel cell stack in the embodiments above. In addition, in the present embodiment, each spacer 4103 is made of an electrically conductive material, and thus each unit cell 4101 is electrically connected with spacer 4103 being interposed.

Here, in the fuel cell stack shown in FIG. 41, each unit cell 4101 has a parallelepiped shape and spacer 4103 also similarly has a parallelepiped shape. The shape of the unit cell and the spacer is not limited as such. For example, as shown in the embodiments above, the unit cell may adopt various shapes such as a shape of an elongated strip other than the parallelepiped shape. The spacer may be identical to or different from the unit cell in shape. In addition, the number of unit cells constituting the fuel cell layer and the number of spacers constituting the spacer layer are not particularly limited, so long as the number is one or more. It is noted that at least one of the fuel cell layer and the spacer layer preferably has a gap region. Moreover, a width of the gap region (a distance between the unit cells or between the spacers) in the fuel cell layer and the spacer layer may be the same or different. Further, it is not necessary to arrange the unit cells and the spacers in parallel or substantially in parallel. Furthermore, an angle of intersection of the spacer and the unit cell is not limited to 90°, and various angles may be adopted. Other possible modifications of the present embodiment are the same as in Embodiment 1 and the like above. Though the spacer layer is stacked on the fuel cell layer in FIG. 41, the fuel cell layer may be stacked on the spacer layer.

In addition, the spacer layer may include at least two spacers that are not arranged at a distance from each other or arranged at a distance from each other only in part. For example, the spacer layer can include at least two spacers arranged such that at least a part of a side surface of a spacer comes in contact with at least a part of a side surface of another spacer. Moreover, the spacer layer does not have to have a gap region. For example, the spacer layer may have no gap region and may be formed of a single spacer, like second fuel cell layer 502 shown in FIG. 5.

In order to improve porosity in the fuel cell stack and to achieve good air permeability, the spacer is preferably made of a porous body. Particularly when the spacer layer does not have a gap region, from a point of view of facilitating movement of a gas within the fuel cell stack, the spacer forming the spacer layer is preferably made of a porous body. It is noted that various modifications described above are also suitably applied to the embodiments below.

Embodiment 17

FIG. 42 is a schematic diagram showing a preferred example of the fuel cell stack having the spacer layer, FIG. 42(*a*) being a perspective view thereof, FIG. 42(*b*) being a top view and FIG. 42(*c*) being a side view. As illustrated, the present embodiment has such a structure that a fuel cell layer 4202 constituted of five unit cells 4201 arranged substantially in parallel at a distance from one another and a spacer layer 4204 constituted of five spacers 4203 arranged substantially in parallel at a distance from one another are alternately stacked. Such a structure is the same as a structure in which a plurality of basic structures shown in FIG. 41 are stacked (the fuel cell stack in FIG. 42 is obtained by stacking three basic structures in FIG. 41), and it can also be defined as a structure in which some fuel cell layers in the fuel cell stack in FIG. 3 were replaced with the spacer layers. In the present embodiment, the spacer layer is identical in shape to the fuel cell layer. Thus, the fuel or the air is readily taken into the fuel cell stack and a stable stack can be obtained. In addition, the spacer layer preferably conducts electrons. Thus, serial wiring in the direction of stack is facilitated and an electrical conduction path is shortest, so that electrical resistance can be suppressed. Possible modifications of the present embodiment are the same as in Embodiment 16 and the like above. It is noted that a lowermost layer and an uppermost layer in the fuel cell stack in the present embodiment may be formed by the fuel cell layer or by the spacer layer. In addition, as shown in FIG. 42, the unit cell and the spacer are preferably in a shape of a planar elongated strip. As a contact area as stacked is thus larger than that of a shape of an elongated strip having surface irregularities or a cylindrical shape, physical strength of the obtained fuel cell stack is improved. Moreover, as the contact area between the unit cell and the spacer is large, electrical contact resistance can be low in stacking with electrically serial connection. For example, when a unit cell in a cylindrical shape having an outer circumferential surface as a cathode surface is employed, serial wiring connection in the direction of stack cannot be made. Electrically serial wiring connection in the direction of stack while suppressing electrical contact resistance is enabled, so that a value of a current that flows in the in-plane direction of the fuel cell layer can be lowered. Accordingly, a thickness of a current collector can be decreased or the current collector can be eliminated, and high integration of the fuel cell stack can be achieved. Consequently, smaller size, lighter weight and lower cost of the fuel cell stack can be achieved.

In addition, in the fuel cell stack shown in FIG. 42, stacking is carried out such that the longitudinal direction (direction of elongation) of the unit cells constituting the fuel cell layer is orthogonal to the longitudinal direction (direction of elongation) of the spacer. Accordingly, an area of a region where the unit cell and the spacer intersect with each other is small. As a distance of diffusion of air to the inside of the intersecting region is thus short, air supply in the intersecting region is satisfactory. Moreover, by making shorter a length of the unit cell in a direction of a short side as well, the area of the intersecting region can be made further smaller. By making shorter a length in a direction of a short side, a distance of diffusion of oxygen in the in-plane direction of the unit cell on the cathode side is short, so that diffusion supply of oxygen can be less likely to be disturbed even when air is naturally supplied. Consequently, air can more efficiently be supplied toward the cathode of the unit cell within the fuel cell stack in which the fuel cell layers are three-dimensionally stacked, without the use of auxiliary equipment for supplying the air.

Here, in the fuel cell stack, as shown for example in FIG. 42, where the fuel cell layer obtained by arranging a plurality of parallelepiped unit cells identical in shape in parallel at regular intervals and the spacer layer obtained by similarly arranging a plurality of parallelepiped spacers identical in shape in parallel at regular intervals are alternately stacked such that the unit cells constituting the fuel cell layer are orthogonal to the spacers constituting the spacer layer adjacent to that fuel cell layer and where each unit cell constituting the fuel cell layer is arranged directly under (or directly on) each unit cell constituting the fuel cell layer adjacent to that fuel cell layer, referring to FIG. 42, the unit cell preferably has a width W1 not smaller than 1 mm from a point of view of ease in fabrication of the unit cell. In addition, in view of the fact that a distance of convection of oxygen is preferably shorter taking into account concerns about supply disturbance caused by a natural convection rate of oxygen, the fact that an area of a region where the spacer and the unit cell intersect with each other is preferably small, and the fact that a distance of convection of vapor is preferably shorter taking into account the fact that quick exhaust of generated water as vapor is preferred, width W1 of the unit cell is preferably as small as possible, and specifically, it is preferably 5 mm or smaller. A width W2 of a gap region between the unit cells (interval between the unit cells) with respect to width W1 of the unit cell (W2/W1) is preferably not greater than 1 from a point of view that a greater ratio of an MEA occupied in the fuel cell layer leads to higher power density of the fuel cell stack, and preferably it is not smaller than 0.2 from a point of view of ease in air intake into the fuel cell stack. Provided that W1 and W2 satisfy the range above, a thickness W3 of the spacer is preferably not smaller than 0.2 mm from a point of view of ease in air intake and convection in the fuel cell stack and preferably not greater than 2 mm from a point of view of improvement in power density of the fuel cell stack.

Embodiment 18

Figure 43:
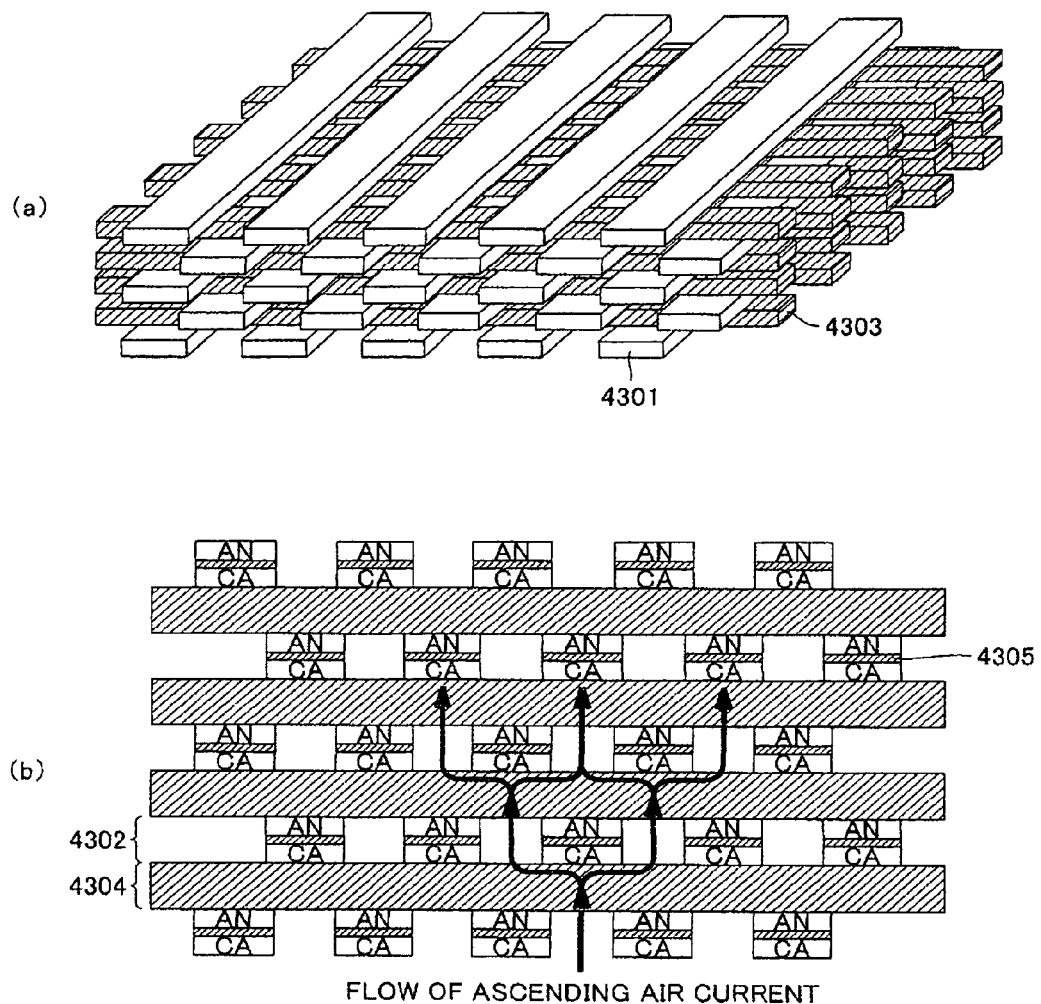
FIG. 43 is a schematic diagram showing another preferred example of the fuel cell stack having the spacer layer.

FIG. 43 is a schematic diagram showing another preferred example of the fuel cell stack having the spacer layer, FIG. 43(a) being a perspective view thereof and FIG. 43(b) being a side view. The fuel cell stack shown in FIG. 43 has such a structure that a fuel cell layer 4302 constituted of five unit cells 4301 arranged substantially in parallel at a distance from one another and a spacer layer 4304 constituted of five spacers 4303 arranged substantially in parallel at a distance from one another are alternately stacked. Difference from the fuel cell stack in FIG. 42 resides in that, attention being paid to two adjacent fuel cell layers with the spacer layer being interposed in the fuel cell stack in FIG. 42, each unit cell constituting one fuel cell layer is arranged directly under (or directly on) the unit cell constituting the other fuel cell layer, while in the fuel cell stack in FIG. 43, each unit cell constituting one fuel cell layer is arranged in a region where a unit cell constituting the other fuel cell layer is absent, that is, directly under (or directly above) the gap region in the fuel cell layer. The unit cells in the fuel cell stack in FIG. 43 thus configured are preferably arranged such that a surface on the cathode side, with an electrolyte membrane 4305 of unit cell 4301 serving as the reference, faces a direction of gravity, as shown in FIG. 43(b).

As the unit cells in the fuel cell stack are arranged in an orientation as shown in FIG. 43, air within the fuel cell stack is warmed by heat originated from power generation and the warmed air moves in a direction (upward direction in FIG. 43(b)) opposite to the orientation of gravity. Then, ambient air is introduced from below the fuel cell stack into the fuel cell stack and an ascending air current is produced. As the fuel cell stack in FIG. 43 is arranged such that the cathode side of the unit cell faces the orientation of this ascending air current, a cathode surface of the unit cell is located on a perpendicular extension line of the gap region in the fuel cell layer. Therefore, the air that has passed through the gap region once impinges on a cathode surface of the unit cell and then diffuses to left and right, and then moves upward (see an arrow in FIG. 43(b)). Thus, even under such a passive condition as not using auxiliary equipment such as a fan or a blower, air can effectively be supplied to the cathode surface of the unit cell and the air is readily diffused to all corners in a cathode catalyst. As thus convection resistance of the air can be lowered and oxygen concentration in a cathode catalyst portion can be raised, power generation efficiency of the unit cell can be enhanced. The fuel cell stack achieving high power density is thus realized. It is noted that possible modifications of the present embodiment are the same as in Embodiment 16 and the like above. In addition, in the fuel cell stack in the present embodiment, the lowermost layer and the uppermost layer may be formed by the fuel cell layer or the spacer layer.

Embodiment 19

FIG. 44 is a schematic diagram showing another preferred example of the fuel cell stack having the spacer layer, FIG. 44(a) being a perspective view thereof, FIG. 44(b) being a top view and FIG. 44(c) being a side view. The fuel cell stack shown in FIG. 44 has such a structure that a spacer layer 4404 constituted of five spacers 4403 arranged substantially in parallel at a distance from one another and a fuel cell layer 4402 constituted of five unit cells 4401 arranged substantially in parallel at a distance from one another are alternately stacked. Here, in the fuel cell stack in the present embodiment, two spacers located at opposing ends among spacers 4403 constituting spacer layer 4404 are arranged directly under and directly on opposing end portions of fuel cell layer 4402 adjacent to the spacer layer, Namely, the two spacers located at the opposing ends are arranged to be in contact with end portions in a longitudinal direction of unit cells 4401 constituting fuel cell layer 4402 adjacent to the spacer layer. In the example shown in FIG. 44, a position of a sidewall surface on an outer side of each of the two spacers located on the opposing ends coincides with a position of a sidewall surface on an outer side of the unit cell. According to such a configuration, as physical strength of the fuel cell stack can be improved, the structure of the fuel cell stack can further be stabilized.

The fuel cell stack in the present embodiment can be modified as follows. For example, an end surface of the fuel cell layer (the sidewall surface on the outer side of the unit cell) does not necessarily have to coincide with an end surface of the spacer layer (the sidewall surface on the outer side of each of the spacers located on the opposing ends), and it may slightly project outward from the end surface of the spacer layer (the sidewall surface on the outer side of each of the spacers located on the opposing ends), or may be located slightly inward. In such a case, in order to further stabilize the structure of the fuel cell stack, difference in position between these end surfaces is preferably not greater than 1 mm. In addition, in the fuel cell stack in the present embodiment, the lowermost layer and the uppermost layer may be formed by the fuel cell layer or the spacer layer.

As in Embodiments 16 to 19 above, the spacer layer may be constituted of one or more spacer. By forming the spacer layer with two or more spacers and arranging the spacers at a distance from each other, a gap region can be formed between the spacers. Here, the spacer layer is preferably constituted of spacers identical in outer dimension to a unit cell included in any fuel cell layer in the fuel cell stack according to the present invention. In addition, preferably, the spacer layer is identical in shape to any fuel cell layer, and any fuel cell layer and spacer layer in the fuel cell stack according to the present invention have gap regions in a similar shape. Here, being identical in shape means that error of the outer dimension of all unit cells and spacers is within a range of ±0.25 mm and arrangement and the shape of the unit cells in the fuel cell layer coincide with those of the spacers in the spacer layer by inversion or rotation. Thus, such a structure that the fuel or the air is readily taken into the fuel cell stack can be obtained, and consequently, the need for auxiliary equipment can be obviated. Even when the auxiliary equipment is necessary, power consumption by the auxiliary equipment can be lowered.

Embodiment 20

FIG. 45 is a schematic diagram showing another preferred example of the fuel cell stack having the spacer layer, FIG. 45(a) being a top view and FIG. 45(b) being a side view. The fuel cell stack shown in. FIG. 45 has such a structure that a spacer layer 4504 constituted of a plurality of spacers and a fuel cell layer 4502 constituted of five unit cells 4501 arranged substantially in parallel at a distance from one another are alternately stacked, as in the embodiments above. It is noted in the fuel cell stack in the present embodiment that the spacers constituting spacer layer 4504 are arranged only in a portion sandwiched between two adjacent fuel cell layers 4502 and they are not arranged in a gap region portion in the fuel cell layer. Namely, referring to FIG. 45(a), when the fuel cell stack is viewed from above, a spacer 4503a located in a central portion of the fuel cell stack (a dotted line region in FIG. 45(a)) is hidden under unit cell 4501 (formed only in a region directly under unit cell 4501), and no spacer is present in the gap region between the unit cells. According to such a configuration, convection of the air or the fuel into the fuel cell stack is satisfactory and shortage of oxygen or the fuel in the fuel cell stack is less likely.

In the present embodiment, as shown in FIG. 45(a), spacers located at opposing ends of the spacer layer among the spacers constituting spacer layer 4504 are denoted as spacers 4503b in a shape of an elongated strip such as a parallelepiped shape (without limited to this shape), and these spacers may be arranged to intersect with a plurality of unit cells constituting adjacent fuel cell layer 4502 and to be located directly under and directly on the opposing end portions of unit cell 4501 constituting adjacent fuel cell layer 4502 or the vicinity thereof. Physical strength of the fuel cell stack is thus increased. Preferably, as shown in FIG. 45(a), the spacer in a central portion of the fuel cell stack is not arranged in the gap region in the adjacent fuel cell layer but the spacer is arranged at opposing ends of the spacer layer across the plurality of unit cells and the gap regions. As concentration of oxygen or the fuel is low in a portion around a central portion of the fuel cell stack, a path for the air or the fuel in the fuel cell stack is preferably wide in the central portion of the fuel cell stack, and in order to effectively improve strength of the fuel cell stack, the spacer is preferably arranged on an outer side of the fuel cell stack, across the plurality of unit cells and gap regions. All spacers including also the spacers located at opposing ends of the spacer layer may naturally be arranged only in the portion in contact with the two adjacent fuel cell layers.

Embodiment 21

Figure 46:
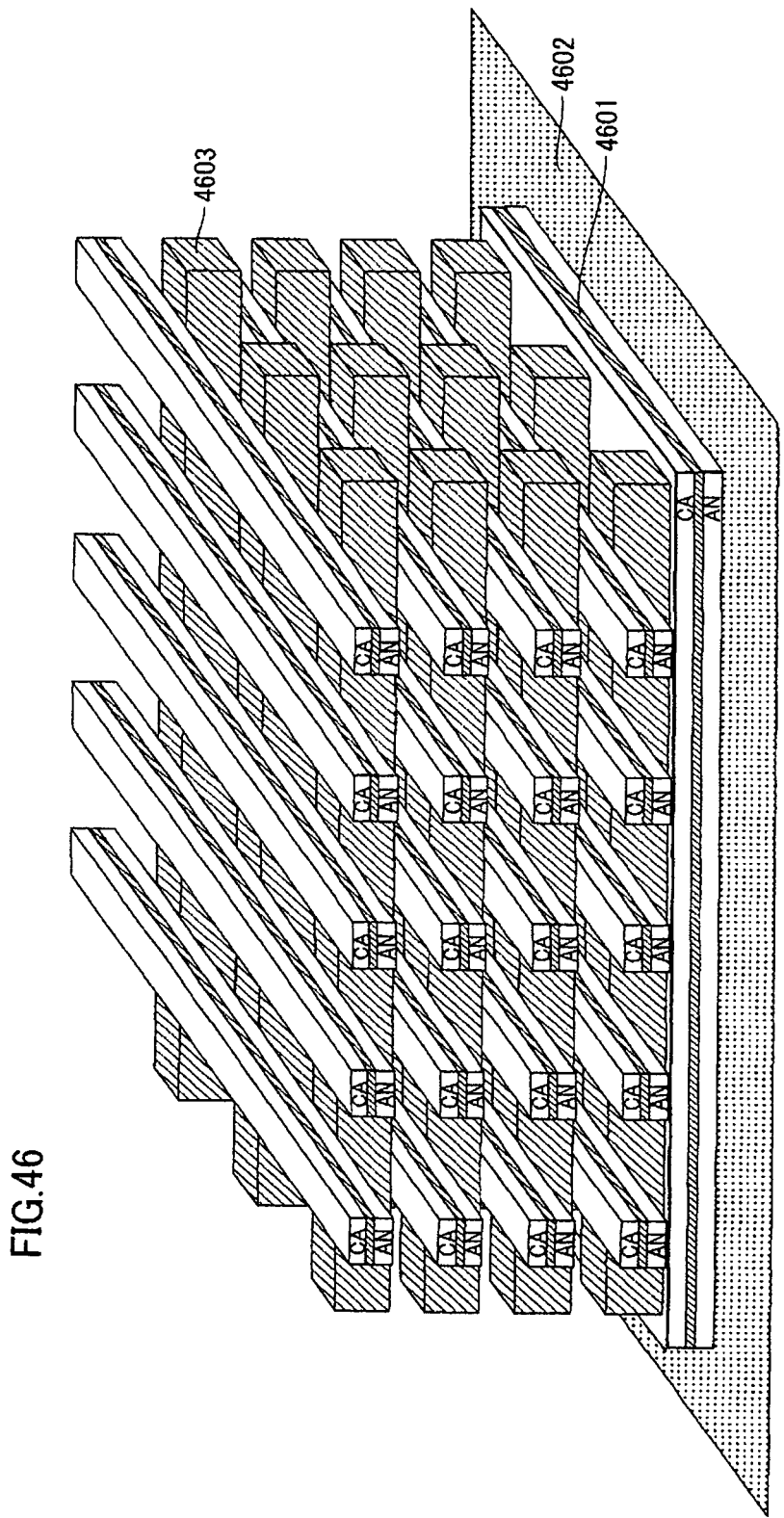
FIG. 46 is a perspective view showing another preferred example of the fuel cell stack according to the present invention.

FIG. 46 is a perspective view showing another preferred example oldie fuel cell stack according to the present invention. The fuel cell stack in the present embodiment has such a structure that a fuel cell stack similar to that shown in FIG. 44 (a fuel cell stack having a spacer layer constituted of spacers 4603) is stacked on a fuel cell layer formed of a single, relatively large unit cell in a shape of a flat plate having no gap region. Such a configuration in which the fuel cell stack is constructed on the fuel cell layer formed of a single relatively large unit cell is the same as in Embodiment 15 above, and the same effect can be obtained. Details and possible modifications of the present embodiment are also the same as in Embodiment 15 above. For example, the fuel cell stack stacked on a fuel cell layer formed of a single unit cell having no gap region is not limited to a stack having a similar structure shown in FIG. 44, and the fuel cell stacks in Embodiments 16 to 20 above may be adopted. In addition, in arranging the fuel cell stack in the present embodiment on a substrate 4602, as shown in FIG. 46, the fuel cell stack is preferably arranged such that the fuel cell layer side formed of a single large unit cell is located on substrate 4602 side. Moreover, the fuel cell layer formed of a single unit cell above is preferably arranged such that its anode side (the anode catalyst layer side with an electrolyte membrane 4601 serving as the reference) is located on the substrate side. As thus it is not necessary to provide an air passageway between the substrate and the fuel cell stack, the anode side of the fuel cell layer can be brought into contact with the substrate and volume power density can further be improved.

Here, the spacers used in Embodiments 16 to 21 above may be made of a porous body. By being made of a porous body, the fuel or the air passes through the porous body and the fuel or the air can be supplied to the catalyst layer through the spacer layer also in a region where the spacer layer and the fuel cell layer are stacked. Accordingly, diffusion resistance of the fuel or oxygen is lowered and more output current can be extracted. Preferred examples of materials for the spacer layer include polymers excellent in acid resistance and chemical resistance such as polyimide, PVDF, PTFE, PEEK®, and the like, as well as electrically conductive polymers and the like such as polyaniline and polythiophene. In addition, from a point of view of acid resistance and chemical resistance, metal oxides such as titanium oxide, silica and zirconia oxide are preferred. Moreover, from a point of view of acid resistance, chemical resistance and electron conductivity, preferred examples include a noble metal such as Au and Pt, a metal forming passivity on a surface of corrosion-resistant stainless and titanium, carbon, and the like. The spacer is preferably formed of one or more of the materials above. Examples of the shape of the spacer include a mesh shape, a non-woven fabric shape, a foam, a sintered body, a mixture of two or more of them, and the like.

When a spacer made of a porous body of which surface is hydrophilic is employed as the spacer, water produced and condensed in the fuel cell stack can be absorbed and then exhausted to the outside of the fuel cell stack. Accordingly, characteristics of the fuel cell stack can be maintained well for a long time. Examples of porous bodies of which surface is hydrophilic include non-woven fabric made of a polymer such as cotton and polyester, a metal oxide such as titanium oxide and silica, a metal porous body of which surface alone is coated with a metal oxide, a metal-polymer composite in which a hydrophilic polymer is applied only to a surface of a metal porous body for modification, and the like. From a point of view of reduced length of an electrical path, more preferably, the porous body is electrically conductive. A porous body of which surface is hydrophilic may naturally be used together with a porous body of which surface is water-repellent, a non-porous body, or the like.

In addition, the spacer may be made of a non-porous body. By being made of a non-porous body, physical strength is advantageously improved as compared with the case of being made of the porous body. When the spacer is electrically conductive and also plays a role as an electrical wire, not only physical strength but also lowering in electrical resistance can be achieved.

Further, use of the spacer made of a non-porous body and the spacer made of a porous body as combined is also preferred. In this case, for example as shown in FIG. 47, as spacers constituting a spacer layer 4704, more preferably, spacers 4703a made of a porous body are arranged in high proportion in a central portion of the fuel cell stack, while spacers 4703b made of a non-porous body are arranged in high proportion on an outer side of the fuel cell stack (in the vicinity of opposing ends of the spacer layer). Concentration of oxygen or the fuel is lower around the central portion of the fuel cell stack than around an outer peripheral portion, due to consumption thereof during power generation, however, use of the spacer made of a porous body can achieve good diffusion of oxygen or the fuel. Meanwhile, as concentration of oxygen or the fuel is higher on the outer side of the fuel cell stack than in the central portion, the non-porous spacer is used to achieve increased physical strength and lower electrical resistance. Arrangement of the spacer made of a non-porous body and the spacer made of a porous body is not limited to that shown in FIG. 47, and arrangement can be designed as appropriate, for example, by alternately arranging these spacers, from a point of view of electrical resistance, supply of a reactant, physical strength, and the like.

The number of unit cells in the fuel cell layer in each embodiment (Embodiments 1 to 21) described above is by way of example and the number thereof is not necessarily limited thereto. The number of unit cells within the fuel cell layer can be set as appropriate, depending on demands for an output voltage, a size or the like of the fuel cell stack. In addition, in each embodiment described above, such a structure that a first fuel cell layer and a second fuel cell layer are alternately stacked has been described by way of example, however, the structure is not necessarily limited thereto. For example, a portion where the first fuel cell layer is stacked on the first fuel cell layer or a portion where the second fuel cell layer is stacked on the second fuel cell layer may be present within the fuel cell stack. So long as a region where the first fuel cell layer and the second fuel cell layer are adjacently stacked is present in at least a part in the fuel cell stack, a gap region is formed at least in that region and an effect of the present invention can be obtained.

Figure 70:
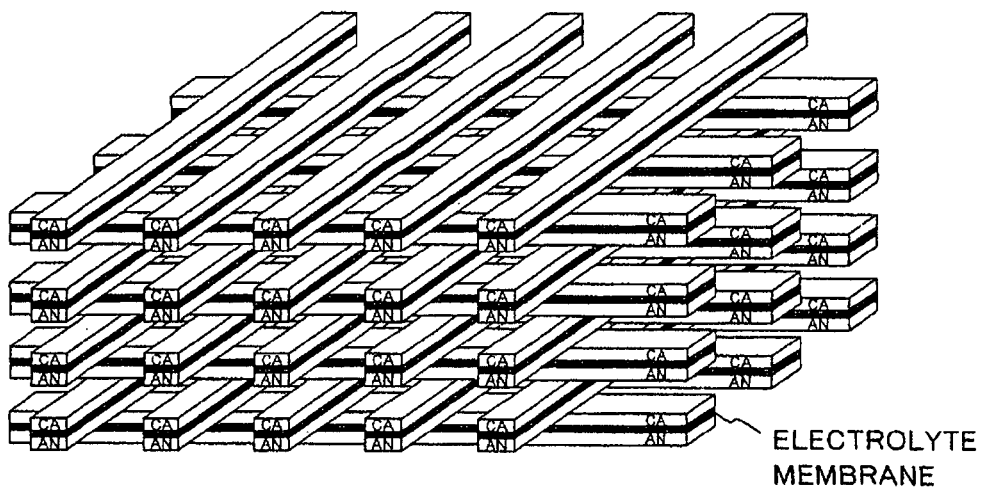
FIG. 70 is a schematic diagram showing an example of an orientation of an anode electrode and a cathode electrode of the unit cell in the fuel cell stack according to the present invention.
Figure 71:
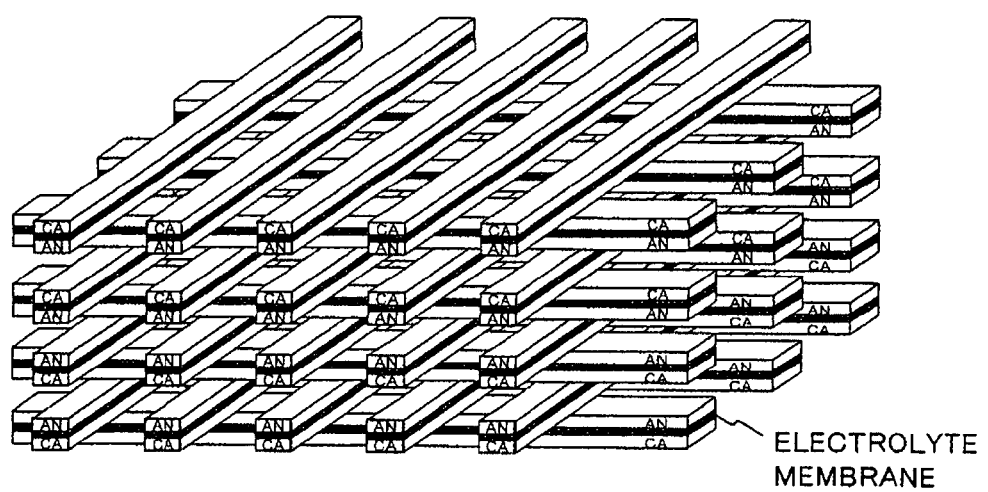
FIG. 71 is a schematic diagram showing another example of an orientation of an anode electrode and a cathode electrode of the unit cell in the fuel cell stack according to the present invention.
Figure 72:
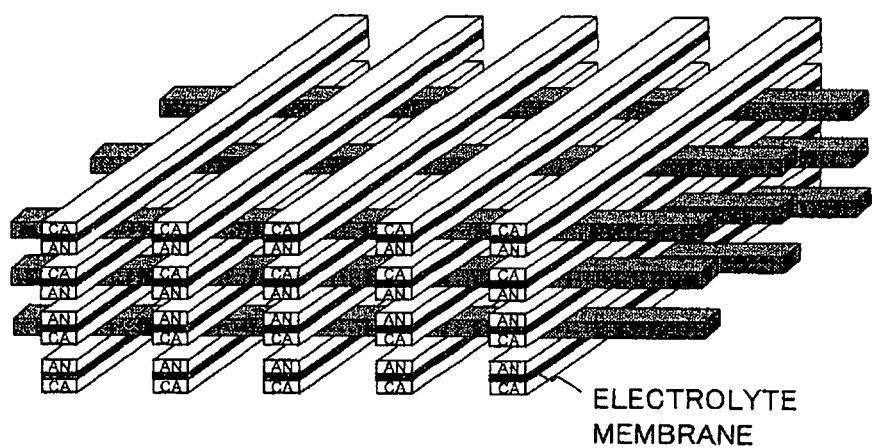
FIG. 72 is a schematic diagram showing an example of an orientation of an anode electrode and a cathode electrode of the unit cell in the fuel cell stack including a spacer layer according to the present invention.

In the fuel cell stack according to the present invention, when electrical wires in the fuel cell stack are connected in series, adjacent fuel cell layers are preferably stacked such that the anode side of the unit cell constituting one fuel cell layer (the anode electrode) is opposed to the cathode side of the unit cell constituting the other fuel cell layer (the cathode electrode), as shown in FIG. 70. On the other hand, for example as shown in FIG. 71, a structure may naturally be such that a stacking pattern of the anode electrode and the cathode electrode is reversed at the substantial center in the direction of stack in the fuel cell stack, without limited as above. Here, the cathode electrodes are located on respective opposing outer surfaces of the fuel cell stack (a lower surface and an upper surface), and therefore, an area of the cathode electrodes exposed to atmosphere can be increased. When the anode electrode and the cathode electrode are arranged in accordance with the configuration shown in FIG. 71, a portion around the central portion of the fuel cell stack where concentration of oxygen tends to be low serves as the anode electrode, which is preferred in that an average value of concentration of oxygen at the surface of the cathode electrode is high, in regard to all cathode electrodes constituting the fuel cell stack. As the concentration of oxygen at the cathode electrode is high, power generation efficiency is improved and power density per volume of the fuel cell stack can be improved. In addition, in exhausting produced water as well, vapor is more readily exhausted to the outside (for example, to the atmosphere) as the cathode side is closer to the outer surface. Accordingly, the produced water is less likely to stay in the fuel cell stack and the produced water can be less likely to clog an air supply path. Thus, the fuel cell stack in which the unit cells are further highly integrated can be fabricated, Power density of the fuel cell stack can thus be improved. In the example shown in FIG. 71, extraction from the cell is achieved by 4-series and 2-parallel wired connection, in which the anode electrodes facing with each other in the central portion serve as a negative terminal and two surfaces of the cathode electrodes of the fuel cell layer on the respective outer surfaces are combined as one to serve as a positive terminal. In addition, as shown in FIG. 72, the fuel cell stack having the spacer layer between the fuel cell layers can also have a similar structure, and the similar effect can be obtained.

The fuel cell stack according to the present invention as above has a gap region serving as an air passageway in the inside thereof, so that a gas can readily enter and exit from the inside of the fuel cell stack. In the fuel cell stack in which unit cells in a shape of an elongated strip such as a parallelepiped shape are stacked in a number sign shape or in the fuel cell stack in which the fuel cell layer and the spacer layer are alternately stacked in a number sign shape, all air passageways three-dimensionally communicate with one another, so that a gas can further readily enter and exit from the inside of the fuel cell stack. Each unit cell produces water from the cathode electrode side through power generation reaction. In an example where the fuel cell stack including highly integrated unit cells and having improved volume power density is fabricated, the produced water condenses in the fuel cell stack and clogs the air passageway, which has resulted in failure to maintain continuous output. According to the present invention, however, produced water evaporates by heat generated as loss in power generation by the fuel cell stack and it is satisfactorily exhausted to the outside of the fuel cell stack. Thus, increase in a vapor pressure in the fuel cell stack and condensation is prevented, and thus output electric power can continuously be supplied in a stable manner. As the unit cells are highly integrated and stacked, a temperature of the fuel cell stack is also readily raised and evaporation of water is promoted. Namely, according to the fuel cell stack of the present invention, by highly integrating the unit cells, synergistically, produced water is satisfactorily exhausted as vapor to the outside of the fuel cell stack without condensed water clogging the air passageway, oxygen can be taken into the fuel cell stack in a stable manner, and output electric power can continuously be supplied in a stable manner. The communicating space (the gap region) in the fuel cell stack has three-dimensional opening which opens to the outside of the fuel cell stack. Therefore, however the orientation of the fuel cell may be varied while being carried as in being mounted on portable equipment or the like, any opening faces upward and vapor can satisfactorily be exhausted to the outside of the fuel cell stack on an ascending air current originating from heat generation by the fuel cell stack.

<Structure of Unit Cell>

The unit cell used in the fuel cell stack according to the present invention will now be described in detail. Some preferred examples have already been described. The unit cell used in the present invention is configured to have at least an electrolyte membrane and an anode catalyst layer and a cathode catalyst layer sandwiching the electrolyte membrane. This configuration corresponds to a minimal configuration of the unit cell. As the number of members can be reduced by fabricating the fuel cell stack with this minimal configuration, cost for the members can be lowered. In addition, as a thickness of the unit cell can be made smaller, output per volume of the fuel cell stack can be improved. Moreover, such an effect as simplification of a production process is achieved, because such an operation process as thermocompression bonding of a conductive porous layer can be eliminated. In this structure, since separation of methanol or air supplied to the anode catalyst layer or the cathode catalyst layer is difficult, a catalyst highly selective to oxygen or methanol is more preferably used for at least one of the anode catalyst layer and the cathode catalyst layer.

For separation of methanol and air and more efficient current collection, the unit cell having the minimal configuration described above is preferably provided with a separator having electron conductivity. In an example where an anode conductive porous layer and a cathode conductive porous layer are provided, if the anode conductive porous layer is provided with a hydrophilic layer, air introduced in the anode catalyst layer can be suppressed because diffusion resistance of air is high in the hydrophilic layer filled with the methanol aqueous solution, whereby the need for the separator can be obviated. In addition, by providing highly electrically conductive anode conductive porous layer and cathode conductive porous layer, electrical resistance between the unit cells or between the fuel cell layers can be suppressed and higher output of the fuel cell stack can be achieved. The unit cell shown in FIG. 2 described already also has such a configuration. In the unit cell shown in FIG. 2, the methanol aqueous solution serving as the fuel diffuses in the hydrophilic layer from the fuel flow channel formed within the anode conductive porous layer through the fuel permeability control layer and it is supplied to the anode catalyst layer.

The unit cell used in the present invention is preferably formed by stacking the cathode conductive porous layer, the cathode catalyst layer, the electrolyte membrane, the anode catalyst layer, and the anode conductive porous layer described above in an integrated manner. As a result of integration, without an external pressure, intimate contact between adjacent members constituting the unit cell is secured and electrons or a substance can satisfactorily be transported between the adjacent members. Thus, a member for fastening a constituent member of the unit cell is not necessary, which allows size reduction of the unit cell. Here, integration in the present invention refers to such a state that members in the unit cell are not removed from one another without external pressure, and specifically to a state joined by chemical bonding, an anchoring effect, adhesive force, or the like.

The unit cell used in the present invention is provided with a fuel flow channel for supplying the methanol aqueous solution serving as the fuel, and a fuel flow channel forming member is preferably used for forming the fuel flow channel. The fuel flow channel is a space for transporting a fuel communicating from a cartridge holding the fuel, and one or more flow channel for transportation from the cartridge is preferably provided for each unit cell. As the fuel flow channel should only establish communication and have a function for fuel transportation, this space may be made of a porous material such as a foam metal, a metal web, a sintered metal, carbon paper, and a carbon cloth. In order to supply the fuel in an amount necessary and sufficient for the fuel cell stack, the fuel flow channel forming member is preferably made of such a material and made in such a shape as lowering resistance in diffusion of the fuel toward downstream of a direction of flow of the fuel. For example, in terms of a shape, an extra fine tube capable of sucking up the fuel by capillarity is preferred, and in terms of a material, an inner surface of the flow channel is preferably chemically modified with polar functional group (hydrophilic) such as OH group or COOH group. As a method of making a surface hydrophilic, a reform process using a plasma surface treatment system (PS-601S/PS-1200A manufactured by Kasuga Electric, Inc.) or the like, or an ashing process used in a semiconductor process is suitably employed. In addition, the fuel flow channel preferably has the fuel permeability control layer at least in a part thereof or the fuel flow channel forming member itself is preferably made of a material for the fuel permeability control layer. As thermocompression bonding is generally used in integration of unit cell constituent members, the fuel flow channel forming member is more preferably made of a material having high heat resistance, that is not thermally decomposed at a temperature around 130 to 180° C. Though a direction or a length of the fuel flow channel forming member or the formed fuel flow channel in the direction along the plane of the anode conductive porous layer is not limited, elongation in a direction perpendicular to a direction of layer thickness of the unit cell is preferred. Such arrangement as parallel elongation in the direction of length of the anode conductive porous layer or arrangement in a serpentine shape can be exemplified.

When the fuel is supplied without using a pump representing external motive power, one end portion of the fuel flow channel (hereinafter referred to as a fuel flow channel terminal end portion) downstream of a direction of flow of the fuel in the formed fuel flow channel is open. This is because, in supplying the fuel by capillarity, air in the fuel flow channel should be exhausted to the outside. In order to suppress flow of the fuel out of the fuel flow channel terminal end portion, an opening has a diameter preferably in a range from 1 μm to 500 μm. Here, air may be introduced in the fuel cartridge, or the pressure in the fuel flow channel may be lowered when supply of the methanol aqueous solution is stopped, which leads, for example, to introduction of air. Accordingly, the diameter of the opening is preferably decreased by using a porous material capable of exhausting air in the fuel flow channel while suppressing flow-out of the fuel. Such a porous material is preferably the same as a material for the gas-liquid separation layer, and a specific example includes a porous layer made of a mixture of fluorine-based polymer represented by PTFE (polytetrafluoroethylene) or PVDF (polyvinylidenfluoride) and a carbon material.

It is noted that other unit cell constituent members may also attain a function for fuel transportation, which is a function of the fuel flow channel forming member. Thus, the need for the fuel flow channel forming member can be obviated, cost can be reduced, and the number of fabrication steps can be decreased. Specifically, the anode conductive porous layer can be provided with a fuel transportation function, which means that the fuel flow channel is formed in the anode conductive porous layer. In this case, the anode conductive porous layer preferably has a function to transport the fuel in a direction perpendicular to the direction of layer thickness of the anode conductive porous layer in the inside thereof or along its surface. Means for providing a space communicating in a direction perpendicular to the direction of layer thickness in the anode conductive porous layer can be exemplified as means for providing such a transportation function. More specifically, examples of such means include a metal plate in which a flow channel is formed, a foam metal, a metal web, a sintered metal, carbon paper, a carbon cloth, and the like.

The structure of the unit cell preferably used in the present invention and fuel supply to the fuel cell stack will now be described with reference to the drawings. In the present invention, fuel is supplied preferably by forming a fuel flow channel with a fuel flow channel forming member or by providing the anode conductive porous layer with a function as a fuel flow channel forming member. Here, at least a part of the fuel flow channel is preferably formed within the anode catalyst layer or the anode conductive porous layer, from a point of view of a smaller thickness of the unit cell.

Figure 22:
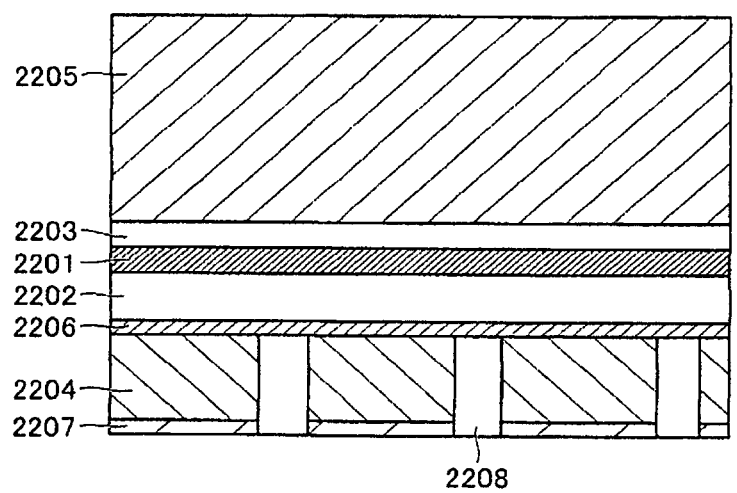
FIG. 22 is a cross-sectional view showing another preferred example of the unit cell employed in the fuel cell stack according to the present invention.
Figure 23:
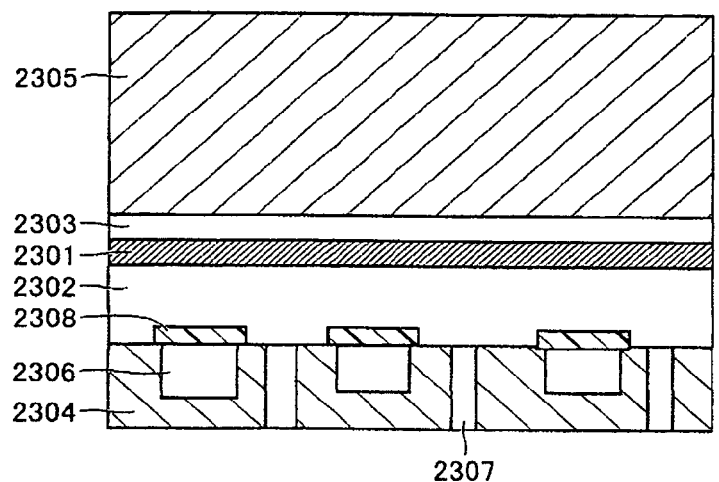
FIG. 23 is a cross-sectional view showing another preferred example of the unit cell employed in the fuel cell stack according to the present invention.

Fuel supply to the fuel cell stack in the present invention can be achieved by using the unit cell in which the anode conductive porous layer is provided with a function as the fuel flow channel, as shown in FIGS. 22 and 23.

In the unit cell in FIG. 22, an anode conductive porous layer 2204 also serves as the fuel flow channel. In the inside of the unit cell, the fuel is transported in a direction perpendicular to a direction of layer thickness of anode conductive porous layer 2204 and the transported fuel permeates toward a surface of contact with an anode catalyst layer 2202 for supply. Regarding transportation of the fuel in anode conductive porous layer 2204, quick diffusion in a direction perpendicular to the direction of layer thickness can achieve uniform fuel supply to anode catalyst layer 2202, and therefore, a coefficient of diffusion in the direction perpendicular to the direction of layer thickness is preferably greater than a coefficient of diffusion in the direction of layer thickness. In the present structure, as anode conductive porous layer 2204 also serves as the fuel flow channel, it is not necessary to separately provide a fuel flow channel, which is advantageous in that the number of members necessary for configuring the unit cell is decreased and fabrication is facilitated. In addition, anode conductive porous layer 2204 required in the present structure preferably has prescribed strength for a thermocompression bonding process in integration of the unit cell, and it is preferably made of a material of which dimension or structure is not varied by 30% or more even pressing under a pressure of 0.1 t/cm$^2$. In addition, in order to attain a function as the fuel flow channel, a material that is not dissolved and does not contract and expand depending on a fuel, water and a temperature for use is preferred. Examples of materials satisfying such conditions include a foam metal, a metal web and a sintered metal.

In order to improve a fuel holding function of anode conductive porous layer 2204, a hydrophilic layer 2206 is provided between anode conductive porous layer 2204 and anode catalyst layer 2202. Hydrophilic layer 2206 not only holds a fuel aqueous solution but also prevents oxygen in the air from reaching anode catalyst layer 2202. Though the methanol aqueous solution is supplied to anode catalyst layer 2202 through hydrophilic layer 2206, air that passes through anode conductive porous layer 2204 cannot pass through, because hydrophilic layer 2206 is filled with the methanol aqueous solution and there are not sufficient holes for air diffusion. Therefore, the air is not supplied to anode catalyst layer 2202 and methanol oxidation reaction at anode catalyst layer 2202 is not impeded. Thus, the need for a separator for preventing the air from reaching anode catalyst layer 2202 can be obviated, and the fuel cell stack achieving lower cost, a smaller thickness and higher power density can be realized. A gas such as carbon dioxide, which is a by-product generated as a result of power generation reaction, is gaseous at room temperature, and its volume is very large as compared with methanol and water representing a reactant. Accordingly, the pressure in anode catalyst layer 2202 is increased. As a result of pressure increase, carbon dioxide is either exhausted in a direction along the plane perpendicular to the direction of layer thickness of the unit cell member (a lateral direction in the drawing) or exhausted to atmosphere through a through hole 2208 provided in anode conductive porous layer 2204 after passing through hydrophilic layer 2206. As carbon dioxide is satisfactorily exhausted from anode conductive porous layer 2204 through hydrophilic layer 2206, it is not necessary to exhaust carbon dioxide generated in the flow channel together with the fuel as in the conventional example, and the fuel can be supplied in a stable manner without the use of auxiliary equipment such as a pump.

Hydrophilic layer 2206 preferably connects anode catalyst layer 2202 and anode conductive porous layer 2204 to each other with low electrical resistance, and hydrophilicity is preferably improved by chemically modifying a surface of catalyst carrying carbon of anode catalyst layer 2202 or anode conductive porous layer 2204 with polar functional group (hydrophilic group) such as OH or COOH, in terms of better wettability therebetween and improvement in adhesiveness. A preferred example is composed of conductive particles in which a surface of carbon particles such as acetylene black and Ketjen Black is chemically modified with polar functional group (hydrophilic group) such as OH group or COOH group, and a polymer having hydrophilic functional group functioning as a binder, such as Nafion 117, Nafion 112, Flemion, or sulfonated polyimide. Here, as shown in FIG. 22, instead of forming the hydrophilic layer by subjecting only the surface of anode conductive porous layer 2204 to hydrophilic treatment, the inside of the porous layer may be subjected to hydrophilic treatment to replace the hydrophilic layer.

Further, as shown in FIG. 22, in order to prevent leakage of the methanol aqueous solution to atmosphere, a gas-liquid separation layer 2207 is preferably formed on a surface of anode conductive porous layer 2204 opposed to hydrophilic layer 2206. In the fuel cell stack according to the present invention, the anode conductive porous layer in the unit cell should be in electrical contact with the cathode conductive porous layer or the current collector in the adjacent unit cell. Therefore, electrical conductivity is preferably improved by further adding an electrically conductive material to gas-liquid separation layer 2207.

In the unit cell shown in FIG. 23, a fuel flow channel 2306 is formed in a surface of an anode conductive porous layer 2304 on the side of an anode catalyst layer 2302. The fuel is transported through fuel flow channel 2306 and supplied to anode catalyst layer 2302 through a fuel permeability control layer 2308 provided to cover fuel flow channel 2306. Examples of a method for forming fuel flow channel 2306 include melt extrusion, transfer molding, compression molding, and the like, if anode conductive porous layer 2304 is made of an electrically conductive polymer or the like. If anode conductive porous layer 2304 is made of a metal, a metal-containing material such as a nitride, a carbide, a carbonitride, or the like thereof, or the like, examples include press forming and etching process. If anode conductive porous layer 2304 is made of carbon, examples include compression molding, injection molding and the like.

Anode conductive porous layer 2304 including fuel flow channel 2306 preferably has prescribed strength for a thermocompression bonding process in integration of the unit cell, and it is preferably made of a material having less surface strain, of which dimension or structure is not varied by 10% or more even pressing under a pressure of 0.1 t/cm$^2$. In consideration of electrical conductivity or ease in molding, a plate-shaped electrically conductive substrate having a fuel flow channel and a through hole for exhausting $CO_2$ and made of a metal or a nitride, a carbide, a carbonitride, or the like thereof is more preferably used as anode conductive porous layer 2304. Here, the fuel flow channel is not limited so long as it is a communicating space as described above. Accordingly, a flow channel space formed in the surface of the anode conductive porous layer may be configured such that it is buried with a porous body material such as a foam metal, a metal web and a sintered metal and the communicating space in the porous material serves as the fuel flow channel. As the fuel flow channel is formed of a porous material, strength of a member required in the thermocompression bonding process can be improved and the space of the fuel flow channel can be prevented from collapsing. In addition, the porous body material described above may be a part of the anode conductive porous layer, and in this case as well, the fuel flow channel can be prevented from collapsing.

In the unit cell shown in FIG. 23, in order to suppress passage of methanol, preferably, fuel permeability control layer 2308 is provided for a part of fuel flow channel 2306 and it is arranged such that electrical contact between anode conductive porous layer 2304 and anode catalyst layer 2302 is maintained with the hydrophilic layer (not shown) being interposed. The role or the material of the hydrophilic layer is as described above. Further, in addition to the hydrophilic layer described above, a surface of a fuel flow channel forming portion of the anode conductive porous layer serving as an inner wall of the fuel flow channel and a surface of the fuel permeability control layer on the side forming an inner surface of the fuel flow channel are preferably subjected to hydrophilic treatment for lowering diffusion resistance of methanol or the methanol aqueous solution. Examples of such hydrophilic treatment include a method of chemically modifying the surfaces with polar functional group (hydrophilic group) such as OH group or COOH group. By applying the fuel flow channel formed by the surface subjected to hydrophilic treatment, diffusion resistance of the methanol aqueous solution is low and the methanol aqueous solution can quickly be transported in a direction of the flow channel. In addition, though the methanol aqueous solution is supplied to anode catalyst layer 2302 through fuel permeability control layer 2308, carbon dioxide does not stay in fuel flow channel 2306 and does not disturb diffusion of the methanol aqueous solution, because fuel permeability control layer 2308 does not allow passage of carbon dioxide. Therefore, supply at a constant flow rate by using a liquid delivery pump or the like is not necessary, and the methanol aqueous solution can be supplied without using auxiliary equipment. Here, the fuel is supplied through fuel flow channel 2306 by capillarity.

In the unit cell shown in FIG. 23, in order to prevent leakage of the methanol aqueous solution to atmosphere, it is not necessary to separately provide a gas-liquid separation layer as in the unit cell shown in FIG. 22. If it is difficult to hold the fuel, however, a gas-liquid separation layer is preferably further provided between anode conductive porous layer 2304 and the hydrophilic layer, Formation of the gas-liquid separation layer is the same as in the unit cell shown in FIG. 22.

In addition, the fuel may be supplied to the fuel cell stack according to the present invention by using a unit cell in which a fuel flow channel is separately arranged in a portion adjacent to the anode catalyst layer, as shown in FIGS. 24 to 27.

Figure 24:
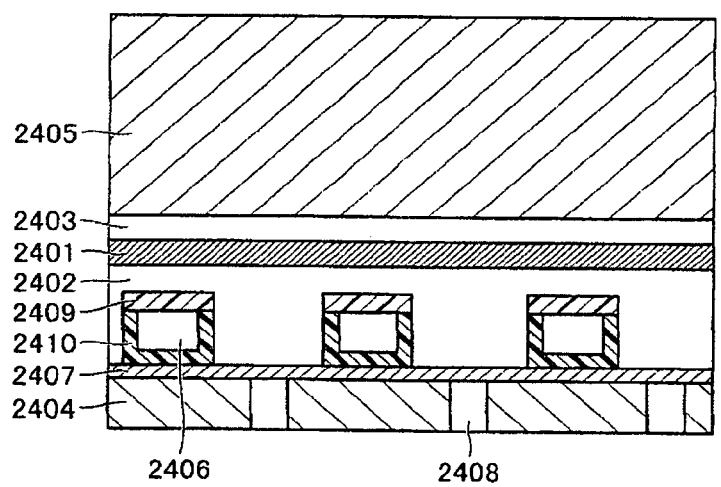
FIG. 24 is a cross-sectional view showing another preferred example of the unit cell employed in the fuel cell stack according to the present invention.

In the unit cell shown in FIG. 24, a bracket-shaped flow channel 2410 is formed on a hydrophilic layer 2407 formed on a surface of an anode conductive porous layer 2404, and a fuel permeability control layer 2409 is provided to cover bracket-shaped flow channel 2410 so that the fuel is supplied through this layer. Naturally, bracket-shaped flow channel 2410 may be formed on the surface of anode conductive porous layer 2404. In the configuration illustrated in FIG. 24, bracket-shaped flow channel 2410 and fuel permeability control layer 2409 serve as flow channel constituent members to thereby form the fuel flow channel. In the unit cell, atmosphere is acidic because protons are generated as a result of reaction at the anode catalyst and they are conducted from the anode to the cathode. Therefore, bracket-shaped flow channel 2410 is preferably made of a highly acid-resistant material. In addition, for a thermocompression bonding process in integration of the unit cell, preferably, bracket-shaped flow channel 2410 has prescribed strength and it is made of a material of which dimension or structure is not varied by 10% or more even pressing under a pressure of 0.1 t/cm$^2$. Moreover, bracket-shaped flow channel 2410 is preferably made of a material that is not dissolved and does not contract and expand depending on a fuel, water and a temperature for use. As a material satisfying such conditions, polyimide, PTFE (polytetrafluoroethylene), PVDF (polyvinylidenfluoride), polycarbonate, polyethylene, polypropylene, a polyacrylic resin, a polyolefin-based polymer, an epoxy-based resist resin, a noble metal such as Au, Pt and Pd, a metal such as C, Ti, Ta, W, Nb, Ni, Al, Cr, Ag, Cu, Zn, and Su, Si, a nitride, a carbide or the like thereof, an alloy such as stainless, Ti—Pt, and the like are preferably used. In addition, when a metal poor in corrosion resistance under acid atmosphere such as Cu, Ag and Zn is used, coating with a noble metal such as Au, Ag and Pt is preferred. Further, the inner wall of bracket-shaped flow channel 2410 is preferably subjected to hydrophilic treatment in order to lower diffusion resistance of the methanol aqueous solution. For example, a method of forming a surface of the inner wall by chemically modifying the same with polar functional group (hydrophilic group) such as OH group or COOH group, a reform process using a plasma surface treatment system (PS-601S/PS-1200A manufactured by Kasuga Electric, Inc.) or the like, an asking process used in a semiconductor process, and the like are available.

Examples of a method of forming bracket-shaped flow channel 2410 include melt extrusion, transfer molding, compression molding, and the like if it is made of a fluorine-based resin or the like, examples thereof include press forming and etching process if it is made of a metal or the like, and examples thereof include compression molding, injection molding, and the like if it is made of carbon.

Bracket-shaped flow channel 2410 does not necessarily have to be in contact with hydrophilic layer 2407 formed on the surface of anode conductive porous layer 2404 or with anode conductive porous layer 2404, and it may be arranged to be embedded in anode catalyst layer 2402. In addition, bracket-shaped flow channel 2410 does not necessarily have to be independent of each other, and bracket-shaped flow channels 2410 may be connected to each other. If bracket-shaped flow channels 2410 are connected to each other, such arrangement as preventing electrical contact between anode catalyst layer 2402 and anode conductive porous layer 2404 or as blocking a proton conduction path within anode catalyst layer 2402 is not preferred, and it is necessary, for example, to provide a hole in a connection portion.

The methanol aqueous solution passes through fuel permeability control layer 2409 and it is supplied to anode catalyst layer 2402. Air that passes through anode conductive porous layer 2404 cannot pass through, because there are not sufficient holes for air diffusion due to presence of provided hydrophilic layer 2407, as in the unit cell in FIG. 22, Anode catalyst layer 2402 comes in electrical contact with anode conductive porous layer 2404 with hydrophilic layer 2407 being interposed, at low contact resistance. In addition, presence of fuel permeability control layer 2409 avoids introduction of carbon dioxide generated in anode catalyst layer 2402 into the fuel. As at least a part of the fuel flow channel is thus formed by fuel permeability control layer 2409, a direction of passage of the fuel can be determined and introduction of carbon dioxide into the fuel flow channel can be prevented. In addition to the fact that carbon dioxide does not disturb supply of the methanol aqueous solution, the methanol aqueous solution is quickly transported in the direction of flow channel by hydrophilicity of the inner wall of the fuel flow channel or by capillarity and it can be supplied to the catalyst layer in a stable manner. Supply at a constant flow rate by using a liquid delivery pump or the like is thus not necessary, and the methanol aqueous solution can be supplied without using auxiliary equipment. It is not necessary to separately provide a gas-liquid separation layer as in the unit cell shown in FIG. 22 in order to prevent leakage of the methanol aqueous solution to atmosphere, however, if it is difficult to hold the fuel, a gas-liquid separation layer is preferably further provided between anode conductive porous layer 2404 and hydrophilic layer 2407. Formation of the gas-liquid separation layer is the same as in the unit cell shown in FIG. 22.

Figure 25:
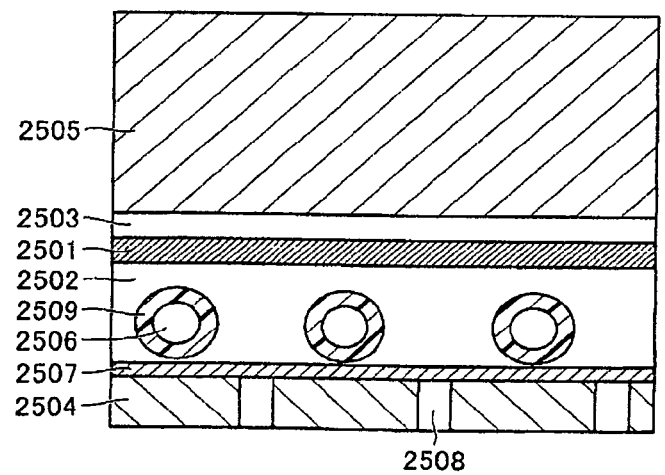
FIG. 25 is a cross-sectional view showing another preferred example of the unit cell employed in the fuel cell stack according to the present invention.

In the unit cell shown in FIG. 25, a tubular fuel flow channel 2506 is formed by a hollow fuel permeability control layer 2509. The fuel passes through this layer from an inner wall side to an outer wall side of the tube and the fuel is supplied to an anode catalyst layer 2502. As tubular fuel flow channel 2506 is formed by fuel permeability control layer 2509, methanol can uniformly be supplied in all directions. In addition, as fuel flow channel 2506 also functions as fuel permeability control layer 2509, the number of necessary members can be decreased and thus cost can be reduced. Here, "tubular" does not necessarily mean that fuel flow channel 2506 has an annular cross-section as shown in the drawing and it can have various shapes such as an oval shape.

In addition, for a thermocompression bonding process in integration of the unit cell, the fuel permeability control layer forming the fuel flow channel preferably has prescribed strength and it is preferably made of a material of which dimension or structure is not varied by 10% or more even pressing under a pressure of 0.1 t/cm$^2$. It is noted, however, that a material of which dimension or structure is varied by 10% or more may be used provided that methanol can be transported in the direction of flow channel along the inner wall of the tube in a deformed state. Here, the unit cell is preferably integrated in consideration of volume change, for example, by providing a fuel flow channel forming member or a space formed by the fuel flow channel forming member in advance with a space that expands by methanol. In addition, fuel permeability control layer 2509 forming fuel flow channel 2506 is preferably made of a material that is not dissolved and does not contract and expand depending on a fuel, water and a temperature for use. Examples of a material for fuel permeability control layer 2509 forming fuel flow channel 2506 include a microtube made of silicon (hereinafter referred to as a silicon tube), a hollow fiber membrane made of poly-4-methyl-1-pentene, polyimide, polyamide, or polyethylene, and a semipermeable membrane tube made of a porous membrane of regenerated cellulose (cellophane), acetylcellulose, polyacrylonitrile, Teflon®, or polysulfone.

In order to lower diffusion resistance of methanol or the methanol aqueous solution, the inner wall of the fuel flow channel is preferably subjected to hydrophilic treatment. For example, a method of chemically modifying a surface of the inner wall of fuel permeability control layer 2509 with polar functional group (hydrophilic group) such as OH group or COOH group, a reform process using a plasma surface treatment system (PS-601S/PS-1200A manufactured by Kasuga Electric, Inc.) or the like, an aching process used in a semiconductor process, and the like are available. According to the fuel flow channel subjected to hydrophilic treatment, diffusion resistance of the methanol aqueous solution is low and methanol can quickly be transported in the direction of flow channel. In addition, though the methanol aqueous solution is supplied to anode catalyst layer 2502 through fuel permeability control layer 2509, carbon dioxide does not stay in fuel flow channel 2506 and does not disturb diffusion of methanol, because fuel permeability control layer 2509 does not allow passage of carbon dioxide. Therefore, supply at a constant flow rate by using a liquid delivery pump or the like is not necessary but supply can be achieved by capillarity. Therefore, the methanol aqueous solution can be supplied without using auxiliary equipment. A hydrophilic layer 2507 may be provided between anode catalyst layer 2502 and anode conductive porous layer 2504. A gas-liquid separation layer may be provided between anode conductive porous layer 2504 and hydrophilic layer 2507, if necessary.

Figure 26:
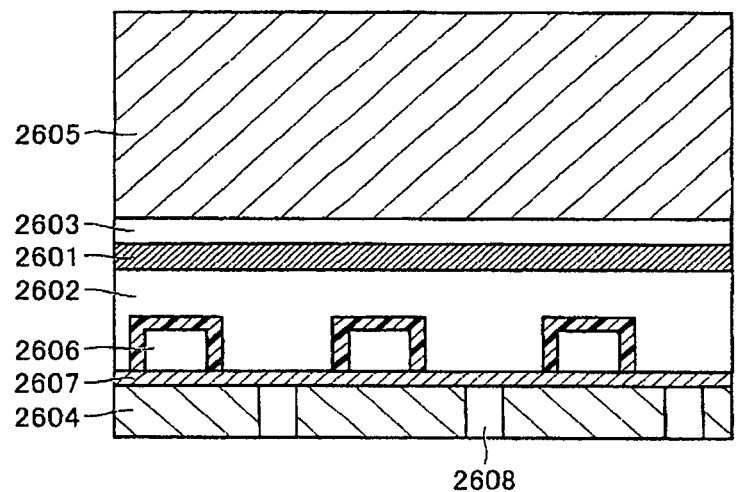
FIG. 26 is a cross-sectional view showing another preferred example of the unit cell employed in the fuel cell stack according to the present invention.

In the unit cell shown in FIG. 26, a fuel flow channel 2606 is formed on a hydrophilic layer 2607 formed on a surface of an anode conductive porous layer 2604. The fuel passes from an inner wall side to an outer wall side of fuel flow channel 2606 and it is supplied to an anode catalyst layer 2602. Naturally, fuel flow channel 2606 may be formed on the surface of anode conductive porous layer 2604. For a thermocompression bonding process, fuel flow channel 2606 preferably has prescribed strength and it is preferably made of a material of which dimension or structure is not varied by 10% or more even pressing under a pressure of 0.1 t/cm$^2$. In addition, fuel flow channel 2606 is preferably made of a highly acid-resistant material such as an acid-resistant photosensitive resin used for a photoresist, such as polyimide, PTFE (polytetrafluoroethylene), PVDF (polyvinylidenfluoride), polycarbonate, polyethylene, polypropylene, a polyacrylic resin, a polyolefin-based polymer, and a polyepoxy-based resin, a poly-metal oxide, and the like. In order to form a fine fuel flow channel, an acid-resistant photosensitive resin used for a photoresist is more preferably used. An exemplary procedure for forming the fuel flow channel is a method of forming a lateral wall of the flow channel by hot-laminating a dry film of a photosensitive resin to a surface of the anode conductive porous layer, thereafter arranging an ultraviolet-ray or X-ray non-transmissive mask having a plurality of through holes like slits, and irradiating the mask with ultraviolet rays or X-rays to polymerize and cure the resin in a slit portion. As the resin is not polymerized and cured in a portion that was not irradiated due to presence of the mask, it can readily be removed with a developer. Thereafter, complete curing is carried out. The formed lateral wall of the flow channel extends perpendicularly to a surface of the anode conductive porous layer. In order to achieve a uniform depth of the flow channel, tolerance of a thickness of the cured photosensitive resin is preferably within a range of 5%. In addition, a dry film of a photosensitive resin is arranged on the formed lateral wall of the flow channel in parallel to the anode conductive porous layer with hot-laminating and an upper wall of the flow channel is formed by using a mask similarly provided with slits, to thereby form the fuel flow channel. In order to facilitate adjustment of a fuel supply amount, a hole or a slit for passage of the methanol aqueous solution is preferably provided in the upper wall of the fuel flow channel. The hole or the slit is preferably sufficiently small in order to avoid introduction of carbon dioxide generated in the anode catalyst layer into the flow channel through the hole or the slit. In addition, the inner wall of the flow channel described above (constituted of the lateral wall and the upper wall) fabricated from the photosensitive resin preferably has improved hydrophilicity through chemical modification of its surface with polar functional group (hydrophilic group) such as OH or COOH, a reform process using a plasma surface treatment system (PS-601S/PS-1200A manufactured by Kasuga Electric, Inc.) or the like, an ashing process used in a semiconductor process, and the like. Thus, carbon dioxide does not stay in fuel flow channel 2606 and does not disturb diffusion of methanol. Therefore, supply at a constant flow rate by using a liquid delivery pump or the like is not necessary, and the methanol aqueous solution can be supplied without using auxiliary equipment. Hydrophilic layer 2607 may be provided between anode catalyst layer 2602 and anode conductive porous layer 2604. A gas-liquid separation layer may be provided between anode conductive porous layer 2604 and hydrophilic layer 2607, if necessary.

Figure 27:
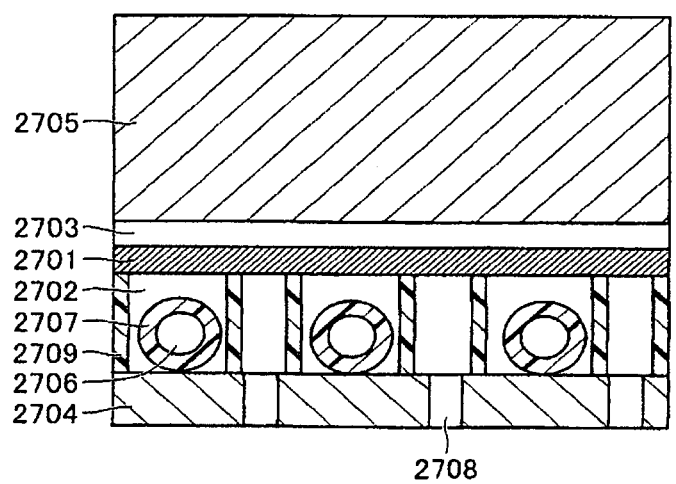
FIG. 27 is a cross-sectional view showing another preferred example of the unit cell employed in the fuel cell stack according to the present invention.

The unit cell shown in FIG. 27 is characterized in that, as in the unit cell in FIG. 25, a tubular fuel flow channel 2706 is formed by a fuel permeability control layer 2707, the fuel is supplied through this layer from an inner side to an outer surface side of the tube, and in addition, a reinforcement member 2709 is provided to be embedded in an anode catalyst layer 2702, Reinforcement member 2709 is arranged to suppress change in a thickness or a shape of anode catalyst layer 2702 and fuel flow channel 2706 during thermocompression bonding generally used in integration of unit cell members, with an expectation to facilitate arrangement of the tubular flow channel and to suppress displacement of the fuel flow channel during thermocompression bonding or the like. A material for reinforcement member 2709 is preferably an acid-resistant material that is not dissolved and does not contract and expand depending on a fuel, water and a temperature for use. In addition, as thermocompression bonding is employed, the material preferably has prescribed strength and preferably its dimension or structure is not varied by 10% or more even pressing under a pressure of 0.1 t/cm². Examples of materials satisfying such conditions include an acid-resistant photosensitive resin used for a photoresist, such as polyimide, PTFE (polytetrafluoroethylene), PVDF (polyvinylidenfluoride), polycarbonate, polyethylene, polypropylene, a polyacrylic resin, a polyolefin-based polymer, and a polyepoxy-based resin, a poly-metal oxide, and the like. In order for the reinforcement members to extend at very short intervals, an acid-resistant photosensitive resin is more preferably used. In addition, in order to facilitate control of a fuel supply speed or to achieve a uniform thickness of the catalyst layer, tolerance of a thickness of the reinforcement member is preferably within a range of 5%. Further, a hydrophilic layer may be provided between anode catalyst layer 2702 and an anode conductive porous layer 2704. A gas-liquid separation layer may be provided between anode conductive porous layer 2704 and the hydrophilic layer, if necessary.

In addition, in order to obtain a desired fuel supply flux or to maintain a shape of the unit cell member, construction based on combination of the fuel flow channels shown in FIGS. 22 to 27 is also possible. For example, the fuel flow channel shown in FIG. 24 and the fuel flow channel shown in FIG. 25 may be combined and arranged.

The present invention may include a current-collector-integrated MEA (Membrane Electrode Assembly) or a current-collector-integrated unit cell having such a structure that a cathode conductive porous layer, a cathode current collector, a cathode catalyst layer, an electrolyte layer, an anode catalyst layer, an anode current collector, and an anode conductive porous layer are stacked in this order. By integrating the current collector, a satisfactorily low contact resistance between the current collector and the catalyst layer can be maintained without pressing with the use of such a fastening member as a bolt or a nut, and electrical resistance in the in-plane direction of the catalyst layer can be lowered. In such a current-collector-integrated unit cell, for example, a current collector having a flat-plate-shaped structure including a plurality of opening portions penetrating in a direction of thickness, such as a mesh shape or a punching metal shape of a noble metal such as Au or a corrosion-resistant metal is preferably used as the current collector, and at least one of the conductive porous layer and the catalyst layer preferably enters the opening portion. In addition, the cathode conductive porous layer and the anode conductive porous layer are preferably electrically conductive. The current-collector-integrated MEA and the current-collector-integrated unit cell can be fabricated by fabricating two stack structures (for the anode side and the cathode side) each obtained by fixing the current collector on the conductive porous layer and applying a catalyst thereon to form a catalyst layer, and thereafter by hot pressing the resultant structures with an electrolyte membrane being sandwiched therebetween.

Preferably, the fuel cell stack according to the present invention is configured such that the fuel cell layers configured to have at least one unit cell described above are stacked.

Figure 28:
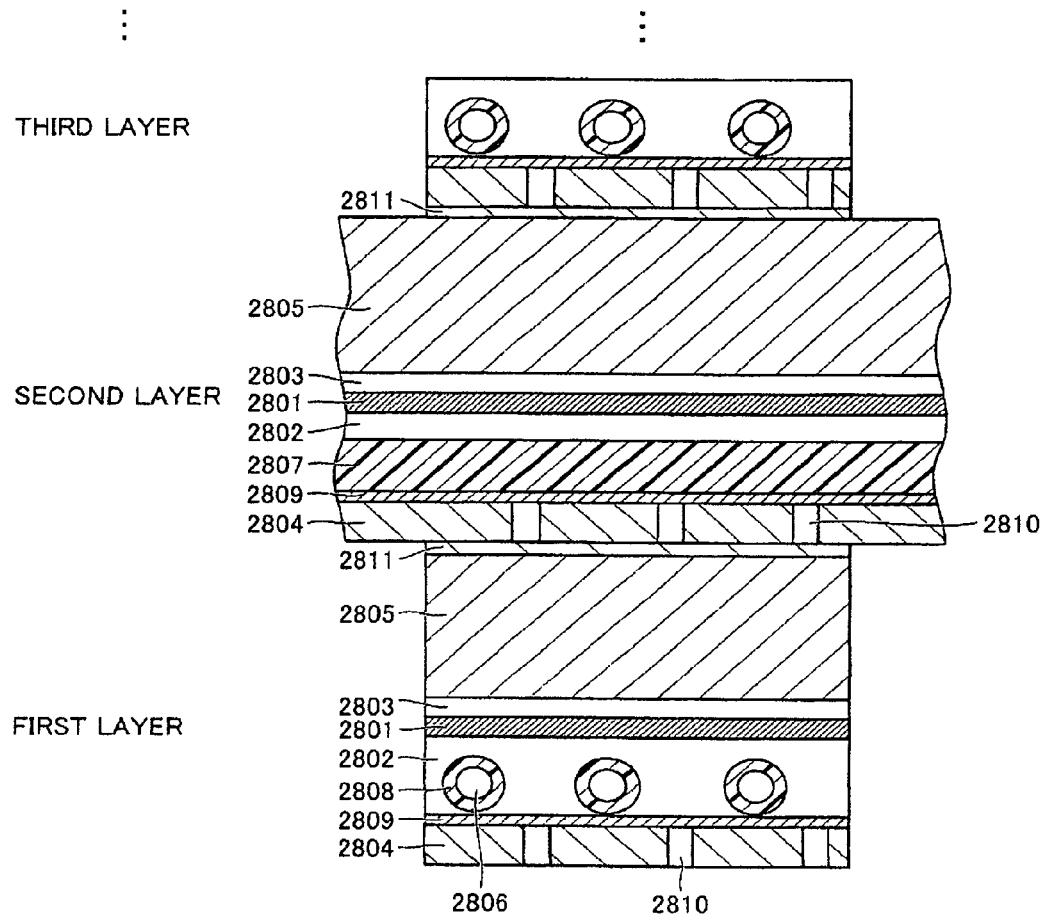
FIG. 28 is a cross-sectional view schematically showing an example of preferred bonding and integration of fuel cell layers in the present invention.

FIG. 28 is a cross-sectional view schematically showing an example of preferred bonding and integration of the fuel cell layers in the present invention. As illustrated, a direction of stacking a cathode conductive porous layer 2805, a cathode catalyst layer 2803, an electrolyte membrane 2801, an anode catalyst layer 2802, and an anode conductive porous layer 2804 constituting the unit cell is preferably the same as a direction of stack of the fuel cell layers. For example, when the direction of stack of the layers constituting the unit cell is perpendicular to the direction of stack of the fuel cell layers, the anode conductive porous layers come in contact with each other or the cathode conductive porous layers come in contact with each other between the adjacent fuel cell layers, and therefore, an insulating layer for insulation therebetween should be provided and the number of required members increases. In addition, in arrangement in a perpendicular direction, an area of a portion of contact between the fuel cell layers decreases and electrical resistance in current collection may increase. Accordingly, the direction of layer thickness of the unit cell is preferably the same as the direction of layer thickness of the fuel cell layer. In FIG. 28, cathode catalyst layer 2803 is arranged above anode catalyst layer 2802 in each fuel cell layer, however, arrangement is not limited thereto. Stacking may be such that anode catalyst layer 2802 is located above cathode catalyst layer 2803 and the direction of stack of the layers constituting the unit cell is the same as the direction of stack of the fuel cell layers.

As shown in FIG. 28, the fuel cell layers are preferably stacked in series in the direction of stack with a bonding layer 2811 which will be described later being interposed. The serially stacked structure refers to such a stack structure that the cathode conductive porous layer in the fuel cell layer is electrically connected to the anode conductive porous layer in the fuel cell layer stacked on the former fuel cell layer. As the serially connected structure does not require another wiring, a manufacturing process can be simplified.

Bonding between the fuel cell layers will be described with reference to FIG. 28. Bonding between the fuel cell layers is preferably carried out by using an electrically conductive adhesive, with electrically conductive bonding layer 2811 made of the electrically conductive adhesive being interposed. In addition, the electrically conductive adhesive is more preferably a mixture of a thermosetting polymeric adhesive and highly electrically conductive powders. Examples of the thermosetting polymeric adhesive include a polyolefin-based polymer such as 1152B of Three Bond Co., Ltd., as well as an epoxy resin, a phenolic resin, a melamine resin, and a urea resin. The thermosetting polymeric adhesive undergoes heated polymerization during thermocompression bonding under pressure and thereafter it is cooled to room temperature still under pressure, whereby the fuel cell layers are satisfactorily joined to each other. Therefore, by using the thermosetting polymeric adhesive, a fastening member can be eliminated. In an example using a two-component epoxy resin such as Quick 5 manufactured by Konishi Co., Ltd., it is cured at a low temperature from room temperature to about 100° C. Therefore, bonding is more preferably carried out in a slightly pressurized state at room temperature.

For example, powders of corrosion-resistant materials including a carbon-based material such as acetylene black, Ketjen Black, amorphous carbon, carbon nanotube, and carbon nanohorn, a noble metal such as Au, Pt and Pd, a metal such as Ti, Ta, W, Nb, Ni, Al, Cr, Ag, Cu, Zn, and Su, Si, a nitride, a carbide, a carbonitride, or the like thereof, an alloy such as stainless, Cu—Cr, Ni—Cr and Ti—Pt are preferably used as the highly electrically conductive powders. The highly electrically conductive powders not only connect the fuel cell layers to each other with low electron conduction resistance, but also allows carbon dioxide generated from anode catalyst layer 2802 to escape through a gap formed between powders toward cathode conductive porous layer 2805, so that carbon dioxide can be exhausted to the gap region in the fuel cell stack through cathode conductive porous layer 2805. In the case of an electrically conductive adhesive having an insufficient gap between powders, electrically conductive bonding layer 2811 should be applied such that a prescribed gap is created between the fuel cell layers, rather than applying the same on the entire surfaces of the opposing fuel cell layers. Namely, for example, the electrically conductive adhesive is applied only to a portion around an outer side of a portion where the first fuel cell layer and the second fuel cell layer are opposed to each other for bonding, in order not to clog through holes 2810 provided in anode conductive porous layer 2804 in the fuel cell in the second layer. As the gap region is thus formed between the fuel cell layers, carbon dioxide can reliably be exhausted through hole 2810 and cathode conductive porous layer 2805.

In addition, the hole in anode conductive porous layer 2804 in one of adjacent fuel cell layers and the hole in cathode conductive porous layer 2805 in the other fuel cell layer preferably communicate with each other. A part of water or vapor produced at cathode catalyst layer 2803 passes through that gap and further through anode conductive porous layer 2804 to reach anode catalyst layer 2802 or a hydrophilic layer 2809, so that it can be reused as a reactant at the anode. The water produced on the cathode side can thus be reused on the anode side.

As shown in FIG. 28, in the fuel cell stack according to the present invention, cathode conductive porous layer 2805 in the fuel cell layer and anode conductive porous layer 2804 in the fuel cell layer stacked over the same and adjacent thereto are preferably integrated. Cathode conductive porous layer 2805 and anode conductive porous layer 2804 are bonded by bonding layer 2811 and integrated to each other. Bonding layer 2811 is electrically conductive and porous, so that good electrical contact between the stacked fuel cell layers can be ensured without external pressure. As a presser, a bolt, a nut, and the like, that are members for fastening the stacked fuel cell layers to each other, are thus not required, a smaller size and lower cost of the fuel cell stack can be achieved. Details will be described in a section of a manufacturing method. In addition, as described above, water produced at cathode catalyst layer 2803 evaporates and passes through cathode conductive porous layer 2805, bonding layer 2811 and anode conductive porous layer 2804, it is cooled by hydrophilic layer 2809 as a result of temperature difference, and a part thereof is trapped. This water can be used for reaction at anode catalyst layer 2802. As the water produced on the cathode side can thus be reused, methanol concentration in the methanol aqueous solution in the fuel cartridge can be raised, and power generation for a long time can be achieved with a small fuel cartridge.

<Fuel Supply>

Figure 29:
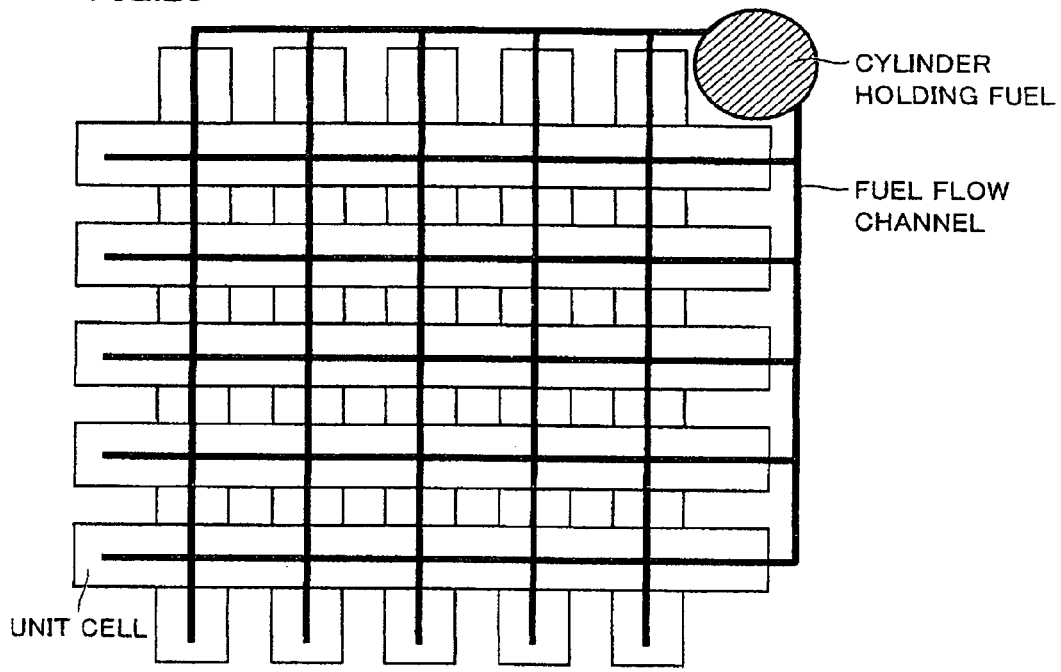
FIG. 29 is a top view schematically showing an example of a method of supplying a fuel to the fuel cell stack according to the present invention.

In the fuel cell stack according to the present invention, as shown in FIG. 29, a fuel such as a methanol aqueous solution can be supplied from a cylinder holding the fuel through a fuel flow channel to each unit cell. The cylinder holding the fuel is preferably arranged in at least any one of gaps in four corners of the fuel cell stack formed by stacking the unit cells.

Figure 30:
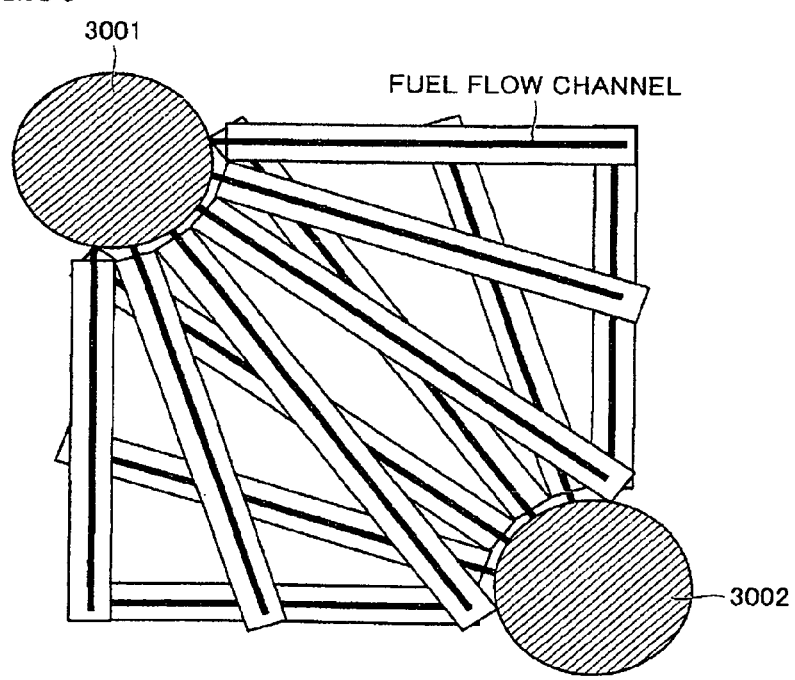
FIG. 30 is a top view schematically showing another example of a method of supplying a fuel to the fuel cell stack according to the present invention.
Figure 31:
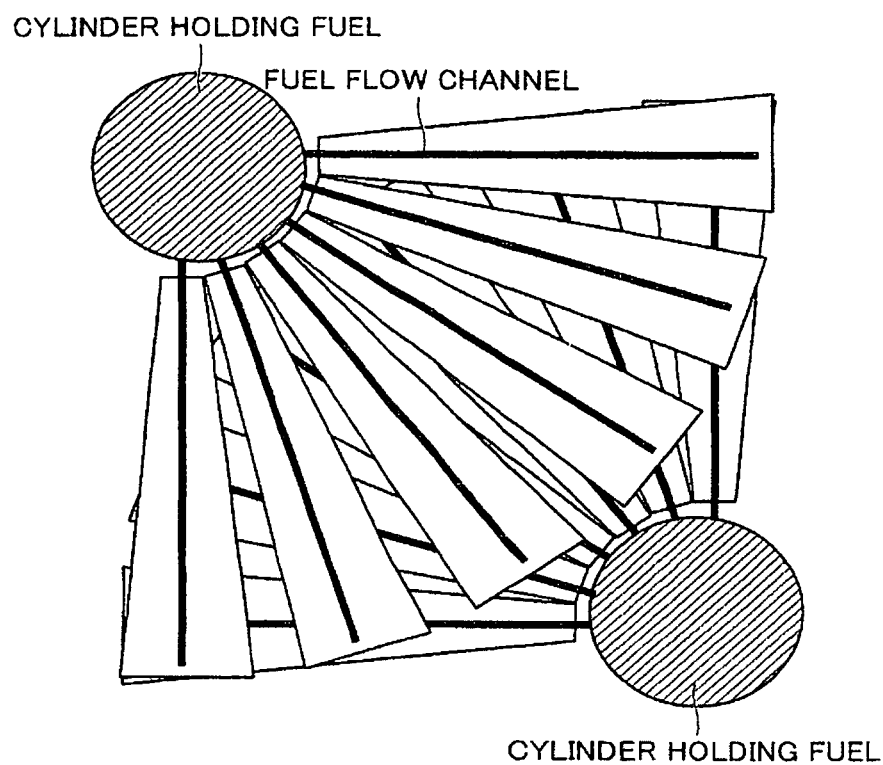
FIG. 31 is a top view schematically showing another example of a method of supplying a fuel to the fuel cell stack according to the present invention.

Fuel supply to the fuel cell stack shown in FIGS. 19 and 21 will be described. As shown in FIGS. 30 and 31, radially arranged unit cells constituting one fuel cell layer are connected to a first fuel cartridge 3001, and radially arranged unit cells constituting a fuel cell layer adjacent thereto are connected to a second fuel cartridge 3002. First fuel cartridge 3001 and second fuel cartridge 3002 are each installed in a region where one ends of the unit cells concentrate. As the fuel cartridge is arranged at where the fuel cells concentrate, routing of the fuel flow channel is facilitated and manufacturing cost is reduced. In addition, as the fuel is directly supplied from the fuel cartridge to each unit cell, the fuel is uniformly supplied to the unit cells. Therefore, power generation characteristics uniform among the unit cells are readily obtained and power generation characteristics of the fuel cell stack can be improved.

<Method of Manufacturing Fuel Cell Stack>

So long as the fuel cell stack according to the present invention is structured as described above, a manufacturing method thereof is not particularly restricted. Preferably, however, the method includes at least one of (1) a first step of forming an opening in a current collector or forming a conductive porous layer, (2) a second step of forming a catalyst layer, (3) a third step of integrating constituent members of a unit cell, (4) a fourth step of forming a fuel cell layer, and (5) a fifth step of stacking and integrating the current collector and the fuel cell layer, and more preferably the method includes all these steps.

(1) First Step

In an example where a metal plate or a metal foil is employed as a current collector or the like, a method of forming a plurality of openings in a plane by a punching method, an etching method, a laser method, drilling, and the like can be adopted as a method of forming an opening in a current collector or a method of forming a conductive porous layer.

In the punching method, openings can be formed by fabricating a mold for forming a prescribed opening pattern, pressing the mold against the current collector or the like, and performing punching. According to such a manufacturing method, a plurality of openings can be formed at once without the use of a special apparatus and inexpensive working can be realized. In addition, as this is machining free from heat, openings can be formed without restriction on a material or quality of the material for a selected current collector or the like.

In the etching method, openings are formed by using a photoetching process used in a printed wiring technique or the like. Openings can be formed by applying or laminating a photosensitive resist to any one surface of a metal plate or a metal foil to form a photosensitive layer, forming a resist pattern for the metal plate or the metal foil such that the pattern remains after exposure, and performing development and etching. According to such a manufacturing method, a plurality of openings can be formed at once and processing of fine opening patterns can be achieved.

In the laser method, such laser as excimer laser, carbon dioxide laser or xenon laser is used for forming openings. Here, focused laser can be used to form a prescribed opening pattern, while moving a current collector or the like on an X-Y stage for each opening.

(2) Second Step

As a method of forming a catalyst layer, for example, a technique to uniformly apply a paste obtained by dispersing catalyst particles, electrically conductive particles and an electrolyte in an organic solvent with a bar-coating method, a screen printing method, a spray coating method, or the like and to remove the organic solvent in the paste to form the catalyst layer can be adopted. According to such a manufacturing method, a catalyst layer having a large number of pores can be formed and an effective surface area of catalyst particles can be increased. The catalyst layer means the anode catalyst layer and the cathode catalyst layer.

In addition, the catalyst layer can be formed directly on the conductive porous layer. As the catalyst layer is thus integrally formed in advance on the conductive porous layer, an interface having good adhesiveness can be obtained.

Moreover, the catalyst layer can be formed also by forming a catalyst layer on a base material such as a plastic film and thereafter transferring the catalyst layer to the conductive porous layer. According to such a manufacturing method, a catalyst layer can separately be formed in advance and dispersibility of catalyst particles and electrically conductive particles can be improved. Therefore, even an organic solvent with which an insulating layer is inevitably formed on a surface of a conductive porous layer can be used as a solvent for the paste.

Further, in the step of forming an anode catalyst layer on the anode conductive porous layer, a method of forming the anode catalyst layer by arranging a fuel flow channel forming member on a surface of the anode conductive porous layer on which the anode catalyst layer is to be formed and forming the anode catalyst layer from above the fuel flow channel forming member such that the fuel flow channel forming member is embedded in the anode catalyst layer can be adopted. As the fuel flow channel forming member is thus embedded in the anode catalyst layer, an interface where good adhesiveness between the fuel flow channel forming member and the anode catalyst layer is achieved can be obtained. Furthermore, in the step of forming an anode catalyst layer on the anode conductive porous layer, a method of forming the anode catalyst layer by forming the anode catalyst layer in advance on the anode conductive porous layer, then arranging the fuel flow channel forming member on the anode catalyst layer formed in advance, and forming the anode catalyst layer from above the fuel flow channel forming member such that the fuel flow channel forming member is embedded in the anode catalyst layer can also be adopted. Thus, good adhesiveness can be obtained at an interface between the anode catalyst layer and the anode conductive porous layer and an interface between the fuel flow channel forming member and the anode catalyst layer.

(3) Third Step

As a method of integrating constituent members of the unit cell, for example, a method of integrally forming the unit cell through thermocompression bonding can be adopted. For example, the step of arranging the anode conductive porous layer and the cathode conductive porous layer on each of which the catalyst layer has been formed in the second step above, such that the anode catalyst layer and the cathode catalyst layer are opposed to each other with the electrolyte membrane being interposed and performing thermocompression bonding at a temperature exceeding a softening temperature or a glass transition temperature of an electrolyte in the electrolyte membrane or the catalyst layer by using a hot pressing apparatus can be adopted. As the members are thus joined by chemical bonding, an anchoring effect, adhesive force, or the like, electron conduction resistance or ionic conduction resistance at an interface between the members can be lowered. Through this step, for example, the cathode conductive porous layer, the cathode catalyst layer, the electrolyte membrane, the anode catalyst layer in which the fuel flow channel forming member has been embedded, and the anode conductive porous layer are stacked in the direction of layer thickness of the unit cell in this order and integrated.

(4) Fourth Step

An example of a method of forming the fuel cell layer includes a method of preparing a plurality of unit cells fabricated in the third step above and arranging the unit cells at prescribed intervals on a plane such that the anode conductive porous layer and the cathode conductive porous layer face the same direction. Thus, the fuel cell layer including a plurality of two-dimensionally arranged unit cells can be formed. In addition, the fuel cell layer can also be formed by fabricating a first fuel flow channel fixed by arranging first fuel flow channel forming members in advance at prescribed intervals and connecting the first fuel flow channel forming members to second fuel flow channel forming members such that flow channel spaces communicate with one another and by fabricating the unit cell on a plane by using the first fuel flow channel such that the anode conductive porous layer and the cathode conductive porous layer face the same direction in accordance with the third step above.

(5) Fifth Step

An example of a method of stacking and integrating the current collector and the fuel cell layer includes the following method. Initially, using the fuel cell layers obtained in the fourth step above, the fuel cell layers are stacked such that they intersect with each other at such a prescribed angle that the anode conductive porous layer and the cathode conductive porous layer are opposed to each other and come in contact with each other. Here, an electrically conductive adhesive is applied to a contact portion in the anode conductive porous layer or the cathode conductive porous layer. Then, by subjecting a stack structure obtained by stacking the current collectors on the anode conductive porous layer and the cathode conductive porous layer located at opposing ends of the stack structure to thermocompression bonding, the fuel cell stack in which the fuel cell layers are integrated can be fabricated. As the electrically conductive adhesive is applied, the fuel cell layers are connected to each other with low electron conduction resistance. Accordingly, higher output of the fuel cell stack can be achieved and a fastening member can be eliminated as a result of integration. Preferably, the electrically conductive adhesive is a mixture of a thermosetting polymeric adhesive and highly electrically conductive powders. The thermosetting polymeric adhesive described above is cured by heat during thermocompression bonding and achieves good bonding between the fuel cell layers. Therefore, a fastening member is not necessary in the fuel cell stack. The highly electrically conductive powders connect the fuel cell layers to each other at low electron conduction resistance, and in addition some of carbon dioxide generated in the anode catalyst layer can efficiently be exhausted through a gap formed between the powders. In integration of the stack structure through thermocompression bonding, it is also possible to manufacture the integrated fuel cell stack by carrying out thermocompression bonding once, after all fuel cell layers and current collectors constituting the fuel cell stack are stacked. On the other hand, the integrated fuel cell stack may be manufactured by dividing all fuel cell layers constituting the fuel cell stack into a plurality of sets, integrating the fuel cell layers in each set through thermocompression bonding, stacking the integrated sets and the current collectors, and carrying out thermocompression bonding again.

<<Fuel Cell System>>

A fuel cell system according to the present invention will be described. FIG. 32 is a schematic diagram showing a preferred example of the fuel cell system according to the present invention, FIG. 32($a$) being a perspective view thereof, FIG. 32($b$) being a top view, and FIG. 32($c$) being a side view. FIGS. 32($b$) and 32($c$) show only the mounted fuel cell stack. The fuel cell system shown in FIG. 32($a$) includes the fuel cell stack as in FIG. 3, switches A, B, C, D, E, a, b, c, d, and e, and a control circuit. The control circuit sends a signal to the switches and controls opening and closing thereof. The switch is implemented, for example, by a semiconductor device such as a bipolar transistor and a MOS transistor or a mechanical switch such as an electromagnetic relay.

In addition, as shown in FIGS. 32(b) and 32(c), the fuel cell stack includes current collectors only at opposing ends thereof the current collectors are provided in a plurality of unit cells in the fuel cell layers at opposing ends respectively, and the current collectors included in the plurality of unit cells are electrically isolated from each other. The anode conductive porous layer and the cathode conductive porous layer in each unit cell preferably have high electrical resistance, as well as resistivity preferably in a range from 0.01 to 1 Ω·cm. Thus, as the fuel cell layer not having a current collector has the conductive porous layer having a high resistance value, a current that flows through the fuel cell layer in a lateral direction is less. Though a method of controlling a switch will be described later, an area or a portion where a current flows in a vertical direction can be controlled by using the switch. The switch is preferably joined to each current collector through a lead. An FPC (Flexible Printed Circuit) is preferably used as a lead in terms of a smaller thickness, lighter weight and ease of installation of wires.

FIG. 33 is a schematic diagram showing a manner of controlling the fuel cell system according to the present invention. In FIG. 33(a), all switches A, B, C, D, E, a, b, c, d, and e are in the ON state. In a region S, a current flows in a vertical direction. Namely, portions where a longitudinally extending unit cell and a laterally extending unit cell intersect with each other are stacked in a direction of stack with no gap, so that a current can flow in the direction of stack.

In FIG. 33(b), switches a, b, c, d, e, and A are in the ON state, and switches B, C, D, and E are in the OFF state. Therefore, a current can be extracted from a column of switch A, however, a current cannot flow from a power generation portion of other unit cells because of high resistance, and output can hardly be obtained. By thus controlling the switches, in this example, 25 regions from which a current is to be extracted can be controlled with a small number of that is, ten, switches. Lower cost, simplification of wiring, and a smaller size of the fuel cell system can be achieved by decreasing the number of switch members.

Figure 34:
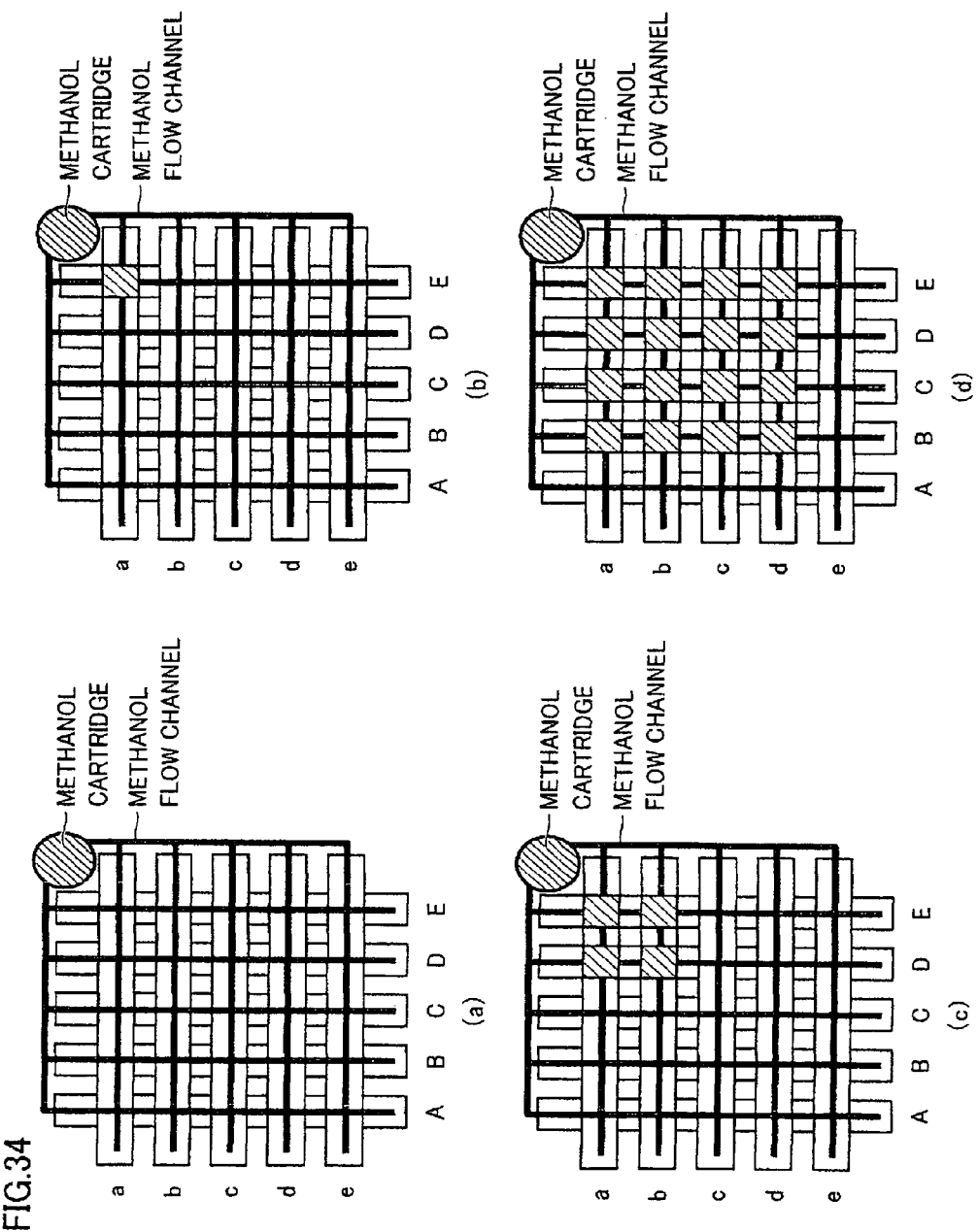
FIG. 34 is a schematic diagram for illustrating a method of extracting a current.

In the fuel cell system according to the present invention, control is preferably carried out such that a current is successively extracted from a power generation region of a fuel cell to which the fuel is supplied. As shown in FIGS. 34(a) to (d), a case where a methanol flow channel is formed from a methanol cartridge will be described by way of example. When methanol is supplied from the methanol cartridge, from a state where all switches are turned off, initially, switches a and E are turned on. As shown in FIG. 34(b), a current is mainly extracted from a power generation region of the intersecting unit cell closest to the methanol cartridge. As the output current is extracted, the temperature increases, methanol is warmed, and a diffusion rate within the methanol flow channel is increased. Then, in FIG. 34(c), switches a, b, D, and E are turned on and other switches are turned off. In addition, as shown in FIG. 34(d), switches a, b, c, C, E, and D are turned on, and so on. Thus, a current is extracted successively from a power generation region of the fuel cell closer to the cartridge toward a power generation region thereof farther therefrom, so that methanol is quickly supplied to a power generation region of the fuel cell farthest from the cartridge and methanol can spread all over the fuel cell. The fuel cell can thus soon be started up. In addition, electric power from a portion enabled to generate electric power can be supplied to auxiliary equipment such as a pump or a fan or a portion where application load is low, to thereby not only speed up start-up of the fuel cell but also to speed up launching of the application. Moreover, for example by actuating a fan, launching while improving power generation characteristics at the time of start-up can also be carried out, so that generated electric power at the time of start-up can effectively be utilized.

In addition, the fuel cell system according to the present invention includes an inclination sensor, and the switches are preferably controlled to increase an amount of power generation by the fuel cell located below, for producing an ascending air current. The switches are controlled by means of the inclination sensor such that a power generation region at a position closest to a ground surface is responsible for highest output. An operation of the switches will be described specifically in the fuel cell stack shown in FIG. 35. In a steady state, switches e, A, B, C, D, and E are turned on and switches a, b, c, and d intermittently repeat switch ON and OFF. Thus, a largest amount of output electric power is extracted from power generation regions of the unit cells located lowest, and the temperature of those unit cells is highest due to heat generation caused by internal resistance. As an ascending air current thus occurs, warmed air diffuses in the fuel cell stack and the air can satisfactorily be taken into the fuel cell stack. Thus, by using the inclination sensor to detect a power generation region of the unit cell closest to the ground and causing that unit cell to generate electric power to attain the highest temperature under switching control, air convection can be improved and the need for a fan or a pump can be obviated or power consumption can be reduced.

The present invention will be described hereinafter in further detail with reference to examples, however, the present invention is not limited thereto.

Example 1

A Nafion 117 membrane (manufactured by Du Pont) having a size of 6 mm×48 mm and a thickness of approximately 175 μm was employed as the electrolyte membrane. A catalyst paste was prepared in accordance with the following procedure. An anode catalyst paste was prepared by placing catalyst carrying carbon particles consisting of Pt—Ru particles of which Pt carrying amount was 32.5 wt % and Ru carrying amount was 16.9 wt % and carbon particles (TEC66E50 manufactured by Tanaka Kikinzoku Group), 20 wt % Nafion alcohol solution (manufactured by Sigma-Aldrich Co.), ion exchanged water, isopropanol, and zirconia beads at a prescribed ratio in a container made of PTFE, mixing these with the use of a stirrer and deaerator at 50 rpm for 50 minutes, and removing the zirconia beads. In addition, a cathode catalyst paste was prepared as in the case of the anode catalyst paste, by using catalyst carrying carbon particles consisting of Pt particles of which Pt carrying amount was 46.8 wt % and carbon particles (TEC10E50E manufactured by Tanaka Kikinzoku Group).

Figure 36:
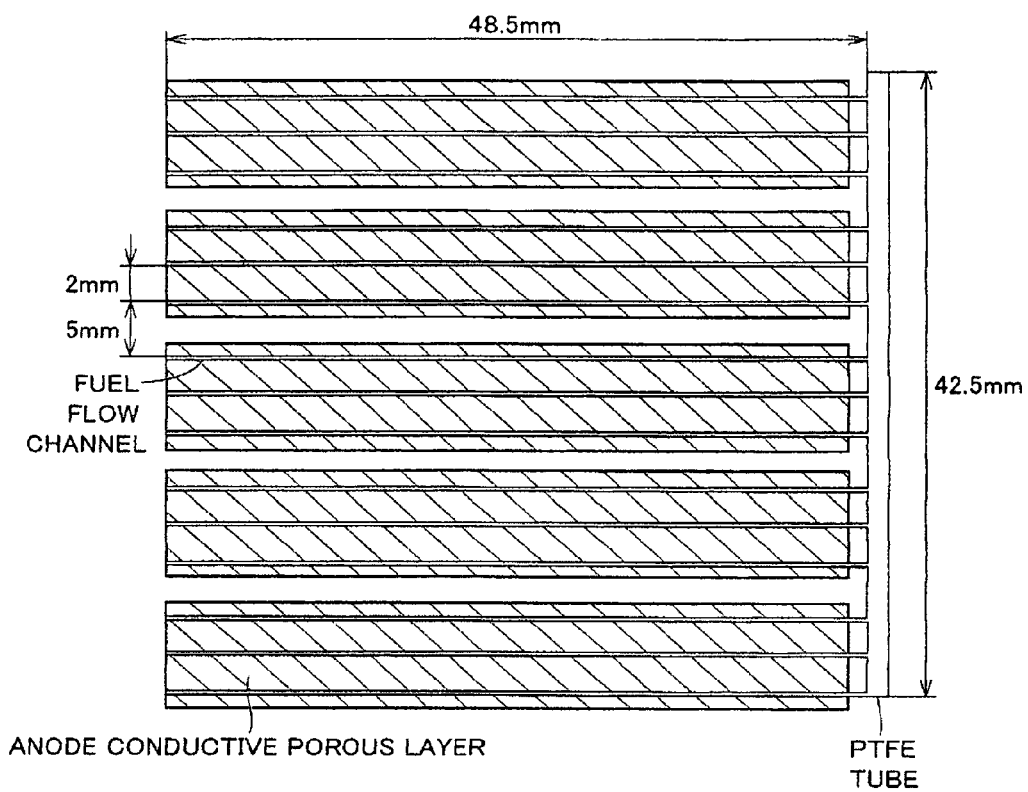
FIG. 36 is a schematic diagram showing a part of a configuration of a unit cell in Example 1.

Two types of tubes of a silicon tube having an outer diameter of 0.3 mmϕ (an inner diameter of 0.2 mmϕ) and a length of 48.5 mm (KN3344391 manufactured by Tech-Jam) and a PTFE tube for manifold having an outer diameter of 2 mmϕ (an inner diameter of 1 mmϕ) and a length of 42.5 mm (KN3344350 manufactured by Tech-Jam) were used as fuel flow channel forming members constituting the fuel flow channel, and the tubes were coupled to each other so that fifteen silicon tubes in total are branched to extend from the PTFE tube as in FIG. 36. Coupling was achieved by providing a hole having a diameter of 0.5 mm in the PTFE tube, inserting the silicon tube therein, and sealing the same with an epoxy-resin-based adhesive having good chemical resistance. The silicon tubes were connected such that the directions of their length were perpendicular to a direction of length of the PTFE tube, and an interval between the silicon tubes was as narrow as 2 mm, and an interval between sets of three silicon tubes was as wide as 5 mm. A wire made of Ti and having a diameter of 0.15 mmϕ was inserted in each silicon tube.

Then, in order to form the hydrophilic layer, a paste consisting of hydrophilic carbon and Nafion was prepared by placing an 20 wt % alcohol solution of Nafion (manufactured by Sigma-Aldrich Co.) containing the hydrophilic carbon (Aqua-Black 001, manufactured by Tokai Carbon Co., Ltd.), ion exchanged water, isopropanol, and zirconia beads at a prescribed ratio in a container made of PTFE, mixing these with the use of a stirrer and deaerator at 50 rpm for 50 minutes, and removing the zirconia beads.

Carbon paper GDL31BC (manufactured by SGL Carbon Japan Co., Ltd.) having one surface subjected to water-repellent treatment with a layer composed of a fluorine-based resin and carbon particles was made to have a size of 6 mm×48 mm, which was employed as the anode conductive porous layer. The paste above consisting of hydrophilic carbon and Nafion was applied with a bar-coater onto a water-repellent surface of the conductive porous layer, followed by drying, to form the hydrophilic layer having a thickness of 40 μm. The silicon tubes were rested on this hydrophilic layer and arranged such that the silicon tubes were in parallel to a direction of a long side of the conductive porous layer and a tip end of the silicon tube and one end in the direction of the long side of the conductive porous layer coincide with each other. Here, as in FIG. 36, three silicon tubes per one conductive porous layer were disposed as aligned such that centerlines in a direction of length of the silicon tube were located at positions at distances of 1 mm, 3 mm and 5 mm respectively, with respect to a direction of a short side of the conductive porous layer, and the silicon tubes were aligned on five conductive porous layers in total in accordance with the similar procedure.

Then, in order to fix the aforementioned silicon tubes onto the conductive porous layer, an end portion of the silicon tube in the direction of length was tentatively secured to the conductive porous layer with a cellophane tape. While the silicon tube was located on the conductive porous layer, the silicon tube and the conductive porous layer were installed on a screen printing plate such that the conductive porous layer and an opening portion of 6×48 mm in the screen printing plate were in parallel to a direction along plane and the anode catalyst paste described above was applied. The screen printing plate was held in a thermostatic chamber at 60° C. each time the anode catalyst paste was applied, so as to dry away the solvent contained in the anode catalyst paste. By repeating this process several times, the anode catalyst layer having a thickness of approximately 0.4 mm from the surface of the conductive porous layer was formed. Through the processes above, the silicon tubes tentatively secured to the conductive porous layer were fixed in such a state as embedded in the catalyst layer as shown in FIG. 25. A stack structure of the conductive porous layer, a set of three methanol supply paths, and the anode catalyst layer formed in accordance with the procedure above is referred to as an "anode unit". Five anode units were fabricated for fifteen silicon tubes in total.

Instead of the silicon tube above, a hollow fiber or a dialysis tube may be employed. In the case of a hollow fiber, a hollow fiber having an outer diameter of 0.22 mm (material: poly-4-methyl-1-pentene manufactured by DIC Corporation) can be used, a length thereof is in conformity with that of the silicon tube, and a procedure for producing the anode unit is also the same. In the case of a dialysis tube, a dialysis tube having a two-dimensional width of approximately 4 mm (material: regenerated cellulose) and a length of 48.5 mm was employed instead of the silicon tube and coupled to a connection port provided in the PTFE tube. In using the dialysis tube as well, a procedure for producing the anode unit is the same as in the case of the silicon tube. As the two-dimensional width of the dialysis tube is shorter than a length of a short side of the conductive porous layer, the anode catalyst layer and the conductive porous layer have a sufficient contact surface, however, by further decreasing the two-dimensional width, the contact surface can also be increased. As carbon dioxide representing a product cannot be exhausted from a portion of contact between the dialysis tube and the conductive porous layer, exhaust of the product is facilitated by increasing the contact surface.

Carbon paper GDL31BC (manufactured by SGL Carbon Japan Co., Ltd.) having one surface subjected to water-repellent treatment with a layer composed of a fluorine-based resin and carbon particles was made to have a size of 6 mm×48 mm, which was employed as the cathode conductive porous layer. The cathode catalyst paste was applied to a water-repellent surface of the conductive porous layer by using a screen printing plate, that was held in a thermostatic chamber at 60° C. for ten minutes to dry away the solvent contained in the cathode catalyst paste, to thereby form the cathode catalyst layer (the stack structure of the conductive porous layer and the cathode catalyst layer is hereinafter referred to as a "cathode unit"). Five cathode units were fabricated in accordance with the similar procedure.

A titanium plate having a thickness of 0.1 mm and a size of 6 mm short side×52 mm long side was used as the current collector. By drilling, a pattern of openings at a pitch of 0.550 mm each having a diameter of 0.45 mm was formed in a region of 6 mm×48 min.

An olefin-based resin 1152B manufactured by Three Bond Co., Ltd., which is a thermosetting polymeric adhesive, was employed as the electrically conductive adhesive used for forming the bonding layer, and XC72 (Vulcan) was employed as highly electrically conductive powders. Here, 1152E was pasty, and 1152E and XC72 were placed in a mortar at a ratio of 1.7:1 and they were sufficiently mixed with each other. Conditions for curing 1152B were set to 100° C. and 30 minutes and the bonding layer was formed by curing.

Further stacking was performed in the order of the anode unit (the conductive porous layer being located below), the electrolyte membrane and the cathode unit (the cathode catalyst layer being located below) from below, such that the anode catalyst layer and the cathode catalyst layer overlapped with each other with the electrolyte membrane being interposed. As five anode units were formed for the methanol supply paths described above, five stack structures were fabricated by further stacking in accordance with the similar procedure. A Teflon spacer having a size of 25 mm×50 mm and a thickness of 1.0 mm was employed. The stack structure was installed in the center of a stainless plate having a size of 100 mm×100 mm and a thickness of 3 mm. One Teflon spacer was arranged on the stainless plate for each side thereof, at a distance of 1 cm from each side on an outer perimeter of the stainless plate in parallel thereto. The stack structure and the spacer were sandwiched between stainless plates each having a size of 100 mm×100 mm and a thickness of 3 mm. Thermocompression bonding was performed for two minutes at 130° C. and at 10 kgf/cm$^2$ in a direction of thickness of the stainless plate, to integrate the stack structure and to form the unit cell. Specifically, interfaces of the stacked members are joined to each other through an anchoring effect, adhesive force of Nafion contained in the catalyst layer, or the like. Thereafter, the wire above was slowly pulled out of the silicon tube. As the tip end of the silicon tube is open and such a state allows methanol sucked up by capillarity to flow out, a paste consisting of an NMP (2-methylpyrrolidone) solution of PVDF containing PTFE particles was applied to a side surface, from which the tip end of the silicon tube of the unit cell projects. The organic solvent contained in the paste was removed by drying and this process was repeated until the tip end of the silicon tube was closed by a porous body. As a result of this process to close the tip end of the silicon tube with the porous body, methanol is not exhausted but air introduced in the tube is exhausted through the porous body. The fuel cell layer constituted of a group of five unit cells fabricated in accordance with the procedure described above was adopted as a "first layer".

Figure 37:
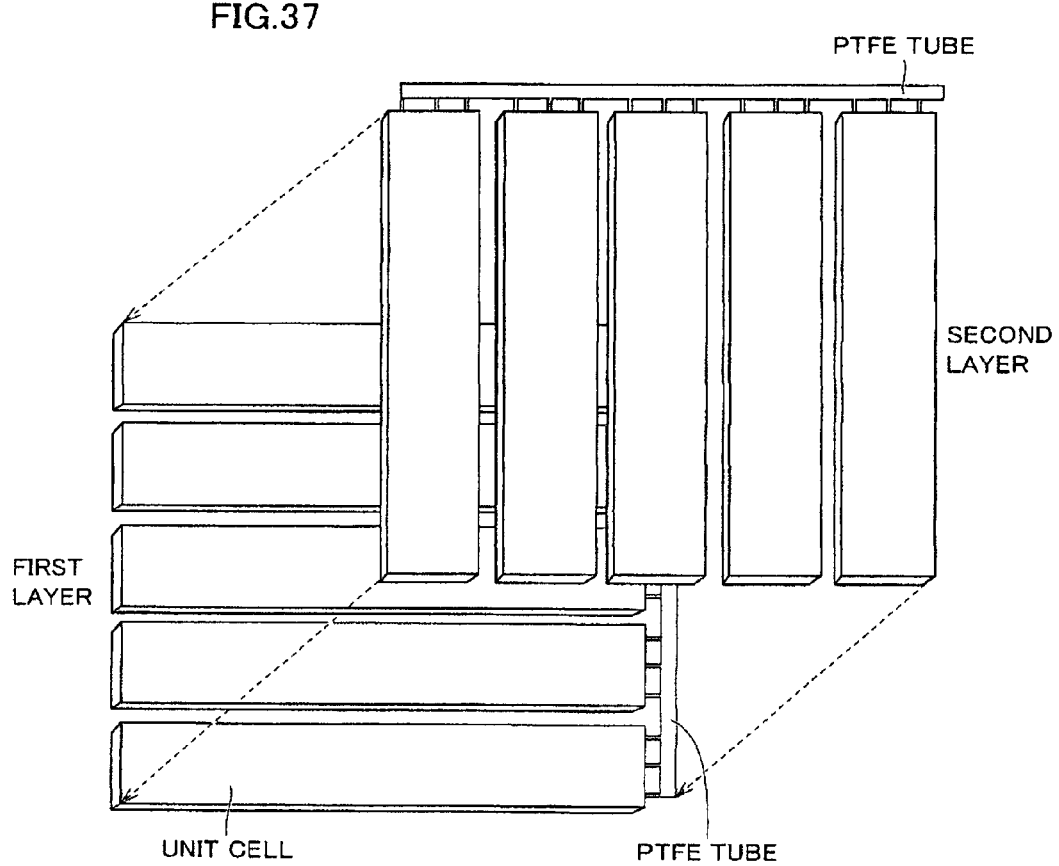
FIG. 37 is a schematic diagram showing a configuration of a fuel cell layer in a fuel cell stack in Example 1.

In accordance with the procedure the same as that for the first layer, the fuel cell layers to serve as a second layer to a fifth layer were fabricated. As shown in FIG. 37, further stacking was performed such that a direction of a long side of the unit cells forming the second layer is perpendicular to a direction of a long side of the unit cells forming the first layer, and the electrically conductive adhesive described above was applied to a surface of the cathode conductive porous layer in the first layer that is to serve as a contact portion. Regarding the third layer and so on, further stacking was similarly performed such that a direction of a long side of the unit cells is perpendicular to that of a layer located directly below, and the electrically conductive adhesive was similarly applied to each contact portion. Five layers in total, that is, 25 unit cells, were formed.

The current collector was arranged on the lowermost surface of the unit cells forming the first layer and the uppermost surface of the unit cells forming the fifth layer such that one end of the current collector and one ends of the unit cells coincide with one another. Here, the electrically conductive adhesive was applied to a contact surface. A Teflon spacer having a size of 25 mm×50 mm and a thickness of 4.5 mm was employed. The unit cell group and the current collector were disposed on a stainless plate having a size of 100 mm×100 mm and a thickness of 3 mm, and one spacer was arranged on the stainless plate at a distance of 1 cm from each side of an outer perimeter of the stainless plate in parallel thereto. The unit cell group and the current collector were sandwiched between stainless plates each having a size of 100 mm×100 mm and a thickness of 3 mm. Thermocompression bonding was performed for ten minutes at 130° C. and at 0.1 kgf/cm² in a direction of thickness of the stainless plate, to integrate the fuel cell layer and the current collector and to fabricate the fuel cell stack. An interface of each layer was joined through an anchoring effect, adhesive force of Nafion, a thermosetting resin, or the like, and the layers were in contact with each other with low contact resistance.

Four corners in a direction along a plane of the integrated fuel cell stack above were empty spaces, and a cylinder made of resin was suitably provided in that space as shown in FIG. 29. The cylinder is connected to the methanol cartridge and it holds sufficient methanol. Five PTFE tubes in total extending from the integrated unit cells and PTFE joints provided in the cylinder (made of abitakku, for an outer diameter of 2 mmφ× an inner diameter of 1 mmφ) were connected to one another so that methanol is supplied to each unit cell. A sufficient supply pressure was applied from the methanol cartridge to the cylinder, so that a liquid was supplied into the silicon tubes serving as the fuel flow channels.

Example 2

Nafion 117 membrane (manufactured by Du. Pont) in a shape of a trapezoid having an upper base of 6 mm, a lower base of 12 mm and a height of 48 mm and a thickness of approximately 175 µm was employed as the electrolyte membrane. A catalyst paste was fabricated as in Example 1.

A silicon tube having an outer diameter of 0.3 mmφ (an inner diameter of 0.2 mm) and a length of 48.5 mm (KN3344391 manufactured by Tech-Jam) was employed as the fuel flow channel forming member.

Carbon paper GDL31BC (manufactured by SGL Carbon Japan Co., Ltd.) having one surface subjected to water-repellent treatment with a layer composed of a fluorine-based resin and carbon particles was made to have an upper base of 6 mm, a lower base of 12 mm and a height of 48 mm, which was employed as the anode conductive porous layer. The silicon tubes above were rested on the water-repellent surface of the conductive porous layer and disposed such that the tip end of the silicon tube and the lower base of the trapezoidal conductive porous layer coincide with each other. Here, three silicon tubes per one conductive porous layer were disposed as aligned such that centerlines in a direction of length of the silicon tube are located at positions at distances of 1 mm, 3 mm and 5 mm with respect to the upper base of the conductive porous layer and at distances of 2 mm, 6 mm and 10 mm with respect to the lower base thereof, respectively.

In order to fix the aforementioned silicon tubes onto the conductive porous layer, an end portion of the silicon tube was tentatively secured to the conductive porous layer with a cellophane tape. While the silicon tube was located on the conductive porous layer, the silicon tube and the conductive porous layer were installed on a screen printing plate such that the conductive porous layer and a trapezoidal opening having an upper base of 6 mm, a lower base of 12 mm and a height of 48 mm in the screen printing plate were in parallel to a direction along plane, and the anode catalyst paste described above was applied. The procedure for forming the anode catalyst layer is the same as in Example 1. Through the processes above, the silicon tubes tentatively secured to the conductive porous layer were fixed in such a state as embedded in the catalyst layer as shown in FIG. 25.

A process for filling the tip end of the silicon tube with the porous body is in conformity to that in Example 1. The conductive porous layer, a set of three methanol supply paths, and the anode catalyst layer formed in accordance with the procedure above were stacked as the anode unit, and six anode units were fabricated with the same procedure.

Figure 38:
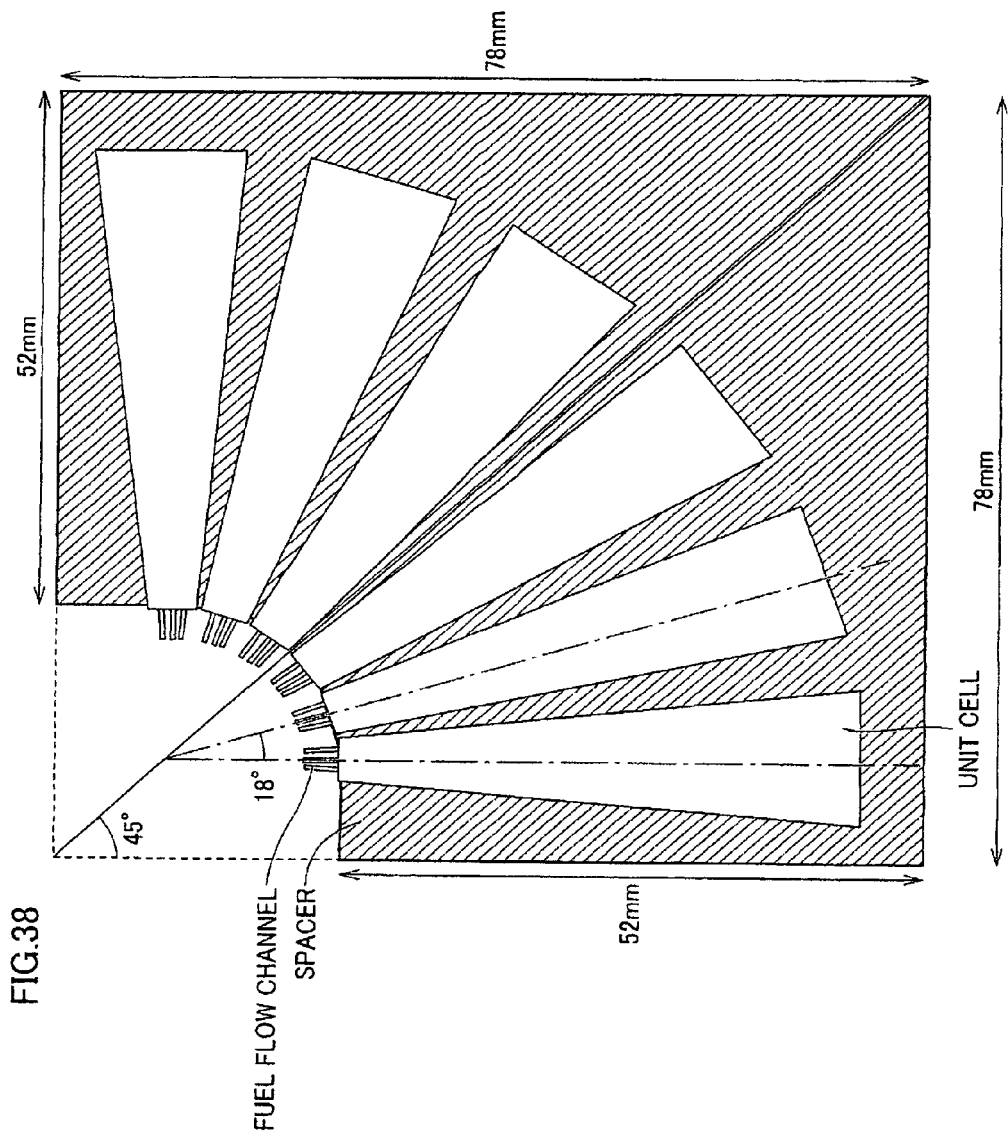
FIG. 38 is a schematic diagram showing a configuration of a fuel cell layer in a fuel cell stack in Example 2.

A Teflon spacer having a size of 78 mm×78 mm and a thickness of 1.0 mm was worked into a shape as shown in FIG. 38. Specifically, six hollowed portions in total were provided in a fan shape such that the electrolyte membrane and the cathode unit are fitted therein and centerlines in a direction of height of the trapezoidal members are located at intervals of 1.8 degrees, and the hollowed portions were symmetrical around a diagonal line of the Teflon spacer. In addition, as an upper base portion of the trapezoidal hollowed portion is also hollowed, the silicon tube serving as the fuel flow channel can be fitted without being in contact with the Teflon spacer even when the anode unit is fitted in the trapezoidal hollowed portion described previously. Four such Teflon spacers were prepared.

A trapezoidal titanium plate having a thickness of 0.1 mm, an upper base of 5.5 mm, a lower base of 12 mm, and a height of 52 mm was used as the current collector. By drilling, a pattern of openings at a pitch of 0.550 mm each having a diameter of 0.45 mm was formed in a trapezoidal region having an upper base of 6 mm, a lower base of 12 mm, and a height of 48 mm. It is noted that the lower base of the current collector coincides with the lower base of a region where the opening pattern is formed.

Further stacking was performed in the order of the anode unit (the conductive porous layer being located below), the electrolyte membrane and the cathode unit (the cathode catalyst layer being located below) from below, such that the anode catalyst layer and the cathode catalyst layer overlapped with each other with the electrolyte membrane being interposed. This stack structure was fitted in the Teflon spacer above and the upper bases of the trapezoidal stack structures were aligned. As shown in FIG. 38, six stack structures were aligned, they were sandwiched between the stainless plates in accordance with the procedure as in Example 1, and thermocompression bonding was performed for two minutes at 130° C. and at 10 kgf/cm$^2$ in a direction of thickness thereof, to integrate the stack structure. A group of six unit cells fabricated in accordance with this procedure serves as the first fuel cell layer (hereinafter referred to as the first layer). This first layer and the spacer were not separated from each other and they were held in the fitted state.

The fuel cell layers to serve as a second layer to a fourth layer were fabricated in accordance with the procedure the same as that for the first layer, and the layers were not separated from the Teflon spacer but held together, as in the case of the first layer.

Figure 39:
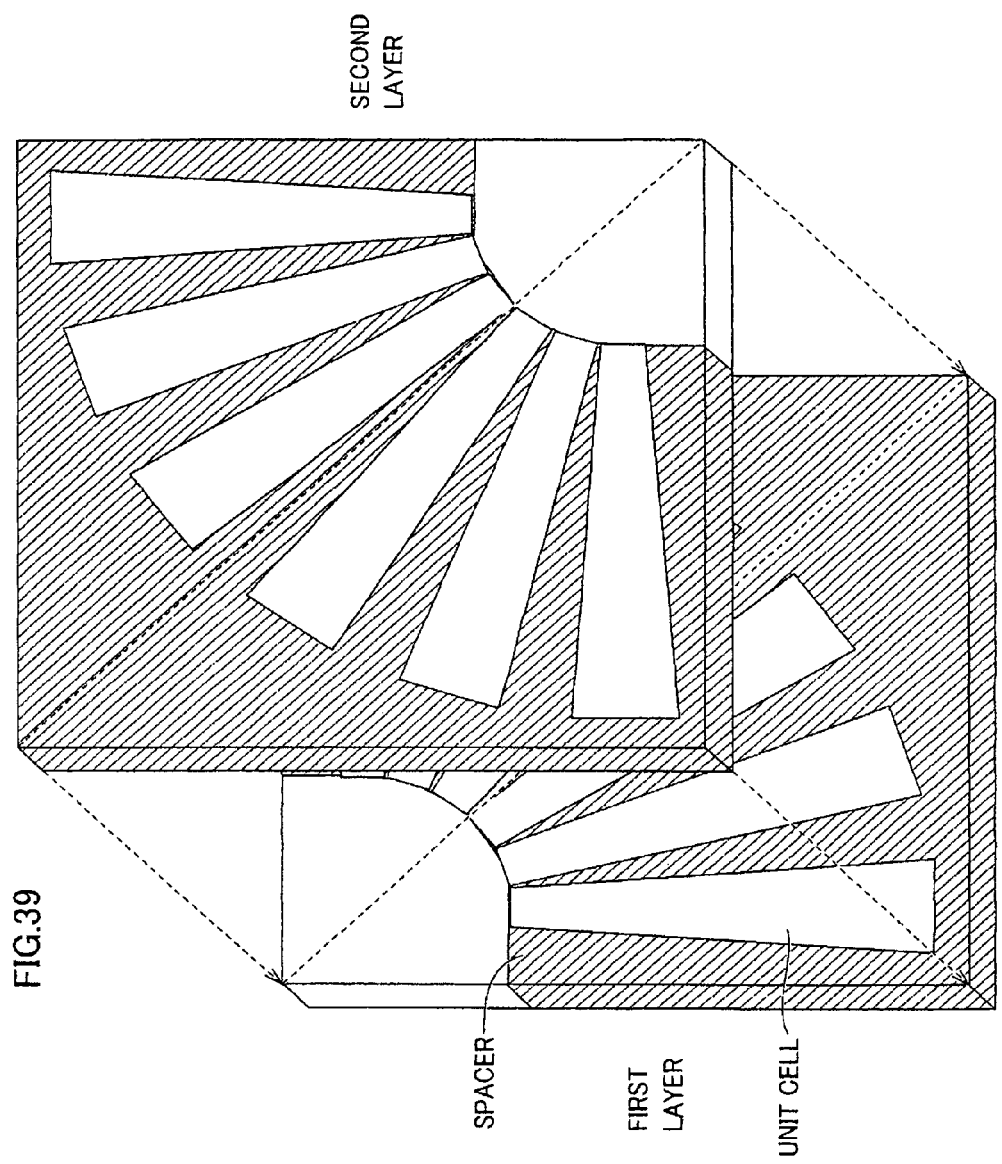
FIG. 39 is a diagram showing a first layer and a second layer in the fuel cell stack in Example 2.

As shown in FIG. 39, the first layer and the second layer were arranged such that they are opposite on a diagonal line of the spacer and the sides of the Teflon spacers coincide with one another, and the electrically conductive adhesive was applied to a contact portion (a surface of the cathode conductive porous layer in the first layer). The integrated structure obtained by layering the first layer and the second layer was sandwiched between stainless plates each having a thickness of 3 mm, and thermocompression bonding was performed for ten minutes at 130° C. and at 10 kgf/cm$^2$ in a direction of thickness of the stainless plate for integration. After integration, sufficient cooling was performed and thereafter the Teflon spacer in the second layer was removed in a direction of thickness of the fuel cell. The third layer and the fourth layer were also integrated in accordance with the procedure described above, and the Teflon spacer in the third layer was removed. Here, the spacers in the first layer and the fourth layer are not removed.

The integrated structures were layered such that orientations of respective Teflon spacers in the first layer with the second layer lying above and in the fourth layer with the third layer lying below are opposite on a diagonal line, and the second layer and the third layer were sandwiched. In addition, the electrically conductive adhesive was applied to a contact portion (a surface of the cathode conductive porous layer in the second layer). The first layer, the second layer, the third layer, and the fourth layer were layered in this order from below, and the first layer and the third layer were in parallel to each other and the second layer and the fourth layer were in parallel to each other, in the direction along the plane. The Teflon spacer having a size of 100 mm×100 mm and a thickness of 4 mm has a through hole of 78 mm×78 mm, and the fuel cell layer and the current collector above were disposed in this through hole, that was sandwiched between stainless plates each having a size of 100 mm×100 mm and a thickness of 3 mm. Thermocompression bonding was performed for ten minutes at 130° C. and at 10 kgf/cm$^2$ in a direction of thickness of the stainless plate, to integrate the fuel cell layer. The contact surfaces of the second layer and the third layer were in electrical contact with each other, with low contact resistance. Here, the Teflon spacers in the first layer and the fourth layer were removed in the direction of thickness of the fuel cell layer.

The current collector was arranged such that the upper base of the trapezoidal unit cell and the upper base of the current collector lie over the lowermost surface of the unit cells forming the first layer and the uppermost surface of the unit cells forming the fourth layer. Here, the electrically conductive adhesive was applied to the contact portion. The Teflon spacer having a size of 100 mm×100 mm and a thickness of 4 mm has a through hole of 78 mm×78 mm, and the current collector described above was disposed in this through hole, which was sandwiched between stainless plates each having a size of 100 mm×100 mm and a thickness of 3 mm. Thermocompression bonding was performed for ten minutes at 130° C. and at 10 kgf/cm$^2$ in a direction of thickness of the stainless plate, to integrate the unit cell group and the current collector above and to fabricate the fuel cell stack. The unit cell group and the current collector were in electrical contact with each other, with low contact resistance.

Two corners in a direction along the plane of the fuel cell stack described above were empty spaces, and cylinders made of resin could suitably be provided in those spaces as shown in FIG. 31. The cylinder was connected to the methanol cartridge and it holds sufficient methanol. The silicon tubes were connected to a connection port provided in the cylinder such that 36 silicon tubes in total (for example, 18 silicon tubes from the first layer and 18 silicon tubes from the third layer) extend from the fuel cell stack for one cylinder, so that methanol is supplied to each unit cell. Similarly, 36 silicon tubes in total (for example, 18 silicon tubes from the second layer and 18 silicon tubes from the fourth layer) were also connected to another cylinder.

Example 3

A fuel cell stack was fabricated with the following method.

(1) Fabrication of MEA (Membrane Electrode Assembly)

Initially, a catalyst paste was prepared in accordance with the following procedure. An anode catalyst paste was prepared by placing catalyst carrying carbon particles consisting of Pt—Ru particles of which Pt carrying amount was 32.5 wt % and Ru carrying amount was 16.9 wt % and carbon particles (TEC66E50 manufactured by Tanaka Kikinzoku Group), 20 wt % Nafion alcohol solution (manufactured by Sigma-Aldrich Co.), ion exchanged water, isopropanol, and zirconia beads at a prescribed ratio in a container made of PTFE, mixing these with the use of a stirrer and deaerator at 50 rpm for 50 minutes, and removing zirconia beads. In addition, a cathode catalyst paste was prepared as in the case of the anode catalyst paste, by using catalyst carrying carbon particles consisting of Pt particles of which Pt carrying amount was 46.8 wt % and carbon particles (TEC10E50E manufactured by Tanaka Kikinzoku Group).

Then, carbon paper GDL25BC (manufactured by SGL Carbon Japan Co., Ltd.) having one surface subjected to water-repellent treatment with a layer composed of a fluorine-based resin and carbon particles was made to have a size of 1.8 mm×23 mm, which was employed as the anode conductive porous layer. The anode catalyst paste described above was applied to a water-repellent surface of the anode conductive porous layer by using screen printing, that was held in a thermostatic chamber at 60° C. each time the anode catalyst paste was applied, so as to dry away the solvent contained in the anode catalyst paste. By repeating this process several times, the anode catalyst layer having a thickness of approximately 0.4 mm was formed on the anode conductive porous layer. A stack structure of this anode conductive porous layer and the anode catalyst layer is referred to as an "anode unit". Similarly, GDL25BC of 1.8 mm×23 mm was employed as a cathode conductive porous layer, and the cathode catalyst layer was formed on this water-repellent surface to a thickness of 0.1 mm. A stack structure of this cathode conductive porous layer and the cathode catalyst layer is hereinafter referred to as a "cathode unit".

Thereafter, a Nation 117 membrane (manufactured by Du Pont) having a size of 100 mm×100 mm and a thickness of approximately 175 μm was employed as the electrolyte membrane, and the anode unit, the electrolyte membrane and the cathode unit were successively stacked in this order from below such that the anode catalyst layer and the cathode catalyst layer overlapped with each other with the electrolyte membrane being interposed and the anode catalyst layer and the cathode catalyst layer come in contact with the electrolyte membrane. Here, the cathode unit and the anode unit were arranged such that they were arranged in three rows and ten columns at regular intervals in the electrolyte membrane of 100 mm×100 mm. Thereafter, a titanium plate having a thickness of 0.45 mm and a size of 100 mm in a longitudinal direction and 100 mm in a lateral direction was arranged on each of four sides of the stack structure, at a distance by 1 cm from the stack structure. This titanium plate is provided in order for the stack structure to have a thickness greater than 0.45 mm when it is pressed. Then, this stack structure and the titanium plate were placed on a stainless plate having a thickness of 1 mm and a stainless plate having a thickness of 1 mm was further placed thereon, so that these stainless plates sandwich the stack structure and the titanium plate and thermocompression bonding was performed for two minutes at 130° C. and at 10 kgf/cm² in a direction of thickness thereof, to integrate the stack structure. By cutting out the stack structure to a size of the conductive porous layer (1.8 mm×23 mm), an MEA in a shape of an elongated strip having a width of 1.8 mm and a length of 23 mm was obtained.

(2) Fabrication of Flow Channel Substrate and Anode Current Collector and Cathode Current Collector As shown in FIG. 48, a flow channel in a serpentine shape was formed by etching an SUS substrate having a width of 11 mm, a length in a longest portion of 36 mm, and a thickness of 0.2 mm. FIG. 48(a) is a top view of the obtained flow channel substrate, and FIG. 48(b) is a cross-sectional view along the line A-A' shown in FIG. 48(a). The unit of a numeric value shown in FIG. 48 is mm. As shown in FIG. 48(b), the flow channel has a width of 1 mm and a depth of 0.1 mm. As shown in FIG. 48(a), the flow channel substrate has two projections (a width of 2 mm×a length of 3 mm) at its lower end. The projection serves as a manifold insertion port. In addition, this flow channel substrate has three through holes like a slit each having a width of 1 mm×a length of 25 mm (see FIG. 48(a)). These through holes and three through holes like a slit formed in the anode current collector which will be described later serve as an air path in the fuel cell layer and the fuel cell stack obtained thereby. In the flow channel substrate shown in FIG. 48, a wall formed between the through hole like a slit and the flow channel adjacent thereto has a width of 0.5 mm.

Figure 50:
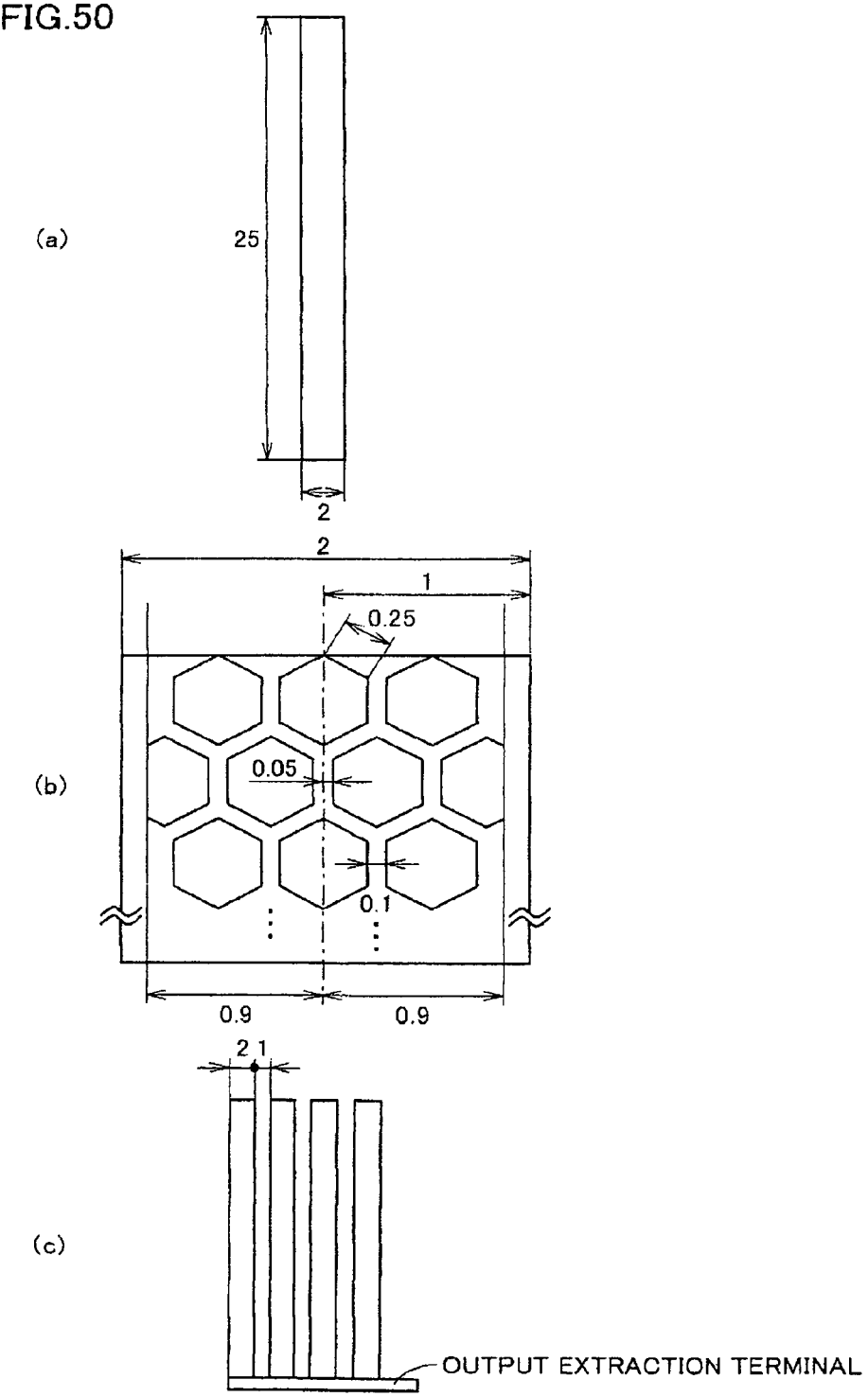
FIG. 50 is a top view and an enlarged view showing a shape of a cathode current collector fabricated in Example 3.

In addition, the anode current collector in a shape as shown in FIG. 49 and the cathode current collector in a shape as shown in FIG. 50 were fabricated with etching. The anode current collector in FIG. 49 is made of a substrate in a shape of a flat plate made of stainless (SUS316L) having a width of 11 mm, a length of 36 mm and a thickness of 0.1 mm. As shown in FIG. 49(a), three through holes like a slit are formed in this anode current collector. FIG. 49(b) is an enlarged view of a region A in the anode current collector shown in FIG. 49(a). As shown in FIG. 49(b), in region A of the anode current collector, a plurality of openings each in a hexagonal shape of which side is 0.25 mm long are provided in a region having a width of 0.5 mm from the centerline in the longitudinal direction of region A toward opposing ends, with a line width of 0.1 mm being left. The anode current collector provided in the lowermost fuel cell layer in the fuel cell stack is provided with an output extraction terminal. It is noted that the unit of a numeric value shown in FIG. 49 is mm.

Meanwhile, the cathode current collector shown in FIG. 50 is made of a substrate in a shape of a flat plate made of stainless (SUS316L) having a width of 2 mm, a length of 25 mm and a thickness of 0.1 mm. In the present manufacturing example, four such substrates were used. FIG. 50(b) is an enlarged view of the cathode current collector shown in FIG. 50(a). As shown in FIG. 50(b), a plurality of hexagonal through holes are provided in the cathode current collector (a percentage open area of 70%). The through holes have the side of 0.25 mm long and they are provided in the cathode current collector, with a line width of 0.1 mm being left. Four cathode current collectors provided in the uppermost fuel cell layer in the fuel cell stack are provided with an output extraction terminal, as shown in FIG. 50(c). A composite cathode current collector shown in FIG. 50(c) is formed by integrating four cathode current collectors by means of the output extraction terminal.

Here, the flow channel substrate and the anode current collector above were worked such that four MEAs in a shape of an elongated strip can be arranged with prescribed gap regions being formed in parallel in a single substrate. As will be described later, though the anode current collector and the MEAs each in a shape of an elongated strip are arranged on this flow channel substrate, here, each MEA is prevented from two-dimensionally coming apart. In addition, by providing a prescribed gap in a single flow channel substrate or anode current collector and forming unit cells thereon, a fuel cell stack including a fuel cell layer in which a plurality of unit cells are two-dimensionally arranged with a prescribed gap and having excellent mechanical strength can be fabricated. Though the MEA formed on the flow channel substrate should naturally be prevented from peeling off from the flow channel substrate, a method therefor will be described later.

Figure 51:
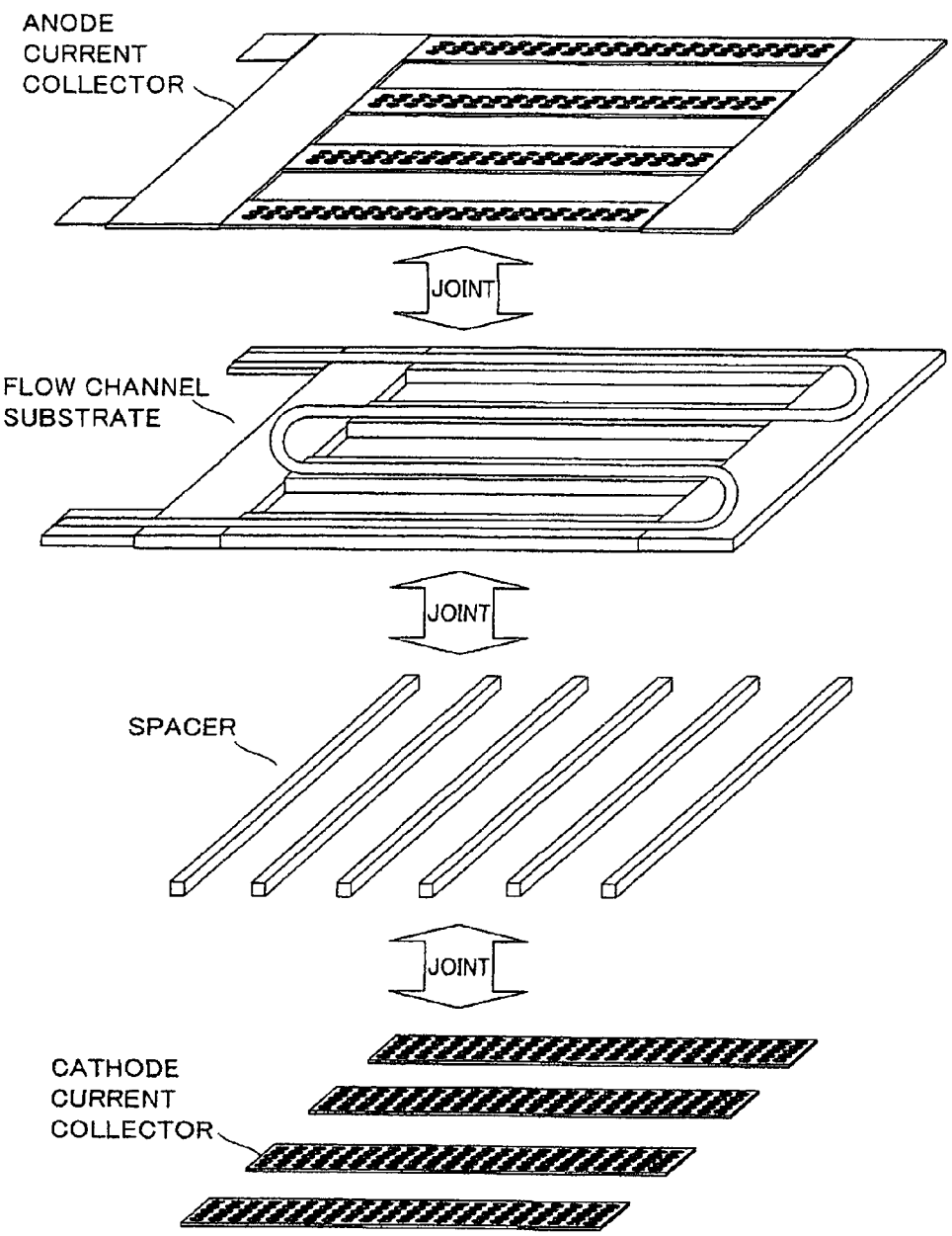
FIG. 51 is a perspective view schematically showing diffusion bonding of the flow channel substrate, the anode current collector, the cathode current collector, and a spacer in Example 3.

(3) Diffusion Bonding of Flow Channel Substrate, Anode Current Collector, Cathode Current Collector, and Spacer Then, the flow channel substrate, the anode current collector and the cathode current collector described above and six spacers (each in a parallelepiped shape having a width of 0.5 mm, a length of 20 mm and a thickness of 0.5 mm) made of stainless (SUS316L) which is a non-porous body were prepared, that were joined together in the order of the cathode current collector, the spacer, the flow channel substrate, and the anode current collector from below as shown in FIG. 51, to thereby obtain a joint structure (a total thickness of 0.8 mm). Joint was achieved by hot-pressing diffusion bonding. It is noted that six spacers were arranged at intervals of 2 mm. In addition, in diffusion bonding, the surface of the anode current collector made of SUS316L on the flow channel substrate side was plated with gold to a thickness of 1 μm. Plating with gold can prevent stainless from corrosion and can also improve joint property in diffusion bonding. In the obtained joint structure, the anode current collector was stacked on the flow channel substrate, and a plurality of through holes in region A of the anode current collector communicate with the flow channel in the flow channel substrate. The MEA in a shape of an elongated strip was arranged on this region A. Diffusion bonding is preferably used for joint of the flow channel substrate, the anode current collector, the cathode current collector, the spacer, and the like as above, however, a joint method such as laser welding may be employed.

(4) Joint of MEA

Figure 52:
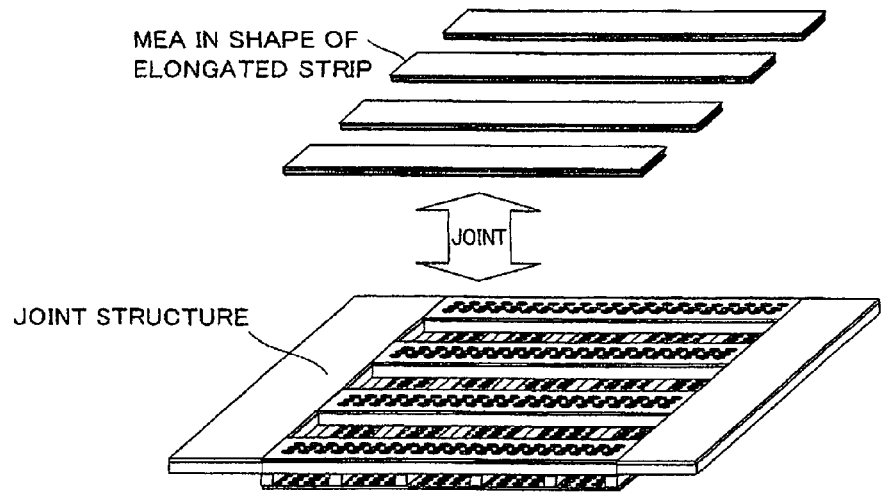
FIG. 52 is a perspective view schematically showing joint of an MEA to the anode current collector in Example 3.

Then, as shown in FIG. 52, four MEAs each in a shape of an elongated strip (0.3 mm thick) obtained as above were joined to region A of the anode current collector of the joint structure above. Joint was carried out as follows. Initially, an NMP (2-methylpyrrolidone) solution of PVDF (5 wt %) and XC72 (Vulcan) which is carbon particles were mixed and kneaded such that the carbon particles accounted for 7 wt % with respect to PVDF, to thereby prepare an electrically conductive ink. Thereafter, this electrically conductive ink was applied to the surface of the anode conductive porous layer (GDL25BC) of the MEA to a thickness of 10 μm by using a bar-coater, followed by drying. Then, the MEA was arranged on region A of the anode current collector. Thereafter, a titanium plate having a thickness of 0.7 mm and a size of 10 mm in a longitudinal direction and 100 mm in a lateral direction was arranged on each of four sides of the stack structure, at a distance by 1 cm therefrom. This titanium plate was provided in order for the stack structure to have a thickness greater than 0.7 mm when it is pressed. Thereafter, this stack structure and the titanium plate were placed on a stainless plate having a thickness of 1 mm and a stainless plate having a thickness of 1 mm was further placed thereon, so that these stainless plates sandwich the stack structure and the titanium plate, and thermocompression bonding was performed for two minutes at 130° C. and at 5 kgf/cm$^2$ in a direction of thickness thereof, to flatten the MEA and to fix the MEA to the anode current collector. By thus applying the electrically conductive ink consisting of PVDF and carbon particles to the MEA, PVDF is softened during thermocompression bonding and introduced in the through holes in the anode current collector, so that the MEA can be fixed through an anchoring effect. In addition, as a result of improvement in adhesiveness owing to the anchoring effect, electrical contact resistance between the anode current collector and the MEA can be lowered. Though GDL25BC (manufactured by SGL Carbon Japan Co., Ltd.) forming the conductive porous layer of the MEA does not have one surface subjected to water-repellent treatment with a layer composed of a fluorine-based resin and carbon particles, a conductive porous layer having opposing surfaces subjected to water-repellent treatment may be employed. A stack structure thus obtained, in which a plurality of MEAs (four in the present example) were joined to the anode current collector, is hereinafter referred to as a two-dimensional stack, because a plurality of MEAS were arranged on a plane.

(5) Application of Adhesive to MEA End Portion

Figure 53:
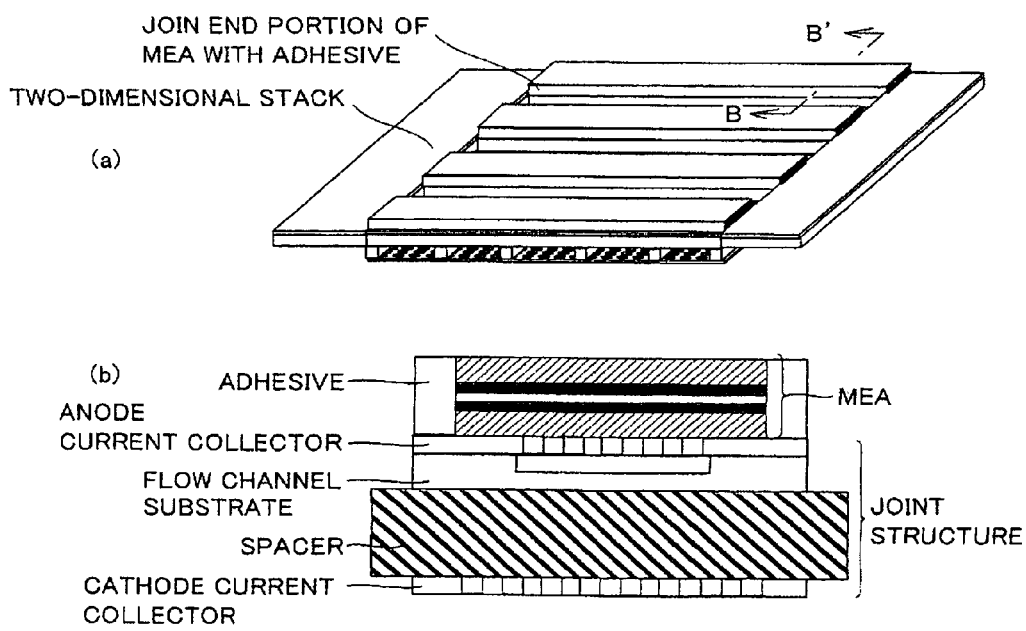
FIG. 53 is a perspective view and a cross-sectional view of a two-dimensional stack, in which an adhesive is applied to an MEA end portion obtained in Example 3.

Then, as shown in FIG. 53, the adhesive was applied to the end portions of the MEA. FIG. 53 shows a two-dimensional stack to which the adhesive was applied to the end portions of the MEA, and FIG. 53($b$) is a cross-sectional view along the line B-B' in FIG. 53($a$). A one-component thermosetting epoxy resin that is cured at 100° C. in 30 minutes, in which epoxy resin and phenol-based resin were mixed, was employed as the adhesive. By thus applying the adhesive to the end portions of the MEA and sealing the end portions, leakage of the fuel can be sealed and adhesiveness to the anode current collector can be improved.

Here, though the adhesive is not limited to those mentioned above, the epoxy resin is preferably used as the adhesive from a point of view of resistance to acid, resistance to methanol (chemical resistance), or the like. In addition, an adhesive exhibiting a thermosetting characteristic at a relatively low temperature not higher than approximately 100° C. is preferred from a point of view of prevention of deterioration due to solubility and decomposition of the MEA and aggregation of a catalyst. Moreover, a reaction start temperature of an adhesive to be used is preferably 60° C. or higher so that the adhesive is not cured during storage at room temperature.

(6) Joint Between Two-Dimensional Stacks (Construction of Fuel Cell Stack)

Figure 55:
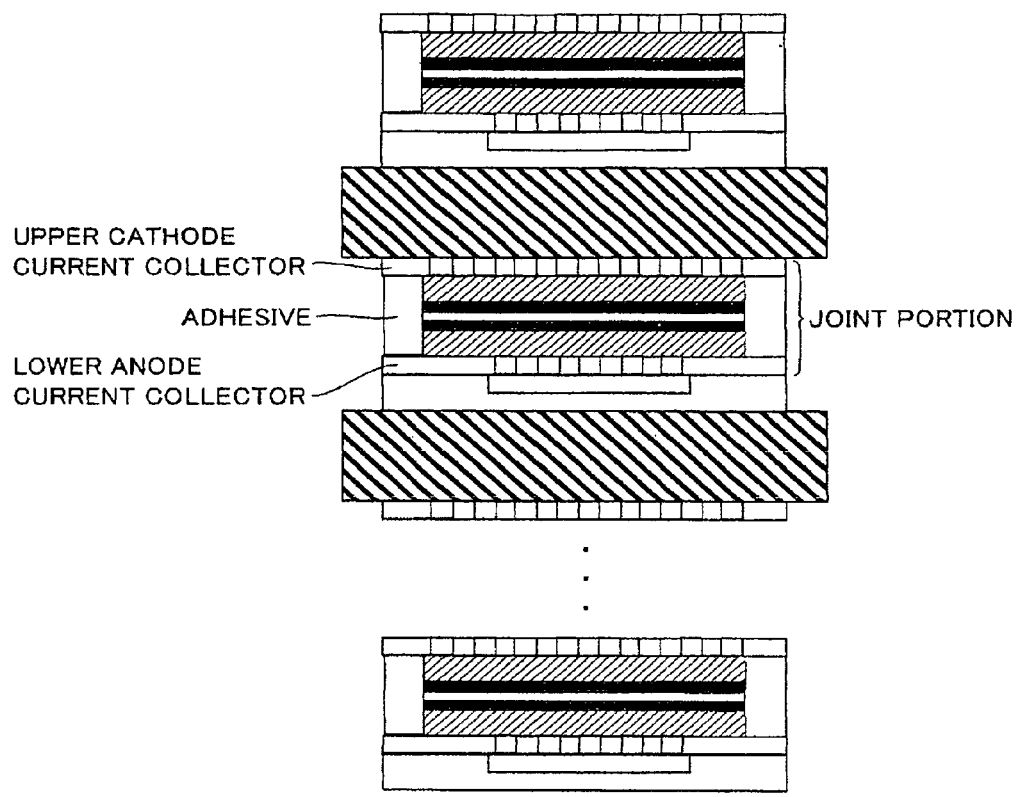
FIG. 55 is a cross-sectional view showing a structure of a fuel cell stack in which a plurality of two-dimensional stacks are integrated.

Then, as shown in FIG. 54, the two-dimensional stacks in which the adhesive was applied to a plurality of (four in the present example) MEA end portions were subjected to thermocompression bonding for 30 minutes at such conditions as 100° C. and 0.1 kgf/cm$^2$ through hot pressing for joint to each other, to thereby obtain the fuel cell stack. Joint was achieved by stacking a necessary number of two-dimensional stacks and thereafter subjecting the stack structures to hot pressing. As a result of thermocompression bonding, the adhesive applied to the end portions of MEA was cured, and hence firm joint between the two-dimensional stacks can be achieved. FIG. 55 is a cross-sectional view showing a structure of the fuel cell stack in which a plurality of two-dimensional stacks were integrated. According to such a joint method, a single hot pressing process can fabricate the fuel cell stack in which a necessary number of two-dimensional stacks were joined, a time for manufacturing can be shortened, and manufacturing cost can be reduced. In addition, the fuel cell stack fabricated with the method as above achieves improved reliability of strength, because the anode current collector, the cathode current collector and the MEAS were firmly fixed by the adhesive. The fuel cell stack having many MEA end portions as in the present invention includes many bonded portions as a result of bonding above. As compared with the fuel cell stack obtained by stacking a single large fuel cell, strength of the fuel cell stack can significantly be enhanced particularly in its central portion. In the fuel cell stack obtained by stacking a single large fuel cell, only an outer peripheral portion of that fuel cell layer can be bonded or fastened with a bolt, a nut or the like, and a central portion thereof is not pressed. Therefore, peel-off of the MEA or poor electrical contact between the MEA and the current collector is likely.

(7) Installation of Manifold

Figure 56:
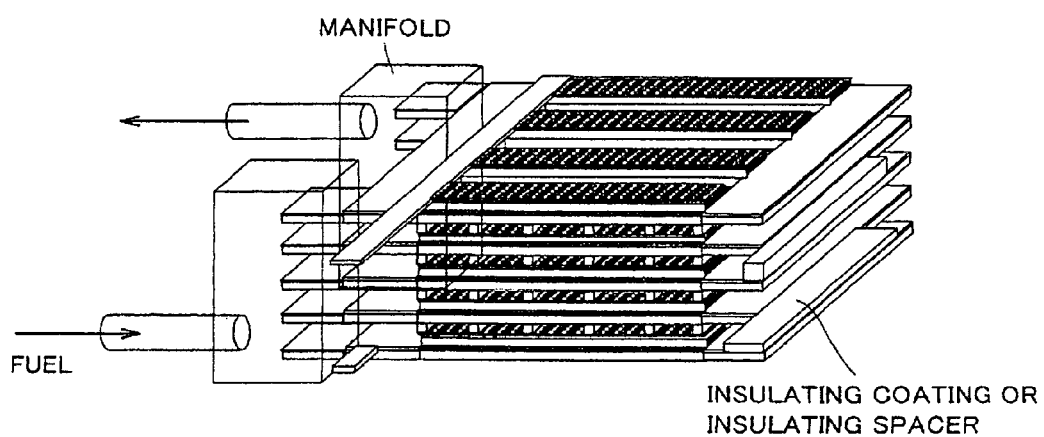
FIG. 56 is a schematic perspective view showing the fuel cell stack including a manifold obtained in Example 3.

Then, as shown in FIG. 56, a manifold for supplying the fuel to each layer in the fuel cell stack obtained as above was inserted. After insertion of the manifold, a gap between an inlet and an outlet of the flow channel substrate and the manifold was sealed with a sealant. A manifold made of an acrylic resin was employed as the manifold. In addition, a two-component type epoxy resin that is cured at room temperature was used as a sealant for sealing. In the fuel cell stack in the present example, as the fuel flow channel is in a serpentine shape, manifold connection portions can concentrate at one location and the manifold can be reduced in size. Ease in insertion and sealing of the manifold is thus improved and reduction in cost can be achieved by improved yield and reduction in production time. In addition, as the manifold is reduced in size, a volume of the manifold, which disturbs air intake into the fuel cell stack, can be decreased, and hence air can satisfactorily be taken into the fuel cell stack.

(8) Insulating Coating of Flow Channel Substrate

In the fuel cell stack obtained as above and including the manifold as shown in FIG. 56, a distance between the flow channel substrate and the anode current collector in the adjacent fuel cell layer is short. Accordingly, depending on external stress, electrical short-circuit may occur and output from the fuel cell stack may become poor. Therefore, in order to avoid such a disadvantage, as shown in FIG. 56, a surface of the flow channel substrate where the flow channel is not formed, a surface of a portion of the anode current collector where the MEA is not arranged, or surfaces of both of them is (are) preferably coated with an insulating coating or provided with an insulating spacer. It is more preferable to provide an insulating spacer, in terms of improvement in strength of the fuel cell stack. In addition, it is further preferable to arrange the insulating spacer at an outer peripheral end portion of the fuel cell stack, in terms of improvement in strength.

Example 4

Figure 57:
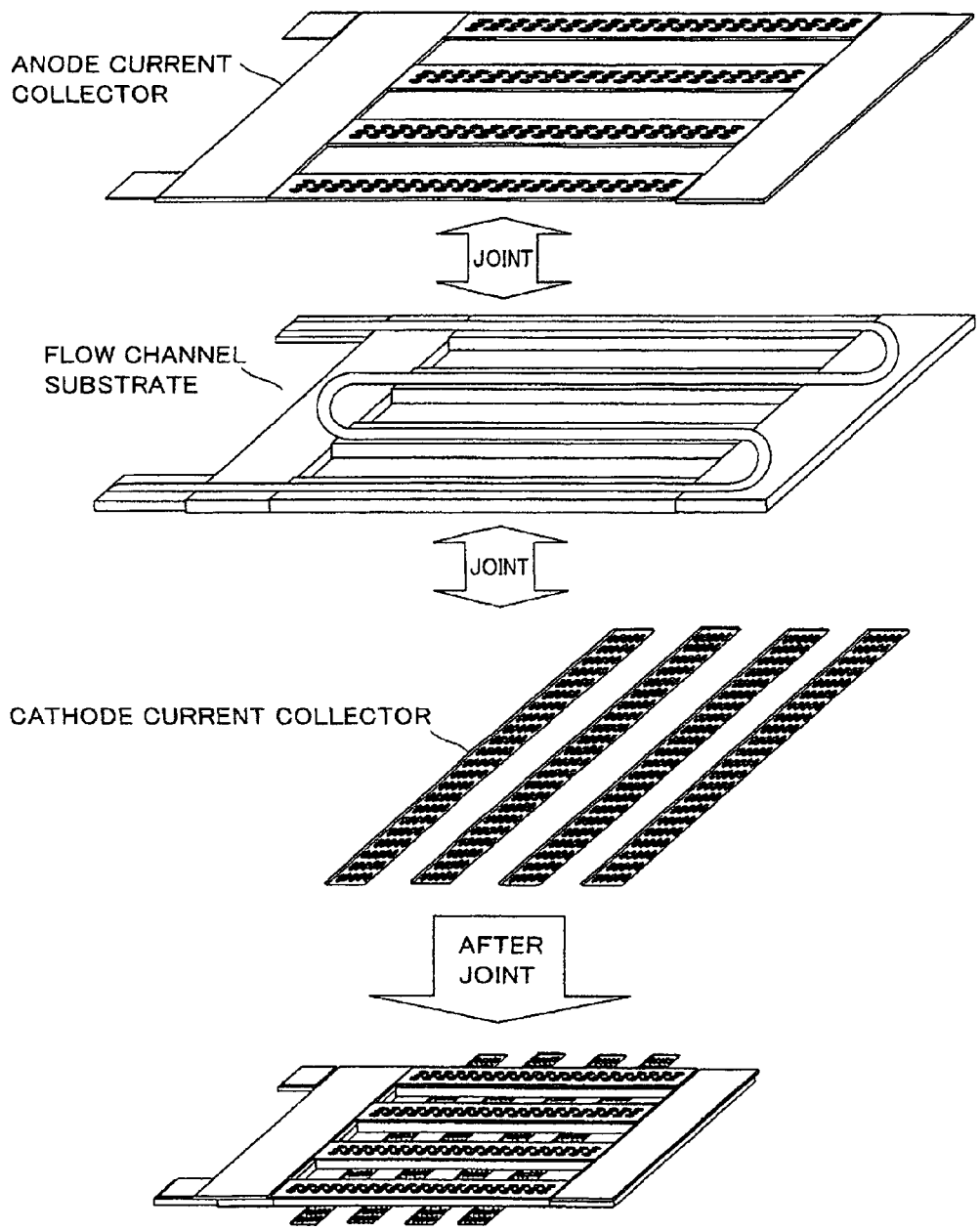
FIG. 57 is a perspective view schematically showing diffusion bonding of a flow channel substrate, an anode current collector and a cathode current collector in Example 4.

The cathode current collector, the flow channel substrate, and the anode current collector used in Example 3 were used, and these were joined together in the order of stack of the cathode current collector, the flow channel substrate and the anode current collector from below as shown in FIG. 57, to obtain a joint structure without including a spacer. Joint was achieved as in Example 3, and hot-pressing diffusion bonding was performed. Here, in the present example, joint was made by arranging four cathode current collectors to be orthogonal to the flow channel substrate. Thereafter, as in Example 3, a two-dimensional stack in which the adhesive was applied to the end portions of the MEA was obtained. FIG. 58 shows a cross-sectional structure of the obtained two-dimensional stack. From then on, the fuel cell stack including a manifold was fabricated as in Example 3 except for stacking and joining adjacent two-dimensional stacks such that they intersect with each other at an angle of 90°.

Example 5

Figure 60:
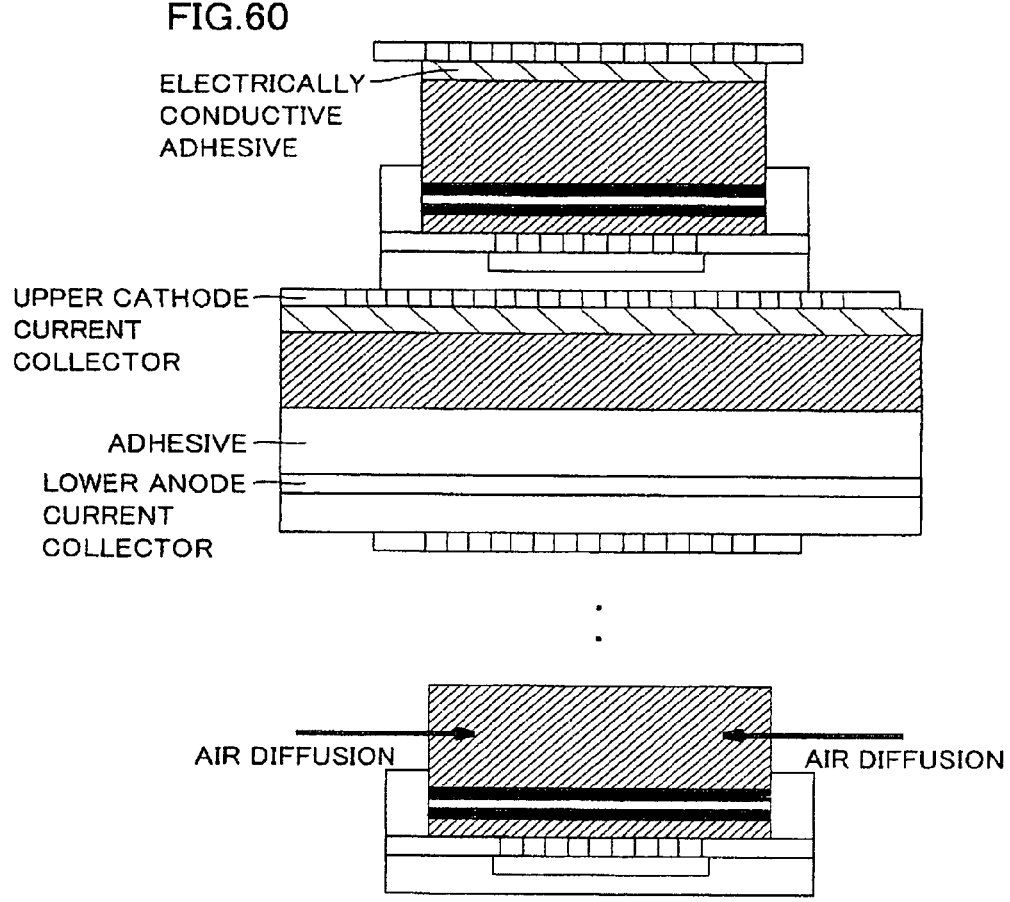
FIG. 60 is a cross-sectional view showing the fuel cell stack obtained in Example 5.

In the present example, initially, a two-dimensional stack in which the adhesive was applied was obtained as in Example 4, except that the adhesive was applied to the entire end portions of the anode conductive porous layer, the anode catalyst layer, the electrolyte membrane, and the cathode catalyst layer in the MEA and a part of the end portion of the cathode conductive porous layer (the end portion closer to the cathode catalyst layer). Thereafter, as shown in FIG. 59, the electrically conductive adhesive containing a thermosetting resin as in Example 3 was applied onto the cathode conductive porous layer in one two-dimensional stack, hot pressing under the conditions the same as in Example 3 was carried out to thermally cure the adhesive, and the two-dimensional stacks were joined to each other at the cathode conductive porous layer of the two-dimensional stack and the cathode current collector in the two-dimensional stack adjacent thereto, such that they intersect with each other at an angle of 90° to thereby fabricate the fuel cell stack. As the two-dimensional stacks can thus readily be joined together by hot pressing, a thermosetting adhesive is preferably used. FIG. 60 shows a cross-sectional structure of the obtained fuel cell stack. By thus not coating at least a part of the end portion of the cathode conductive porous layer with the adhesive, air can effectively flow into the cathode conductive porous layer from a direction perpendicular to the direction of stack of the MEA (in-plane direction).

Example 6

Figure 61:
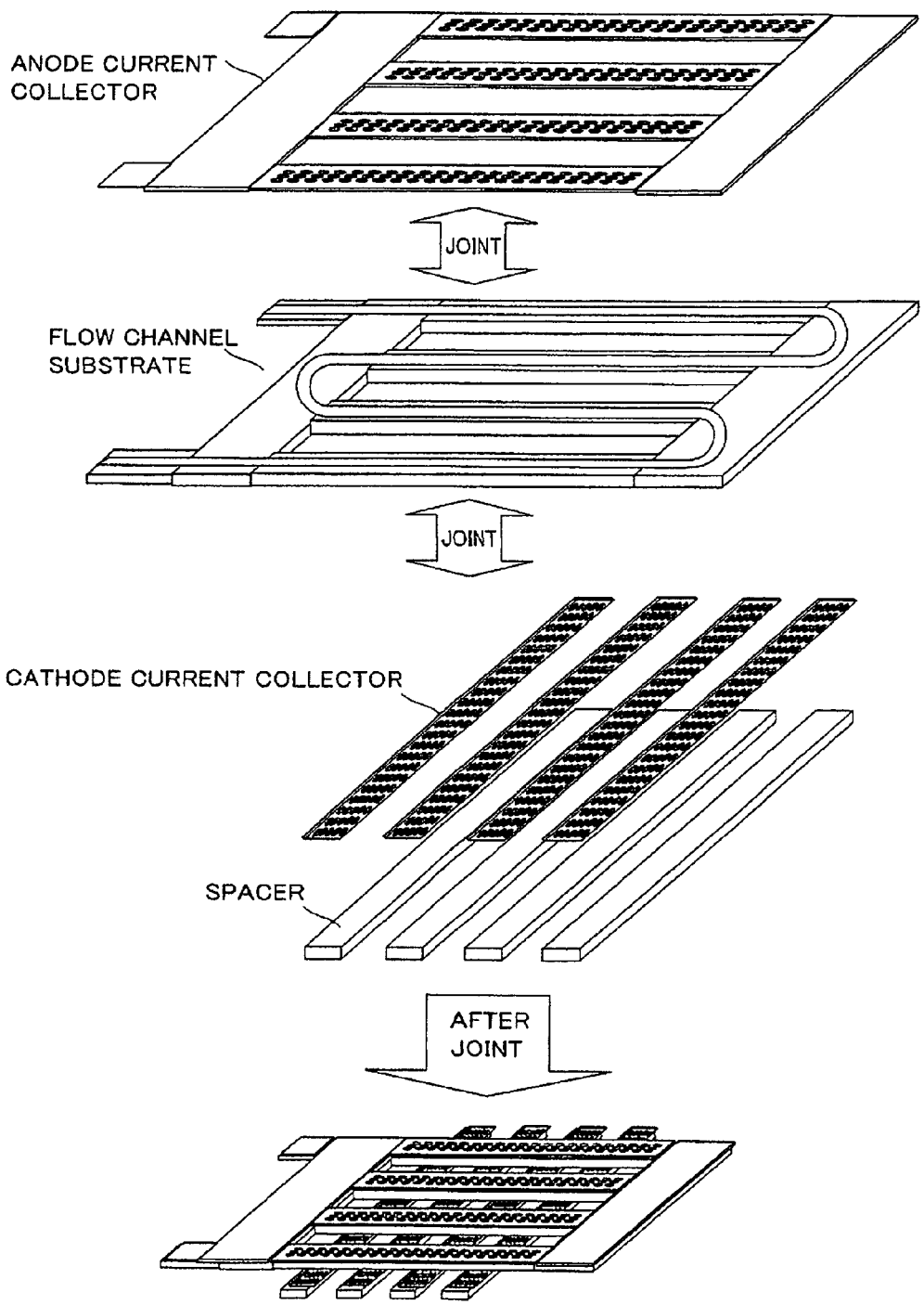
FIG. 61 is a perspective view schematically showing diffusion bonding of a flow channel substrate, an anode current collector, a cathode current collector, and a spacer in Example 6.
Figure 62:
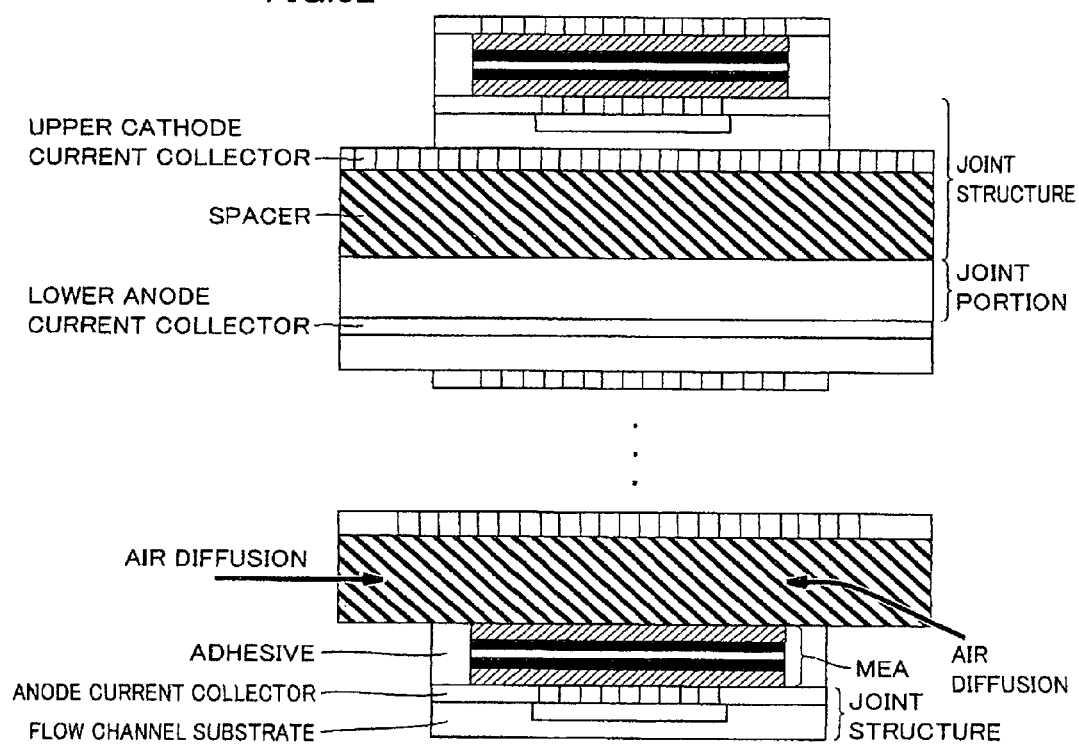
FIG. 62 is a cross-sectional view showing the fuel cell stack obtained in Example 6.

In the present example, initially, the flow channel substrate, the anode current collector and the cathode current collector used in Example 3 and four spacers (each in a parallelepiped shape having a width of 2 mm, a length of 25 mm and a thickness of 0.5 mm) made of stainless (SUS316L) which is a porous body were prepared, that were joined together in the order of stack of the spacers, the cathode current collector, the flow channel substrate, and the anode current collector from below as shown in FIG. 61, to thereby obtain a joint structure. Joint was achieved as in Example 3, and hot-pressing diffusion bonding was performed. Thereafter, after the MEAs were joined as in Example 3, the adhesive was applied to the end portions of the MEAs, to thereby obtain the two-dimensional stack in which the adhesive was applied to the MEA end portions. Thereafter, hot pressing under the conditions the same as in Example 3 was carried out to thermally cure the adhesive, and the two-dimensional stacks were thus joined to each other at the spacers in the two-dimensional stack and the anode current collector in the two-dimensional stack adjacent thereto, such that they intersect with each other at an angle of 90° to thereby fabricate the fuel cell stack. As the two-dimensional stacks can thus readily be joined together by hot pressing, a thermosetting adhesive is preferably used. FIG. 62 shows a cross-sectional structure of the obtained fuel cell stack. The spacers used in the present example have an outer dimension (except for thickness) the same as that of the cathode current collector and the cathode conductive porous layer, and it is stacked on the cathode current collector in a manner substantially coinciding with the same. Such a configuration is preferred in terms of improvement in strength owing to increase in a joint area between the spacer and the conductive porous layer of the MEA, lowering in electrical resistance, and air permeability within the fuel cell stack.

Joint between the constituent members through diffusion bonding as above is preferred, for example, from the following aspects.

(a) As atoms in metal members are joined, an interface resistance value is as low as in a bulk metal and bonding strength is high.

(b) An acid-resistant SUS member highly resistant to an acid solution and an alcohol solution can be used as a constituent member and long-term reliability of joint is also high.

(c) As a process of the current collector is fine, etching is preferred. Here, as a process can totally be performed from the process of the current collector until structuring of the fuel cell stack and the joint process, design and registration for joint at a fine portion (stacking of a plate material having a width of 100 μm can also be carried out) can be performed.

(d) As registration of a fine portion can be achieved, joint strength can be made higher and interface resistance can be lowered even when a width of a margin for bonding between the flow channel substrate and the current collector is small. Thus, a proportion of the margin for bonding can be less and a proportion of a width of the flow channel can be greater. Then, an effectively working power generation area of the MEA to which fuel is supplied becomes greater and power generation characteristics are improved. For example, a width of the margin for bonding can also be reduced from 0.5 mm to approximately 0.3 mm or smaller. In this case, assuming that an MEA having a width of 2 mm is used, a ratio of the flow channel can be increased from 50% to 70% or higher.

(e) As compared with an example where the electrically conductive adhesive is used for joint, leakage of the fuel through a gap between the flow channel substrate and the current collector is less likely (the electrically conductive adhesive is more likely to cause leakage when a gap is created due to peel-off or dissolution).

(f) Without concerns about liquid leakage from between the flow channel substrate and the current collector at the end portion, by providing the fuel permeability control layer between the flow channel and the catalyst layer, seeping of the fuel from a cross-section of the end portion of the fuel cell (a gap in an unsealed portion) does not occur without complete sealing of the end portion of the MEA for leaving no gap (sealing of a cross-section at the end portion of the MEA and a cross-section at the end portion of the anode conductive porous layer), electric power can satisfactorily be generated, and carbon dioxide can be exhausted from the end portion of the MEA.

(g) As a part in which all members for one layer in the fuel cell stack have been joined can be fabricated, the step of stacking the fuel cell stack includes only the step of joining the MEA and the part in which all members for one layer in the fuel cell stack have been joined through hot pressing, whereby manufacturing of the fuel cell stack can be simplified.

Example 7

Eight MEAs each in a shape of an elongated strip (a thickness of 0.45 mm, a width of 1.8 mm, and a length of 23 mm) were fabricated with a method the same as in Example 3. A flow channel substrate obtained by increasing the number of flow channels in a longitudinal direction in the flow channel substrate from four in FIG. 48 to eight and the anode current collector obtained by increasing the number of regions A in the anode current collector from four in FIG. 49 to eight were bonded to each other through diffusion bonding, and thereafter eight MEAs were arranged on the anode current collector. The used anode current collector has a width of region A of 2 mm and a through hole like a slit having a width of 1 mm, as in FIG. 49. Eight MEAs were arranged on eight regions A respectively such that a pitch between the MEAs in a shape of an elongated strip (a distance from a left end of an MEA to a left end of an adjacent MEA) was set to 3 mm. Then, eight cathode current collectors increased in the number of cathode current collectors from four in FIG. 50(*c*) were made to lie along the surface of GDL25BC on the cathode side (the cathode conductive porous layer) and subjected to thermocompression bonding for two minutes under such conditions as 100° C. and 0.1 kgf/cm$^2$ through hot pressing, to tentatively bond the anode current collector, the MEAs, and the cathode current collectors to one another. Then, an epoxy-based adhesive was applied to the end portions of the MEAs and the end portions of the current collectors, to bond the MEAs and the current collectors to one another and to seal the end portions of the MEAS. One fuel cell layer was thus fabricated. Two such fuel cell layers were fabricated, that are referred to as samples No. 1 and No. 2, respectively. Thereafter, titanium non-woven fabric (porosity of 60%, a thickness of 0.5 mm, a width of 1.5 mm, a length of 30 mm, and linear 20 μm) of Bekinit K.K., which is a titanium porous body, and a non-porous body (a parallelepiped having a length of 30 mm, a thickness of 0.5 mm and a width of 0.5 mm) made of SUS316L were used as the spacers, and these were alternately arranged at a pitch of 4 mm (a distance from a left end of a spacer to a left end of an adjacent spacer), to thereby form the spacer layer. Thereafter, two fuel cell layers of samples No. 1 and No. 2 above sandwiched this spacer layer, the manifold was inserted as shown in FIG. 63(*b*), and an extraction terminal of the anode current collector and an extraction terminal of the cathode current collector were joined to form serial wiring in order to further lower electrical resistance, to thereby form the fuel cell stack (hereinafter also referred to as a two-layered stack). It is noted that each spacer and the fuel cell layer were bonded with a two-component type electrically conductive adhesive (Dotite SH-3A manufactured by Fujikura Kasei Co., Ltd.). FIG. 63(*b*) shows a schematic perspective view of this two-layered stack.

FIG. 63(*a*) shows a current-voltage characteristic and a characteristic of MEA average current-power density of sample No. 1, sample No. 2 and the two-layered stack above. Measurement was conducted by supplying a methanol aqueous solution of 3 mol/L as the fuel with a pump and passively supplying air without using auxiliary equipment for power generation. As shown in FIG. 63(*a*), maximum average power densities of samples No. 1 and No. 2 and the two-layered stack were 38.5 mW/cm$^2$, 37.4 mW/cm$^2$ and 42.1 mW/cm$^2$, respectively. The maximum value of the average power density improved in the two-layered stack, because two fuel cell layers were stacked and the temperature readily increased so that catalyst activity improvement or the like was achieved and hence power generation efficiency improved.

Here, the maximum volume power density (output per fuel cell stack volume, unit: W/L) of the two-layered stack was calculated as follows. Initially, a region surrounded by a bold frame shown in FIG. 63(*b*) is regarded as a substantial volume of the fuel cell stack (hereinafter also referred to as a stack volume, excluding a region where a manifold was installed). Then, this stack volume is calculated as 23 mm×23 mm×1.9 mm=1 cm$^3$, because the fuel cell layer has a thickness of approximately 0.7 mm, the spacer has a thickness of 0.5 mm, and the two-layered stack obtained by stacking the former has a thickness of 1.9 mm as found in measurement. On the other hand, the total area of the MEAS in the bold frame above is calculated as 2.3 cm×0.18 cm×8×2 layers=6.624 cm$^2$. Therefore, the output from the two-layered stack is calculated as 42.1 mW/cm$^2$×6.624 cm$^2$=279 mW. Therefore, the maximum volume power density of the two-layered stack can be calculated as 279 mW/1 cm$^3$=279 W/L.

Example 8

Another fuel cell layer the same as in Example 7 was fabricated and used as sample No, 3. Then, as in Example 7, three fuel cell layers of samples No. 1 to No. 3 were used to fabricate the fuel cell stack constituted of three fuel cell layers and two spacer layers arranged between the fuel cell layers (hereinafter also referred to as a three-layered stack). FIG. 64(*b*) shows a schematic perspective view of this three-layered stack. FIG. 64(*a*) shows a current-voltage characteristic and a characteristic of MEA average current-power density of sample No. 1, sample No. 2 and sample No. 3 and the three-layered stack. The measurement conditions were the same as in Example 7. As shown in FIG. 64(*a*), maximum average power densities of samples No. 1, No. 2 and No. 3, and the three-layered stack were 38.5 mW/cm$^2$, 37.4 mW/cm$^2$, 39.3 mW/cm$^2$, and 41.1 mW/cm$^2$, respectively. The maximum value of the average power density improved in the three-layered stack, because three fuel cell layers were stacked and the temperature readily increased so that catalyst activity improvement or the like was achieved and hence power generation efficiency improved.

Here, the maximum volume power density of the three-layered stack was calculated as follows. Initially, a region surrounded by a bold frame shown in FIG. 64(*b*) is regarded as a substantial volume of the fuel cell stack (stack volume), as in the two-layered stack in Example 7. Then, this stack volume is calculated as 23 mm×23 mm×3.0 mm=1.587 cm$^3$, because the fuel cell layer has a thickness of approximately 0.7 mm, the spacer has a thickness of 0.5 mm, and the three-layered stack obtained by stacking the former has a thickness of 3.0 mm as found in measurement. On the other hand, the total area of the MEAS in the bold frame above is calculated as 2.3 cm×0.18 cm×8×3 layers=9.936 cm$^2$. Therefore, the output from the three-layered stack is calculated as 41.1 mW/cm²×9.936 cm²=408 mW. Therefore, the maximum volume power density of the three-layered stack can be calculated as 408 mW/1.587 cm³=257 W/L.

Comparative Example 1

Figure 65:
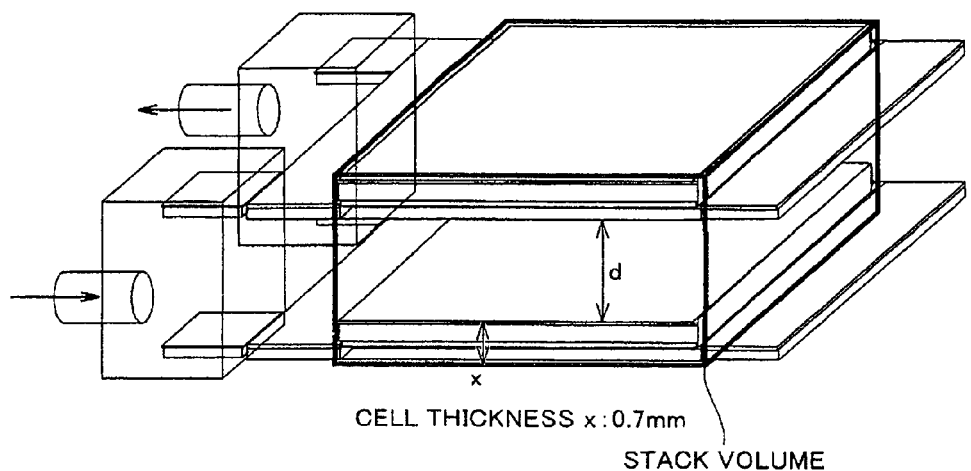
FIG. 65 is a perspective view showing a structure of a fuel cell stack fabricated in Comparative Example 1.

FIG. 65 is a perspective view showing a structure of a conventional fuel cell stack fabricated in the present Comparative Example. A fabrication procedure is as follows. Initially, as in Example 3, the anode catalyst layer and the cathode catalyst layer were formed on GDL25BC (conductive porous layer) of 23 mm×23 mm. Under the hot pressing conditions the same as in Example 3, an MEA in which GDL25BC, the anode catalyst layer, the electrolyte membrane (Nafion 117) of 3 cm×3 cm, the cathode catalyst layer, and GDL25BC were stacked in this order was fabricated. The electrolyte membrane that extends off the conductive porous layer was cut away and the MEA having an outer dimension of 23 mm×23 mm was prepared.

It is noted that a member having such an outer dimension that an output extraction terminal as in FIG. 49 is provided in a rectangle of 25×40 mm and obtained by plating SUS316L having holes having a diameter of 0.6 mm in a flat plate of 0.1 mm thickness in a hexagonal close packing pattern at a pitch of 0.7 mm and having an opening in a portion having an area of 23 mm×23 mm with Au to a thickness of 1 µm was employed as the anode current collector.

In addition, a member having such an outer dimension that an output extraction terminal as in FIG. 50(*c*) is provided in a rectangle of 23 mm×23 mm and obtained by plating SUS316L having holes having a diameter of 0.6 mm in a flat plate of 0.1 mm thickness in a hexagonal close packing pattern at a pitch of 0.7 mm and having an opening in a portion having an area of 23 mm×23 mm with Au to a thickness of 1 µm was employed as the cathode current collector.

Thereafter, the fabricated MEA was sandwiched such that it coincides with the opening portion in the anode current collector and the cathode current collector. The flow channel substrate having an outer dimension as in FIG. 48 (an SUS substrate having a thickness of 0.2 mm and a width 25 mm×a length at a longest portion 40 mm as well as insertion ports for two manifolds at end portions as in the flow channel substrate in FIG. 48), in which the flow channel is formed directly under where the MEA of 23 mm×23 mm is arranged such that the fuel flows, was made to coincide with the anode current collector, and an outer perimeter was sealed with an adhesive. Quick 5, which is an epoxy adhesive, was used as the adhesive.

Finally, as shown in FIG. 65, the manifold was inserted and the output extraction terminals of the anode current collector and the cathode current collector were connected to form serial wiring.

Figure 66:
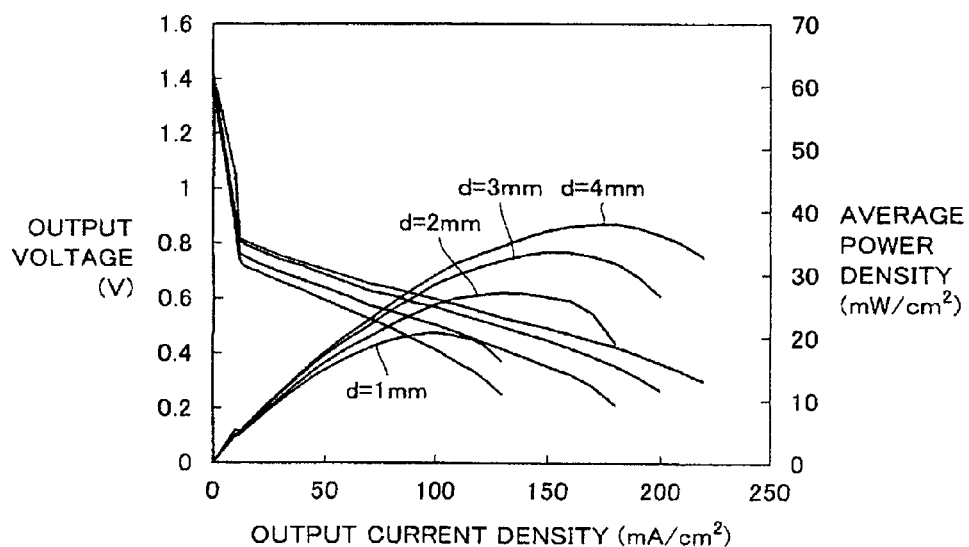
FIG. 66 is a graph showing a current-voltage characteristic and a current-power density characteristic of the fuel cell stack in Comparative Example 1.

FIG. 66(*a*) shows a current-voltage characteristic and a characteristic of MEA average current-power density in the example where the two fuel cells thus fabricated were stacked (that is, the fuel cell stack having the structure shown in FIG. 65). Measurement was conducted by supplying a methanol aqueous solution of 3 mol/L as the fuel with a pump and passively supplying air without using auxiliary equipment for power generation. This fuel cell stack is a stack in which two fuel cells (cells) each having an outer dimension of 2.23×2.23 cm and a surface area of 5 cm² were stacked in series. When an interval d between the cells is narrowed, air is less likely to be supplied and a value of maximum average power density has lowered due to shortage of air. Consequently, as shown in the table in FIG. 66, when two cells were three-dimensionally stacked, maximum volume power density was 167 W/L when cell interval d was set to 1 mm, it was 159 W/L when the interval was set to 2 mm, it was 153 W/L when the interval was set to 3 mm, and it was 140 W/L when the interval was set to 4 mm. It is noted that maximum average power density was calculated, regarding a region surrounded by a bold frame shown in FIG. 65 as a stack volume, as in Examples 7 and 8.

Thus, according to the present invention, the maximum volume power density of the fuel cell stack could be increased to approximately 1.5 times or higher than the conventional fuel cell stack. In addition, volume power density could be improved without the use of such auxiliary equipment as a fan for supplying air. The total output power of the two-layered stack in Example 7 according to the present invention was 279 mW and the total output power of the three-layered stack in Example 8 was 408 mW. In an example where the fuel cell stack has a two-dimensional outer dimension of 23 mm×23 mm, the conventional fuel cell including a single fuel cell layer can output only approximately 217 mW even with the output of 41.1 mW/cm², which is the maximum value of the average power density of sample No 3. On the other hand, according to the three-dimensionally highly-integrated fuel cell stack of the present invention, with the increase in thickness by 1.2 mm in the two-layered stack and increase in thickness by 2.3 mm in the three-layered stack, output could be increased to approximately 1.29 times in the case of the two-layered stack and to approximately 1.88 times in the case of the three-layered stack, as compared with the conventional fuel cell. Thus, in a case where an area for installing a fuel cell in equipment is limited, a fuel cell stack from which a large amount of output can be extracted with slight three-dimensional increase in thickness can be fabricated.

If output from equipment, which is a load of the fuel cell stack, is large, an area required for the MEA is great. However, two-dimensional arrangement does not allow arrangement in an area equal to or greater than a mountable area of the equipment. Therefore, such a case as requiring stack on the MEA often occurs. In this case, if an area of the MEA is large, that is, an area of the fuel cell layer is large, as in the conventional fuel cell, a distance to the fuel cell layer to be stacked thereon becomes greater in terms of intake of oxygen. In the conventional example, in the case of a fuel cell layer having a square MEA of 5 cm², for three-dimensional stack while extracting power density of the MEA equivalent to that in the case of one layer, an interval between the fuel cell layers should be set to approximately 3 to 4 mm. If an area of the fuel cell layer is greater than the above, the interval between the fuel cell layers should be set to 4 mm or greater or auxiliary equipment such as a fan is required. According to the present invention, by increasing the number of unit cells in a shape of an elongated strip from eight to eight or more or by increasing a length of the unit cell in a shape of an elongated strip, stacking can be carried out while maintaining constant the interval between the fuel cell layers (a thickness of the spacer). Namely, even though output of the load is increased, the fuel cell stack can be fabricated without lowering volume power density. In addition, according to the present invention, the fuel cell layers can be brought closer to one another and highly integrated. Therefore, influence by a temperature owing to power generation in the adjacent fuel cell layer is great, and power generation efficiency and maximum average power density can be improved. In addition, temperature increase raises a saturated vapor pressure and an amount of condensed water produced in the fuel cell stack is decreased. Moreover, according to the fuel cell stack in the present invention, as an air passageway is three-dimensionally formed in the fuel cell stack, produced water that has turned to vapor is satisfactorily exhausted through the passageway to the outside of the fuel cell stack and thus electric power can be supplied in a stable manner.

Example 9

The fuel cell stack was fabricated by alternately arranging cotton non-woven fabric instead of titanium non-woven fabric that had served as the spacer in the fuel cell stack in Example 7 and a spacer made of SUS316L. The cotton non-woven fabric has a width of 1.5 mm and a thickness of 0.5 mm, and it is longer than an outer dimension of the fuel cell stack by 2 cm. Therefore, a portion that has extended off was folded back to the back of the fuel cell stack. The configuration in Example 9 is otherwise the same as in the fuel cell stack in Example 7.

Figure 67:
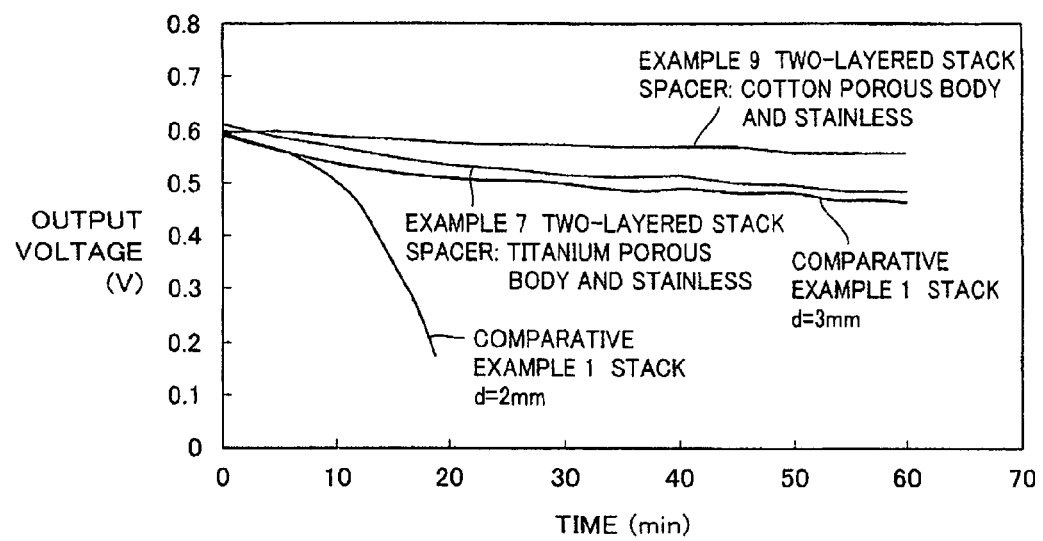
FIG. 67 is a graph showing results of continuous power generation tests for a two-layered stack fabricated in Example 7, a two-layered stack fabricated in Example 9, and a two-layered stack fabricated in Comparative Example 1 (stacks having cell intervals d of 2 mm and 3 mm, respectively).

FIG. 67 shows results of continuous power generation tests (a voltage-time characteristic evaluation test at an output current of 100 mA/cm$^2$) for a two-layered stack fabricated in Example 7, a two-layered stack fabricated in the present example, and the two-layered stacks fabricated in Comparative Example 1 (stacks having cell intervals d of 2 mm and 3 mm, respectively). The continuous power generation test was conducted under such conditions as 40° C., an output current of 100 mA/cm$^2$, and being open to atmosphere. In the case of the two-layered stack in Comparative Example 1, continuous output for 20 minutes was unsuccessful even with cell interval d being set to 2 mm, due to air supply being blocked by produced water. When cell interval d was set to 3 mm in the two-layered stack in Comparative Example 1, continuous power generation characteristics substantially equivalent to those in Example 7 were exhibited. On the other hand, the two-layered stack according to the present example including as the spacer, cotton non-woven fabric, which is a hydrophilic porous body, exhibited excellent continuous power generation characteristics, because condensed produced water was absorbed and exhausted to the back side of the fuel cell stack and the water evaporated. Thus, it can be found that, by using a spacer made of a hydrophilic porous body, water produced from the unit cell can evaporate to the outside and excellent continuous power generation characteristics can be maintained. An amount of produced water includes an amount of water produced as a result of combustion of methanol with oxygen at the cathode as methanol moves from the anode electrode through the electrolyte membrane to the cathode side or an amount of transferred water included in the fuel. The continuous power generation characteristics can further be improved by using an electrolyte membrane in which a crossover amount of methanol or water is reduced, and thus a fuel cell stack achieving further higher output can be obtained.

The fuel cell stack according to the present invention has such a structure as achieving high output and facilitating exhaust of produced water as vapor, as compared with a conventional structure, and it can be concluded that such a structure is advantageous for higher integration. In particular, it is extremely advantageous in that higher integration can be achieved without the use of auxiliary equipment for supplying air.

Example 10

Five MEAs each in a shape of an elongated strip (a thickness of 0.45 mm, a width of 2.35 mm, and a length of 23 mm) were fabricated with a method the same as in Example 3. Then, the flow channel substrate and the anode current collector were bonded to each other through diffusion bonding, and thereafter the five MEAs were arranged on the anode current collector. Specifically, the five MEAs were arranged on regions A at five locations respectively such that a pitch between the MEAs in a shape of an elongated strip was set to 3.5 mm. The flow channel substrate used here has a structure the same as that of the flow channel substrate in FIG. 48. Namely, in the flow channel substrate, a through hole like a slit has a width of 1 mm, a wall formed between the through holes like a slit and a flow channel adjacent thereto has a width of 0.5 mm, the flow channel has a width of 1.5 mm and a depth of 0.1 mm, the flow channel substrate has a thickness of 0.2 mm, and the number of flow channels in a longitudinal direction was increased from four to five (therefore, four through holes like a slit were provided and projections of 2.5×3 mm serving as manifold insertion ports were located on a diagonal line).

In addition, the anode current collector used here has an outer dimension the same as that of the flow channel substrate in the present example. More specifically, the anode current collector has a structure the same as that of the anode current collector in FIG. 49, in which the number of regions A was increased from four to five (therefore, four through holes like a slit were provided), the through hole like a slit has a width of 1 mm and a length of 25 mm, region A has a width of 2.5 mm, and an opening in a hexagonal shape of which side is 0.25 mm long is provided in a region having a width of 0.75 mm from the centerline in the longitudinal direction of region A toward opposing ends, with a line width of 0.1 mm being left.

Thereafter, the composite cathode current collector in which the number of cathode current collectors in the composite cathode current collector in. FIG. 50(c) was increased from four to five, one cathode current collector has a width of 2.5 mm, and a distance between the cathode current collectors is set to 1 mm was made to lie along the surface of GDL25BC on the cathode side (the cathode conductive porous layer) and subjected to thermocompression bonding for two minutes at such conditions as 100° C. and 0.1 kgf/cm$^2$ through hot pressing, to tentatively bond the anode current collector, the MEAs, and the cathode current collectors to one another. A two-component type epoxy adhesive was applied to the end portions of the MEAs and the end portions of the current collectors to bond the MEAs and the current collectors to one another and to seal the end portions. One fuel cell layer was thus fabricated. Three such fuel cell layers were fabricated, that are denoted as samples No. 4, No. 5 and No. 6, respectively. Thereafter, the spacer layer the same as in Example 7 was fabricated, with which a two-layered stack and a three-layered stack were fabricated. The two-layered stack is a fuel cell stack having such a structure that the fuel cell layer of sample No. 4, the spacer layer and the fuel cell layer of sample No, 5 were stacked in this order. Meanwhile, the three-layered stack is a fuel cell stack having such a structure that the fuel cell layer of sample No. 4, the spacer layer, the fuel cell layer of sample No. 5, the spacer layer, and the fuel cell layer of sample No. 6 were stacked in this order.

Figure 68:
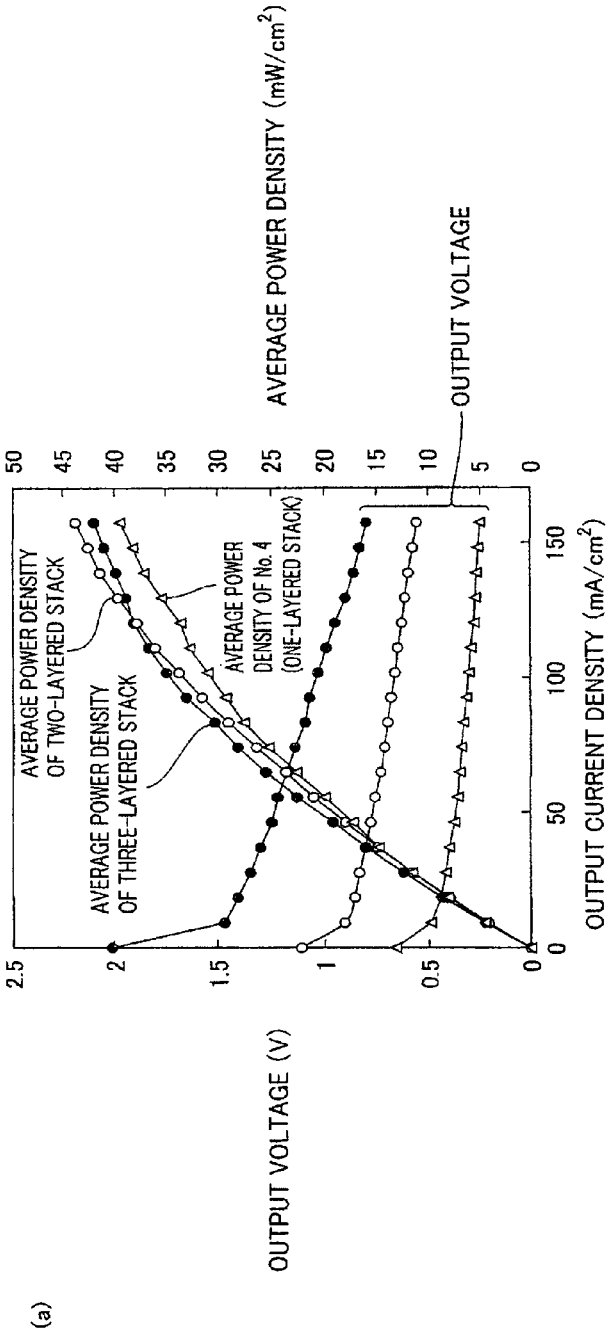
FIG. 68 is a graph and a table showing power generation characteristics of a sample No. 4 (one-layered stack), a two-layered stack, and a three-layered stack fabricated in Example 10.

FIG. 68 shows power generation characteristics of sample No. 4 (one-layered stack), a two-layered stack, and a three-layered stack. FIG. 68(a) is a graph showing a current-voltage characteristic and a characteristic of MEA average current-power density of sample No. 4 (one-layered stack), the two-layered stack and the three-layered stack. FIG. 68(b) is a table summarizing power generation characteristics and shapes of these stacks. Measurement was conducted by supplying a methanol aqueous solution of 3 mol/L as the fuel with a pump and passively supplying air without using auxiliary equipment for power generation, as in Example 7. As shown in FIG. 68, maximum average power densities of sample No. 4, the two-layered stack and the three-layered stack were 39.5 mW/cm$^2$, 43.7 mW/cm$^2$ and 42.2 mW/cm$^2$, respectively. It is noted that maximum average power densities of samples No. 5 and No. 6 were 41.2 mW/cm$^2$ and 41.5 mW/cm$^2$, respectively. Even when a width of the MEA was increased to 2.35 mm, lowering in the average power density of the MEA was not observed in the range of the output current density in the present example. By stacking two or three layers, the temperature of the fuel cell and the temperature of air in the fuel cell stack increase, so that catalyst activity improvement or the like was achieved and hence power generation efficiency improved. Thus, the average power density of the MEA improved.

In Examples 7 and 8, the MEA had a width of 1.8 mm, and a width of the through hole like a slit in the anode current collector and the flow channel substrate or a distance between the cathode current collectors, which is a width of an air path, was set to 1 mm. On the other hand, in the present example, the width of the MEA was increased to 2.35 mm and a width of the air path was set to 1 mm. As a ratio of the MEA to a gap in a plane is higher, two-dimensionally higher integration can be achieved. In the present example, as shown in FIG. 68(*b*), the two-layered stack having a thickness of 0.19 cm exhibited a maximum value of volume power density of 328 W/L and the three-layered stack having a thickness of 0.3 cm exhibited a maximum value of volume power density of 300 W/L. In the present example, the maximum value of the volume power density was significantly improved as compared with Examples 7 and 8. Thus, according to the present invention, by optimizing a shape (such as a width) of the MEA, a shape (such as a width) of an air path (a gap region), or the like, power density can significantly be improved. Such optimization can be achieved by optimizing arrangement of the fuel cells (unit cells) within the fuel cell stack.

If the fuel cell stack is preferably arranged in a three-dimensional space having a height in mounting the fuel cell stack on equipment, importance is preferably placed on air supply and a ratio of the gap region within the fuel cell stack is made higher. If the fuel cell stack is preferably arranged in a space having a small thickness as if being two-dimensional, a ratio of the MEA is preferably made higher to improve two-dimensional integration. The fuel cell stack according to the present example can also achieve an effect the same as that of the fuel cell stacks in Examples 7 and 8. According to the fuel cell stack in the present example, the maximum value of volume power density could be increased to approximately two times as high as that of the conventional fuel cell stack in Comparative Example 1.

Example 11

Three fuel cell layers having the same structure as the fuel cell layer fabricated in Example 10 (samples No. 4, No. 5 and No. 6), cotton non-woven fabric which is a hydrophilic porous body to serve as a spacer, and a titanium porous body were used to fabricate the fuel cell stack having three fuel cell layers. Specifically, six spacers made of cotton non-woven fabric having a thickness of 0.4 mm and a width of 1.5 mm were arranged at intervals of 2 mm, and titanium non-woven fabric (porosity of 60%, a thickness of 0.4 mm, a width of 1.5 mm, a length of 20 mm, and linear 20 µm) of Bekinit K.K., which is a titanium porous body, was arranged at opposing end portions in a longitudinal direction of each MEA such that the entire fuel cell stack is electrically serially wired, followed by bonding by a two-component, electrically conductive adhesive (Dotite SH-3A manufactured by Fujikura Kasei Co., Ltd.) to form the spacer layer. The fuel cell stack was thus fabricated by stacking the fuel cell layer, the spacer layer, the fuel cell layer, the spacer layer, and the fuel cell layer in this order. Here, a length of the cotton spacer that was used was longer than an outer dimension of the fuel cell stack by 2 cm from the end portion. Therefore, as in Example 9, a portion that has extended off was folded back to the back of the fuel cell stack. In addition, in order to further lower electrical resistance, an extraction terminal of the anode current collector and an extraction terminal of the cathode current collector were joined to form serial wiring.

Figure 69:
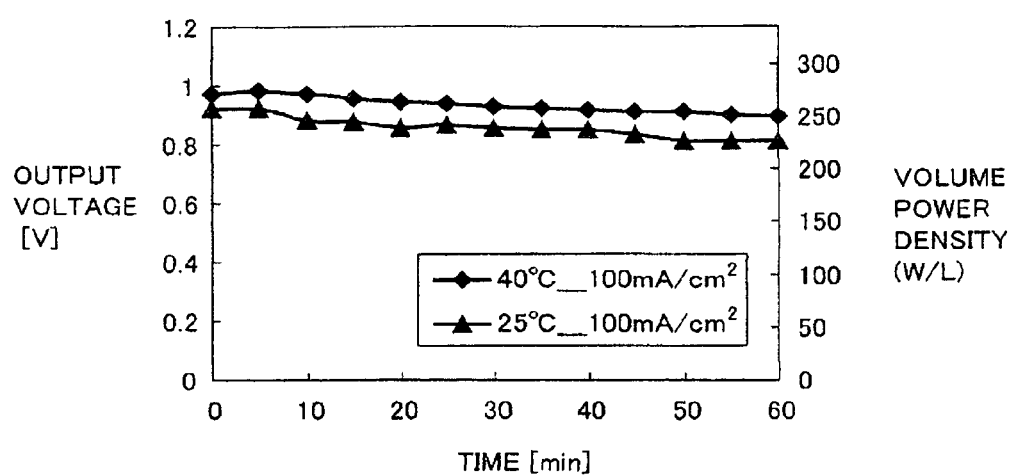
FIG. 69 is a graph showing continuous power generation characteristics of a fuel cell stack fabricated in Example 11, at an output current density of 100 mA/cm$^2$ and at temperatures of 25° C. and 40° C.

FIG. 69 shows continuous power generation characteristics of the obtained fuel cell stack at an output current density of 100 mA/cm$^2$ and at temperatures of 25° C. and 40° C. The left ordinate represents an output voltage (V) of the fuel cell stack, and the right ordinate represents volume power density (W/L) of the fuel cell stack. As shown in FIG. 69, in the continuous power generation test for 60 minutes, under any temperature condition, lowering in the output voltage was as low as approximately 10%. In addition, at the temperature of 25° C. as well, continuous power generation for one hour could be achieved while maintaining high volume power density not lower than 220 W/L. In general, when a highly-integrated stack is placed in equipment, an ambient temperature may be raised as the stack is surrounded by a housing. In the fuel cell stack in the present example, under the condition that the ambient temperature was set to 40° C., power generation efficiency improved as compared with the condition that the ambient temperature was set to 25° C., and high volume power density not lower than 250 W/L was exhibited (see FIG. 69). Thus, the fuel cell stack in the present example can achieve continuous power generation while maintaining high volume power density.

It should be understood that the embodiments and the examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:
1. A fuel cell stack, comprising:
   a fuel cell layer constituted of two or more unit cells and having a first gap region provided between adjacent unit cells in the fuel cell layer;
   a spacer layer constituted of two or more spacers and having a second gap region provided between adjacent spacers in the spacer layer, the spacer layer being stacked on the fuel cell layer; and
   a current collection unit,
   each said unit cell including an anode catalyst layer, an electrolyte membrane, a cathode catalyst layer, and a fuel supply unit for supplying a fuel to said anode catalyst layer,
   the first gap region and the second gap region are a space penetrating the fuel cell layer and the spacer layer respectively in a direction of layer thickness thereof and constituting an oxidizing agent gas flow path for supplying the oxidizing agent gas to each said unit cell,
   all of the first gap region and the second gap region fluidly communicate with one another,
   said oxidizing agent gas flow path consisting of said all of the first gap region and the second gap region communicating with one another, and
   each said unit cell is a direct methanol fuel cell or a polymer electrolyte fuel cell.

2. The fuel cell stack according to claim 1, wherein
each said spacer constituting said spacer layer is arranged to intersect with each said unit cell constituting said fuel cell layer.

3. The fuel cell stack according to claim 2, at least comprising a fuel cell layer (A), the spacer layer constituted of two or more spacers, and a fuel cell layer (B) in this order, wherein
the spacers arranged at respective opposing ends among two or more spacers constituting said spacer layer are arranged in contact with end portions in a longitudinal direction of the unit cells (a) in said fuel cell layer (A) and the unit cells (b) in said fuel cell layer (B).

4. The fuel cell stack according to claim 3, wherein
each said unit cells (a) in said fuel cell layer (A) and each said unit cells (b) in said fuel cell layer (B) include an anode current collector arranged on said anode catalyst layer and a cathode current collector arranged on said cathode catalyst layer.

5. The fuel cell stack according to claim 1, at least comprising a fuel cell layer (A), one said spacer layer, and a fuel cell layer (B) in this order, wherein
two or more unit cells (b) in said fuel cell layer (B) are arranged in a region directly above or directly under unit cells (a) in said fuel cell layer (A), respectively.

6. The fuel cell stack according to claim 1, at least comprising a fuel cell layer (A), one said spacer layer, and a fuel cell layer (B) in this order, wherein
two or more unit cells (b) in said fuel cell layer (B) are arranged directly above or directly under the first gap regions in said fuel cell layer (A), respectively.

7. The fuel cell stack according to claim 1, wherein
said two or more unit cells constituting said fuel cell layer are arranged substantially in parallel such that the first gap region is provided between adjacent unit cells, and
said two or more spacers constituting said spacer layer are arranged substantially in parallel such that the second gap region is provided between adjacent spacers.

8. The fuel cell stack according to claim 1, wherein
at least any of said unit cell and said spacer is in a shape of an elongated strip.

9. The fuel cell stack according to claim 1, wherein
said spacer layer includes a spacer formed of a porous body.

10. The fuel cell stack according to claim 9, wherein
said spacer layer is constituted of two or more spacers including a spacer formed of a porous body and a spacer formed of a non-porous body.

11. The fuel cell stack according to claim 10, wherein
at least spacers arranged at respective opposing ends of the spacer layer among said two or more spacers are spacers formed of a non-porous body.

12. The fuel cell stack according to claim 1, wherein
said spacer layer includes at least one spacer having a hydrophilic surface.

13. A fuel cell system, comprising:
the fuel cell stack according to claim 1; and
an auxiliary equipment for promoting flow of the oxidizing agent gas into the fuel cell stack.

* * * * *